(12) United States Patent
Fujimura et al.

(10) Patent No.: US 11,336,095 B2
(45) Date of Patent: May 17, 2022

(54) POWER TRANSMISSION SYSTEM INCLUDING MULTIPHASE ALTERNATING-CURRENT POWER SUPPLIES AND LOADS, AND CAPABLE OF TRANSMITTING POWER BETWEEN DIFFERENT TYPES OF POWER SUPPLIES AND LOADS

(71) Applicant: Panasonic Intellectual Property Management Co., Ltd., Osaka (JP)

(72) Inventors: Motohiko Fujimura, Osaka (JP); Masahiro Yamaoka, Osaka (JP); Atsushi Yamamoto, Kyoto (JP); Taiki Nishimoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 237 days.

(21) Appl. No.: 16/476,248

(22) PCT Filed: Dec. 25, 2017

(86) PCT No.: PCT/JP2017/046345
§ 371 (c)(1),
(2) Date: Jul. 5, 2019

(87) PCT Pub. No.: WO2018/128109
PCT Pub. Date: Jul. 12, 2018

(65) Prior Publication Data
US 2019/0356132 A1 Nov. 21, 2019

(30) Foreign Application Priority Data

Jan. 6, 2017 (JP) .............................. JP2017-001344

(51) Int. Cl.
*H02J 3/02* (2006.01)
*H02J 13/00* (2006.01)

(52) U.S. Cl.
CPC ................. *H02J 3/02* (2013.01); *H02J 13/00* (2013.01)

(58) Field of Classification Search
CPC .................................... H02J 3/00; H02J 13/00
See application file for complete search history.

(56) References Cited

U.S. PATENT DOCUMENTS 9,979,437 B2 * 5/2018 Yamamoto .......... H04L 27/2601
10,122,289 B2 * 11/2018 Yamaoka .............. H02M 5/297
(Continued)

FOREIGN PATENT DOCUMENTS

JP 2011-091954 A 5/2011
JP 5612718 B2 10/2014
(Continued)

OTHER PUBLICATIONS

English translation of the International Preliminary Report on Patentability issued in International Patent Application Mo. PCT/JP2017/046345, dated Jul. 9, 2019.
(Continued)

*Primary Examiner* — Rexford N Barnie
*Assistant Examiner* — Joseph N Inge
(74) *Attorney, Agent, or Firm* — McDermott Will & Emery LLP

(57) ABSTRACT

The power transmitter apparatus is provided with code modulators which modulate powers of phase components of three-phase alternating-current power to generate code-modulated waves, respectively, by code modulation using modulation codes based on code sequences different from each other, and transmits the code-modulated waves to the at least one power receiver apparatus via the transmission
(Continued)

path. The power receiver apparatus is provided with code demodulators, each of which demodulates one code-modulated wave of the received code-modulated waves to generate code-demodulated power by code demodulation using a demodulation code based on a code sequence identical to the code sequence of the modulation code used for the code modulation of the one code-modulated wave, the code-demodulated power being generated as power of one of phase components of multiphase alternating-current power.

13 Claims, 37 Drawing Sheets

(56) References Cited

U.S. PATENT DOCUMENTS

| | | | |
|---|---|---|---|
| 2012/0173035 A1 | 7/2012 | Abe | |
| 2012/0185708 A1 | 7/2012 | Rekimoto et al. | |
| 2013/0215981 A1* | 8/2013 | Fornage | H04B 3/54 |
| | | | 375/257 |
| 2013/0226484 A1 | 8/2013 | Rouvala et al. | |
| 2016/0006591 A1* | 1/2016 | Huomo | H04B 3/542 |
| | | | 375/295 |
| 2017/0117913 A1* | 4/2017 | Yamamoto | H04B 3/542 |
| 2017/0133948 A1* | 5/2017 | Kanou | H02M 7/537 |
| 2017/0163281 A1* | 6/2017 | Hara | H02J 13/00009 |
| 2017/0222539 A1* | 8/2017 | Nishimoto | H04B 1/69 |
| 2017/0229974 A1* | 8/2017 | Yamaoka | H03K 7/02 |
| 2017/0346300 A1* | 11/2017 | Kanou | H02J 4/00 |
| 2019/0319484 A1* | 10/2019 | Yamaoka | H04B 3/542 |

FOREIGN PATENT DOCUMENTS

| | | |
|---|---|---|
| JP | 5612920 B2 | 10/2014 |
| JP | 2015-516705 A | 6/2015 |
| JP | 2016-136821 A | 7/2016 |

OTHER PUBLICATIONS

International Search Report issued in corresponding International Patent Application No. PCT/JP2017/046345, dated Jan. 23, 2018, with English translation.

* cited by examiner

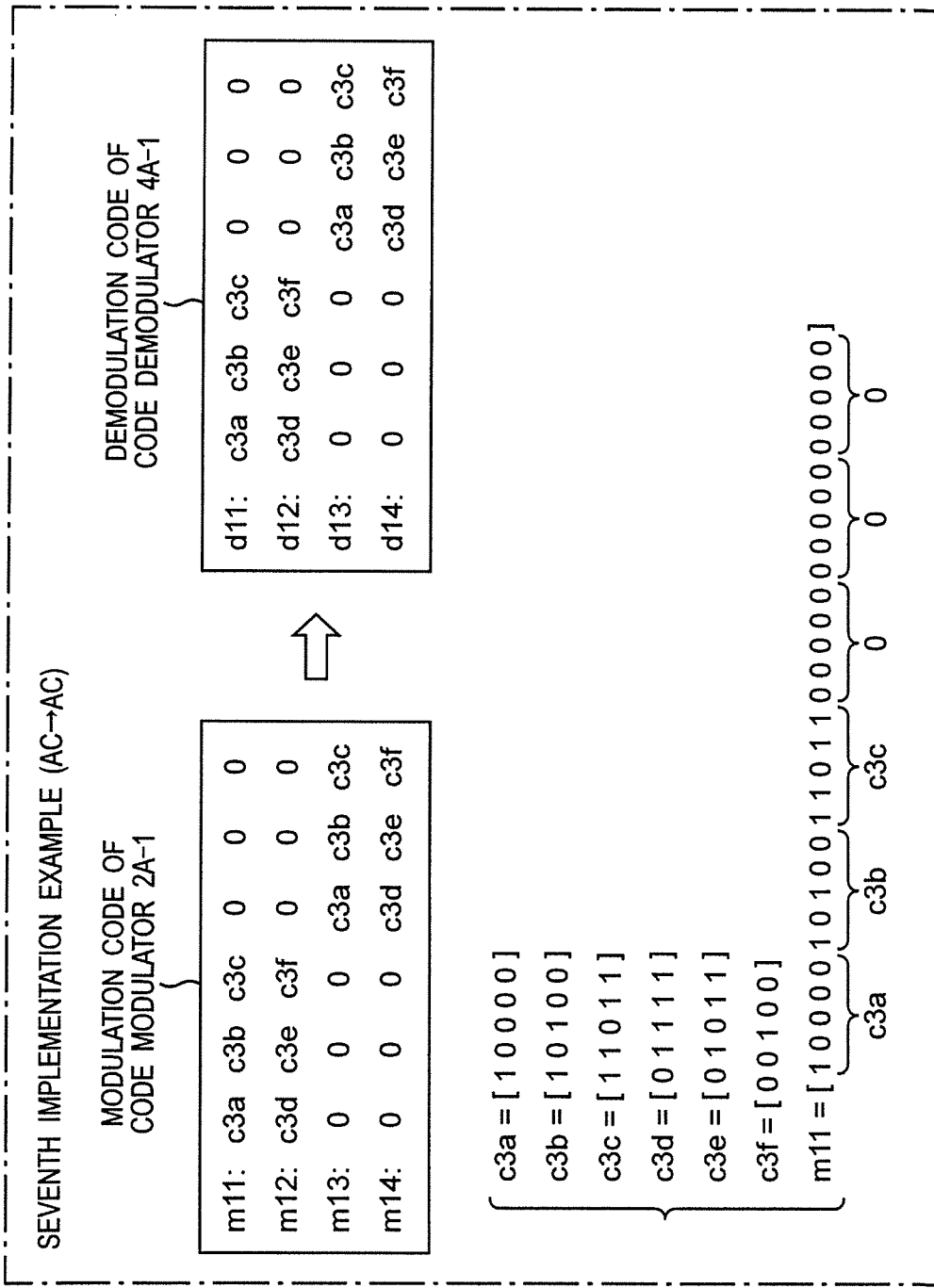

POWER TRANSMISSION SYSTEM INCLUDING MULTIPHASE ALTERNATING-CURRENT POWER SUPPLIES AND LOADS, AND CAPABLE OF TRANSMITTING POWER BETWEEN DIFFERENT TYPES OF POWER SUPPLIES AND LOADS

CROSS-REFERENCE TO RELATED APPLICATIONS

This application is the U.S. National Phase under 35 U.S.C. § 371 of International Application No. PCT/JP2017/046345, filed on Dec. 25, 2017, which claims the benefit of Japanese Application No. 2017-001344, filed on Jan. 6, 2017, the entire contents of each are hereby incorporated by reference.

TECHNICAL FIELD

The present disclosure relates to a power transmitter apparatus which transmits power (electric power) via a transmission path, a power receiver apparatus which receives power via a transmission path, and a power transmission system including the power transmitter apparatus and the power receiver apparatus.

BACKGROUND ART

In recent years, power supplies of renewable energy, typically photovoltaic power generation, wind power generation, and biofuel power generation, are increasingly used, as well as conventional power supplies provided by power companies, such as thermal power generation, hydropower generation, and nuclear power generation. In addition, apart from large-scale commercial power networks currently provided, local and small-scale power networks capable of achieving local production and local consumption of power have been being spread worldwide in order to reduce losses of long-distance power transmission.

In a small-scale power network, power can be supplied self-sufficiently by using a natural energy power generator, and electric load equipment capable of efficient power regeneration. This type of power network is highly promising as a power transmission system for supplying electricity to non-electrified areas, such as desert oasis and remote islands.

For example, each of Patent Documents 1 to 3 discloses a power transmission system which transmits power from a power supply to a load via a power line.

CITATION LIST

Patent Documents

PATENT DOCUMENT 1: Japanese Patent Publication No. JP 5612718 B
PATENT DOCUMENT 2: Japanese Patent Publication No. JP 5612920 B
PATENT DOCUMENT 3: Japanese Patent laid-open Publication No. JP 2011-091954 A

SUMMARY OF INVENTION

Technical Problem

A certain type of power transmission system may transmit powers from a plurality of power supplies to a plurality of loads via a common transmission path. In this case, in order to transmit power from a specific power supply to a specific load, it is required to distinguish different power portions transmitted from different power supplies in entire power transmitted via the transmission path, as different power components, and separately receive desired power components at the loads, respectively.

In addition, power supplies and loads may operate with direct current, single-phase alternating current, or multiphase alternating current. However, a conventional power transmission system includes power supplies and loads of the same type only, and therefore, can transmit power using only one of direct current, single-phase alternating current, and multiphase alternating current. Accordingly, it is convenient to provide a power transmission system capable of transmitting power using any of direct current, single-phase alternating current, and multiphase alternating current, and capable of transmitting power even when the power transmission system includes a combination of different types of power supplies and/or loads.

An object of the present disclosure is to solve the above problems, and to provide a power transmitter apparatus, with a simple configuration, capable of transmitting power in a power transmission system including multiphase alternating-current power supplies and/or loads, and capable of transmitting power even when the power transmission system includes a combination of different types of power supplies and/or loads.

Solution to Problem

According an aspect of the present disclosure, a power transmitter apparatus transmits power to at least one power receiver apparatus via a transmission path. The power transmitter apparatus is provided with a plurality of code modulators which modulate powers of phase components of multiphase alternating-current power to generate a plurality of code-modulated waves, respectively, by code modulation using a plurality of modulation codes based on a plurality of code sequences different from each other, and transmits the plurality of code-modulated waves to the at least one power receiver apparatus via the transmission path.

These generic and specific aspects may be implemented as a system, as a method, or as any combination of systems and methods.

Advantageous Effects of Invention

According to a power transmitter apparatus of an aspect of the present disclosure, the power transmitter apparatus with a simple configuration can transmit power in a power transmission system including multiphase alternating-current power supplies and/or loads, and transmit power even when the power transmission system includes a combination of different types of power supplies and/or loads.

BRIEF DESCRIPTION OF DRAWINGS

FIG. 23A is a diagram showing an example of a modulation code of a code modulator 2A-1 and a demodulation code of a code demodulator 4A-1 in the power transmission system of FIG. 18, as a seventh implementation example in which three-phase alternating-current power is transmitted and received.

DESCRIPTION OF EMBODIMENTS

Findings Underlying Present Disclosure

Figure 1:
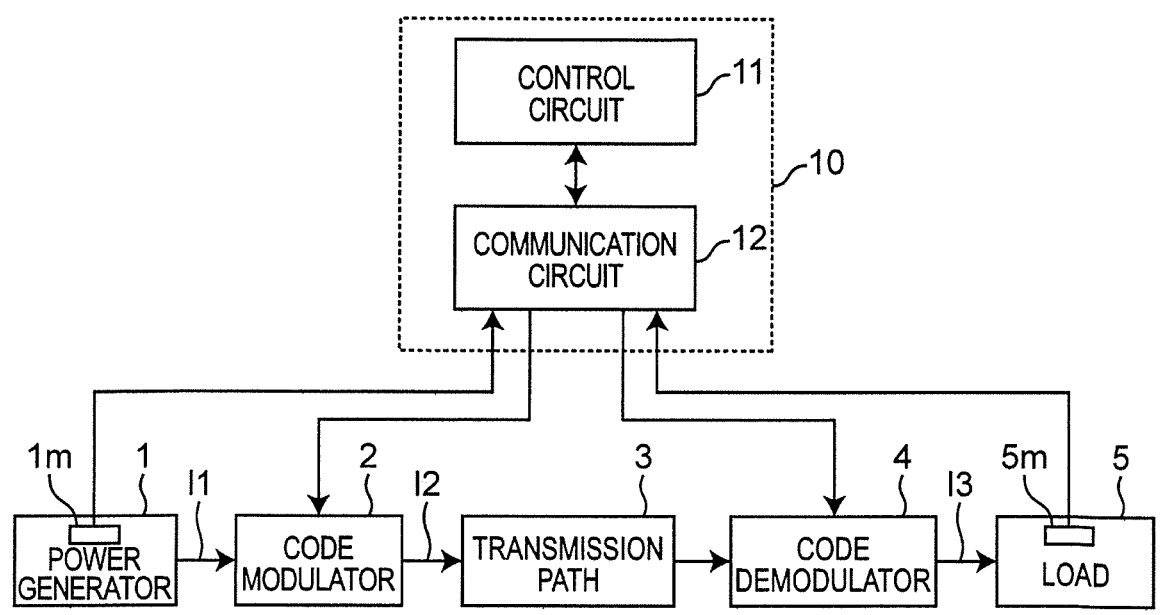
FIG. 1 is a block diagram showing a configuration of a power transmission system according to a first embodiment.

Patent Document 1 discloses an interconnection apparatus for power transmission apparatuses, the interconnection apparatus being capable of transmitting and receiving power among a plurality of power systems. According to Patent Document 1, the interconnection apparatus is provided with a converter and an inverter. For power transmission, the converter converts transmitting power from alternating current to direct current, and the converted power is transmitted to the interconnection apparatus connected to a receiving power system. At the interconnection apparatus of the receiving power system, the inverter converts the power so as to have a desired frequency, thus providing power having an optimum frequency for the power system to which the interconnection apparatus is connected. Moreover, Patent Document 2 discloses a configuration further provided with a power storage apparatus, in addition to the components of Patent Document 1.

On the other hand, Patent Document 3 discloses a method of transmitting power from a plurality of power transmitter apparatuses to a plurality of power receiver apparatuses. According to Patent Document 3, power is transmitted from the plurality of power transmitter apparatuses to the plurality of power receiver apparatuses in a time division manner. According to Patent Document 3, control signals are wirelessly transmitted among the power transmitter apparatuses and the power receiver apparatuses in order to transmit and receive power.

However, according to Patent Documents 1 and 2, the interconnection apparatus is provided with the inverter and converter, and basically, individual power transmission cables are required for all combinations of the power systems transmitting and receiving power. According to Patent Documents 1 and 2, the interconnection apparatus may be configured so as to reduce the number of power transmission cables, however, in any case, a large number of power transmission cables are required. Thus, installation costs and the cables' material costs increase. In addition, the interconnection apparatus should be provided with the same number of pairs of the inverter and the converter as the number of the power systems to be connected. Accordingly, the cables' costs may increase, and costs may further increase due to the increased size of the interconnection apparatus.

In addition, according to Patent Document 3, it is possible to transmit and receive power among the plurality of power transmitter apparatuses and the plurality of power receiver apparatuses in a time division manner, and advantageously, it is possible to reduce the number of power transmission cables. However, in case of time-division power transmission, it is not possible to transmit and receive power among the plurality of power systems, simultaneously. In other words, it may not be possible to immediately handle a power demand from a load connected to a power receiver. Furthermore, when transmitting and receiving power among a large number of pairs of the power transmitter apparatuses and the power receiver apparatuses, only a short time is allocated for one pair of the power transmitter apparatus and the power receiver apparatus to transmit and receive power, and therefore, large pulse power is transmitted via the power transmission cable. Accordingly, the transmission cable with a high power durability is required, and thus, it may increase costs. In addition, since time intervals in which power can not be received occur, it may be required to provide the power receiver apparatuses with a buffer for large power. Furthermore, in order to transmit and receive power in a time division manner, time-synchronization is required among the plurality of power transmitter apparatuses and the plurality of power receiver apparatuses. In order to achieve such synchronization, very accurate controls among the apparatuses are required, and thus, it may increase the entire system costs.

As described above, according to both Patent Documents 1 and 2, a large number of power transmission cables are used, and therefore, it is not possible to reduce the power transmission cables by multiplexed power transmission. Further, the interconnection apparatus requires a pair of inverter and converter for each of the power transmission cables, and therefore, it is not possible to reduce the size of the interconnection apparatus. Accordingly, it is difficult to transmit and receive power among a large number of power systems. On the other hand, according to Patent Document 3, power is transmitted and received among the plurality of power transmitter apparatuses and the plurality of power receiver apparatuses via the power transmission cables in a time division manner, thus reducing the number of the power transmission cables. However, it is not possible to provide a transmission system capable of transmitting and receiving power among the plurality of power systems, simultaneously. Accordingly, there is a demand for a power transmission system with a reduced number of power transmission cables, and capable of transmitting and receiving power from a plurality of power transmitter apparatuses to a plurality of power receiver apparatuses, simultaneously, and more reliably, while reducing sizes and thicknesses of the power transmitter apparatuses and the power receiver apparatuses.

Further, as described above, it is convenient to provide a power transmission system capable of transmitting power using any of direct current, single-phase alternating current, and multiphase alternating current, and capable of transmitting power even when the power transmission system includes a combination of different types of power supplies and/or loads.

Based on the above consideration, the inventors provide the following aspects of the invention.

According an aspect of the present disclosure, a power transmitter apparatus transmits power to at least one power receiver apparatus via a transmission path. The power transmitter apparatus is provided with a plurality of code modulators which modulate powers of phase components of multiphase alternating-current power to generate a plurality of code-modulated waves, respectively, by code modulation using a plurality of modulation codes based on a plurality of code sequences different from each other, and transmits the plurality of code-modulated waves to the at least one power receiver apparatus via the transmission path.

According an aspect of the present disclosure, a power receiver apparatus receives a plurality of code-modulated waves from at least one power transmitter apparatus via a transmission path, the plurality of code-modulated waves including powers modulated by code modulation using a plurality of modulation codes based on a plurality of code sequences different from each other, respectively. The power receiver apparatus is provided with a plurality of code demodulators, each of which demodulates one code-modulated wave of the plurality of received code-modulated waves to generate code-demodulated power by code demodulation using a demodulation code based on a code sequence identical to the code sequence of the modulation code used for the code modulation of the one code-modulated wave, the code-demodulated power being generated as power of one of phase components of multiphase alternating-current power.

According the present disclosure, with a simple configuration, it is possible to transmit power in a power transmission system including multiphase alternating-current power supplies and/or loads, and transmit power even when the power transmission system includes a combination of different types of power supplies and/or loads.

Hereinafter, embodiments according to the present disclosure will be described with reference to the drawings. In the following embodiments, similar constituent elements are denoted by identical reference numerals.

An object of the present disclosure is to provide a power transmitter apparatus, a power receiver apparatus, and a power transmission system with a simple configuration, capable of transmitting power in a power transmission system including multiphase alternating-current power supplies and/or loads, and capable of transmitting power even when the power transmission system includes a combination of different types of power supplies and/or loads. In first to third embodiments, we describe preparatory overviews of power transmission systems. Thereafter, in fourth to sixth embodiments, we describe power transmission systems which solves the problems.

First Embodiment

FIG. 1 is a block diagram showing a configuration of a power transmission system according to the first embodiment. Referring to FIG. 1, the power transmission system according to the first embodiment is provide with a power generator 1, a code modulator 2, a transmission path 3, a code demodulator 4, a load 5, and a controller 10. The transmission path 3 is, for example, a wired transmission path including two power lines, or a wireless transmission path.

The controller 10 is provided with a control circuit 11 and a communication circuit 12. The control circuit 11 communicates with the code modulator 2 and the code demodulator 4 via the communication circuit 12, and controls operations of the code modulator 2 and the code demodulator 4.

In the power transmission system of FIG. 1, the code modulator 2 operates as a power transmitter apparatus, and the code demodulator 4 operates as a power receiver apparatus. The code modulator 2 modulates first power to generate a code-modulated wave by code modulation using a modulation code based on a code sequence, and transmits the code-modulated wave to the code demodulator 4 via the transmission path 3. The code demodulator 4 receives the code-modulated wave from the code modulator 2 via the transmission path 3, and demodulates the received code-modulated wave to generate second power by code demodulation using a demodulation code based on a code sequence identical to the code sequence of the modulation code used for the code modulation. The first power is, for example, direct-current power generated by the power generator 1, and is shown as a generated current I1 in FIG. 1. The code-modulated wave is alternating-current power modulated by code modulation, and is shown as a modulated current I2 in FIG. 1. The second power is, for example, direct-current power to be supplied to the load 5, and is shown as a demodulated current I3 in FIG. 1.

The power transmission system of FIG. 1 is further provided with power meters $1m$ and $5m$. The power meter $1m$ is first power measuring means which measures an amount of the first power. More specifically, the power meter $1m$ measures an amount of direct-current power generated by the power generator 1 and transmitted from the power generator 1 to the code modulator 2. The power meter $1m$ may be provided to the power generator 1, or disposed between the power generator 1 and the code modulator 2. The power meter $5m$ is second power measuring means for measuring an amount of the second power. More specifically, the power meter $5m$ measures an amount of direct-current power transmitted from the code demodulator 4 to the load 5, and used by the load 5. The power meter $5m$ may be provided to the load 5, or may be disposed between the code demodulator 4 and the load 5. The amounts of powers measured by the power meters $1m$ and $5m$ are transmitted to the controller 10.

The controller 10 controls operations of the code modulator 2 and the code demodulator 4 based on the amounts of powers received from the power meters $1m$ and $5m$. For example, the controller 10 transmits control signals to the code modulator 2 and the code demodulator 4, the control signals including synchronization signals for synchronizing the code modulator 2 and the code demodulator 4 to each other, thus achieving code modulation and code demodulation of power in an accurately synchronized manner.

The controller 10 sets a modulation code to the code modulator 2, and a demodulation code to the code demodulator 4, based on one code sequence. The code sequence of the modulation code used for modulation by the code modulator 2, and the code sequence of the demodulation code used for demodulation by the code demodulator 4 may be set in advance to the code modulator 2 and the code demodulator 4. In addition, for example, the controller 10 may transmit, as the control signals, the code sequence of the modulation code used for modulation by the code modulator 2, and the code sequence of the demodulation code used for demodulation by the code demodulator 4. Further, the controller 10 may transmit, as the control signals, only information specifying the code sequences, without transmitting the code sequences themselves, so that the code modulator 2 and the code demodulator 4 to generates the code sequences, respectively. In this case, it is possible to achieve code modulation and code demodulation between the code modulator 2 and the code demodulator 4 corresponding to each other in an accurately synchronized manner.

Figure 2:
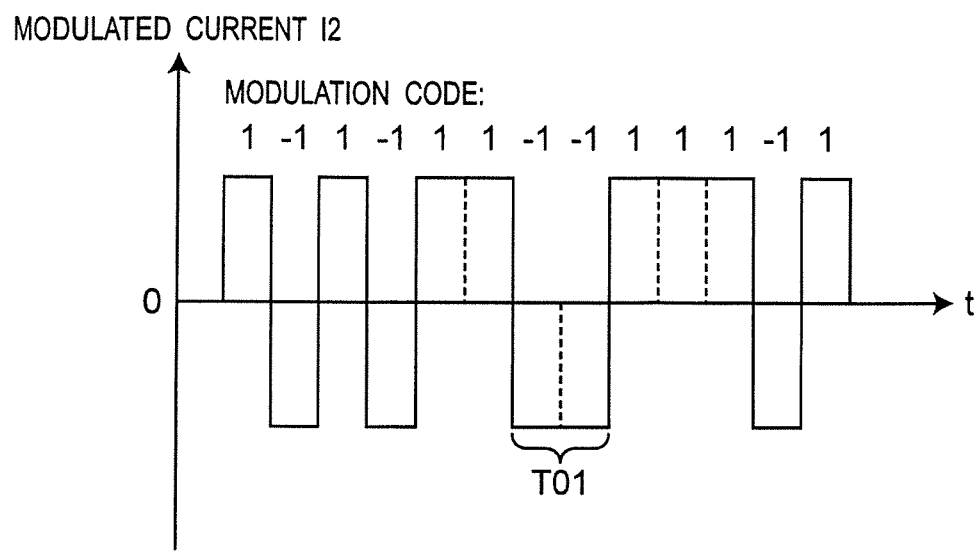
FIG. 2 is a waveform diagram showing an exemplary signal waveform of a modulated current I2 of the power transmission system of FIG. 1.

FIG. 2 is a waveform diagram showing an exemplary signal waveform of the modulated current I2 of the power transmission system of FIG. 1. In addition, FIG. 3 is a waveform diagram showing an exemplary signal waveform of a modulated current I2 of a communication system according to a comparison example.

The code modulator 2 of FIG. 1 modulates a current of power, which is generated by the power generator 1, by code modulation using a modulation code based on a predetermined code sequence. In this case, the code modulator 2 generates an alternating-current code-modulated wave made of currents flowing in directions corresponding to code values of "1" and "4", respectively, as shown in FIG. 2. This code-modulated wave can transmit power in both periods of positive current flows, and periods of negative current flows (e.g., period T01 of FIG. 2). While the first embodiment indicates an example in which direct-current power is modulated by code modulation, alternating-current power may be modulated by code modulation as in a second embodiment described below.

Figure 3:
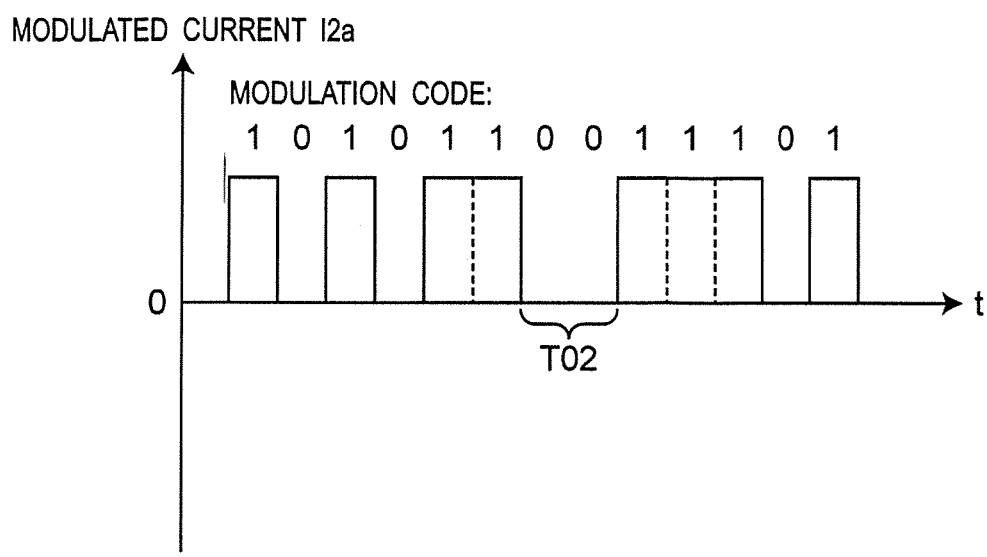
FIG. 3 is a waveform diagram showing an exemplary signal waveform of a modulated current I2 of a communication system according to a comparison example.

In the data transmission system according to the comparison example, e.g., to be used for communication, code values of "1" and "0" are typically used for code modulation, as shown in FIG. 3. However, according to the code-modulated wave as shown in FIG. 3, when the code value of the modulation code is "0" (e.g., period T02 of FIG. 3), a modulated current or voltage becomes zero, that is, a period of no power transmission occurs. Such periods of no power transmission may reduce overall power transmission efficiency. More specifically, for the case of communication, since information such as data should be transmitted in an accurately synchronized manner, it is only required that the code demodulator accurately distinguish between "0" and "1". On the other hand, for the case of power transmission, a power loss due to the period of no power transmission is not permissible from a viewpoint of efficiency in use of energy. Accordingly, by using an alternating-current code-modulated wave flowing in directions corresponding to the code values of "1" and "4", respectively, as shown in FIG. 2, it is possible to transmit power with higher transmission efficiency than that of the comparison example.

Figure 4:
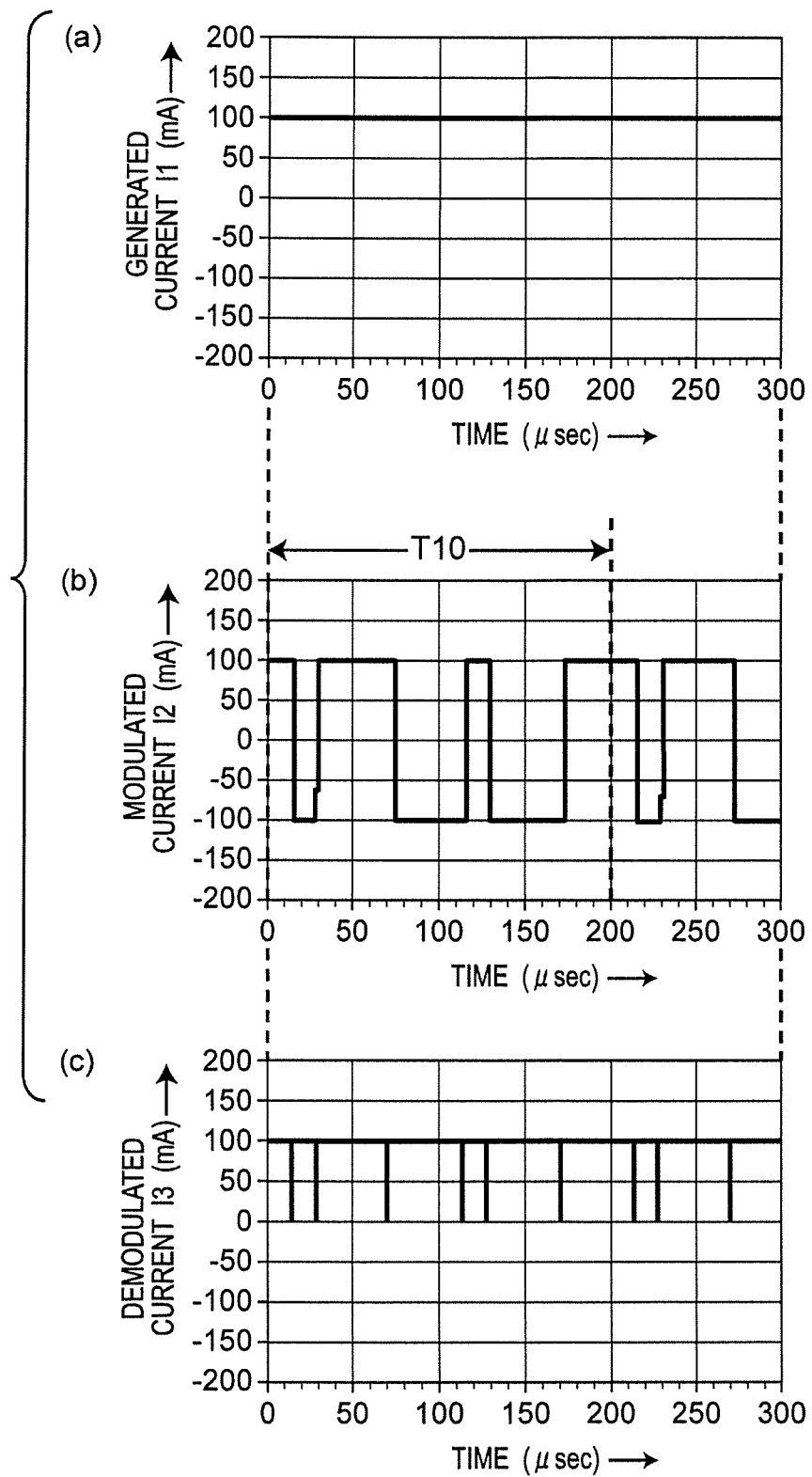
FIG. 4 is a waveform diagram showing exemplary signal waveforms in the power transmission system of FIG. 1, in which: (a) shows a signal waveform of a generated current I1; (b) shows a signal waveform of a modulated current I2; and (c) shows a signal waveform of a demodulated current I3.

FIG. 4 is a waveform diagram, where (a) to (c) show exemplary signal waveforms in the power transmission system of FIG. 1. In FIG. 4, (a) shows a signal waveform of the generated current I1, (b) shows a signal waveform of the modulated current I2, and (c) shows a signal waveform of the demodulated current I3. The power generator 1 generates the direct-current generated current I1. The code modulator 2 multiplies the generated current I1 by a modulation code m0 to generate the alternating-current modulated current I2. The code demodulator 4 multiplies the modulated current I2 by a demodulation code d0 identical to the modulation code m0 to reproduce the direct-current power generated by the power generator 1, and supply the reproduced direct-current power to the load 5.

Referring to FIG. 4, T10 indicates a period of one cycle of the modulation code m0 and the demodulation code d0. The same also applies to subsequent drawings.

According to the exemplary signal waveform of FIG. 4, the direct-current generated current I1 (FIG. 4(a)) is multiplied by the modulation code m0 having a frequency of 35 kHz, to generate the modulated current I2 (FIG. 4(b)) of the code-modulated wave. In this case, the duration of each bit of the modulation code m0 is 1/(35 kHz)/2=14.2 microseconds.

Each bit of the modulation code m0 and the demodulation code d0 has a code value "1" or "−1". The code value "1" of the modulation code m0 indicates that the code modulator 2 outputs a current in the same direction as the direction of an inputted current, and the code value "−1" of the modulation code m0 indicates that the code modulator 2 outputs a current in the direction opposite to the direction of the inputted current. Similarly, the code value "1" of the demodulation code d0 indicates that the code demodulator 4 outputs a current in the same direction as the direction of an inputted current, and the code value "−1" of the demodulation code d0 indicates that the code demodulator 4 outputs a current in the direction opposite to the direction of the inputted current.

For example, the modulation code m0 and the demodulation code d0 are given as follows.

$$m0=[1\ -1\ 1\ 1\ 1\ -1\ -1\ -1\ 1\ -1\ -1\ -1\ 1\ 1] \quad (1)$$

$$d0=m0=[1\ -1\ 1\ 1\ 1\ -1\ -1\ -1\ 1\ -1\ -1\ -1\ 1\ 1] \quad (2)$$

Subsequently, the modulated current I2 of the code-modulated wave generated by the modulation code m0 is multiplied by the demodulation code d0. This multiplication is denoted as follows.

$$m0 \times d0=[1\ 1\ 1\ 1\ 1\ 1\ 1\ 1\ 1\ 1\ 1\ 1\ 1\ 1] \quad (3)$$

As apparent from Mathematical Expression (3), the demodulated current I3 (FIG. 4(c)) is obtained, which is direct current similarly to the original generated current I1.

As described above, it is possible to achieve direct-current power transmission in an accurately synchronized manner, without power loss, by using the code modulator 2 and the code demodulator 4 according to the present embodiment. In addition, it is possible to achieve efficient power transmission for a longer period, for example, by repeatedly using the modulation code m0 and demodulation code d0 as described above.

Further, the modulation code m0 can be divided into its first half code portion m0a, and its second half code portion m0b, as follows.

$$m0a=[1\ -1\ 1\ 1\ 1\ -1\ -1] \quad (4)$$

$$m0b=[-1\ 1\ -1\ -1\ -1\ 1\ 1] \quad (5)$$

In this case, the code portion m0b is generated by inverting the sign of the code value of each bit of the code portion m0a. More specifically, when the code value of a certain bit of the code portion m0a is "1", the code value of a corresponding bit of the code portion m0b is "−1". Similarly, when the code value of a certain bit of the code portion m0a is "−1", the code value of a corresponding bit of the code portion m0b is "1".

Figure 5:
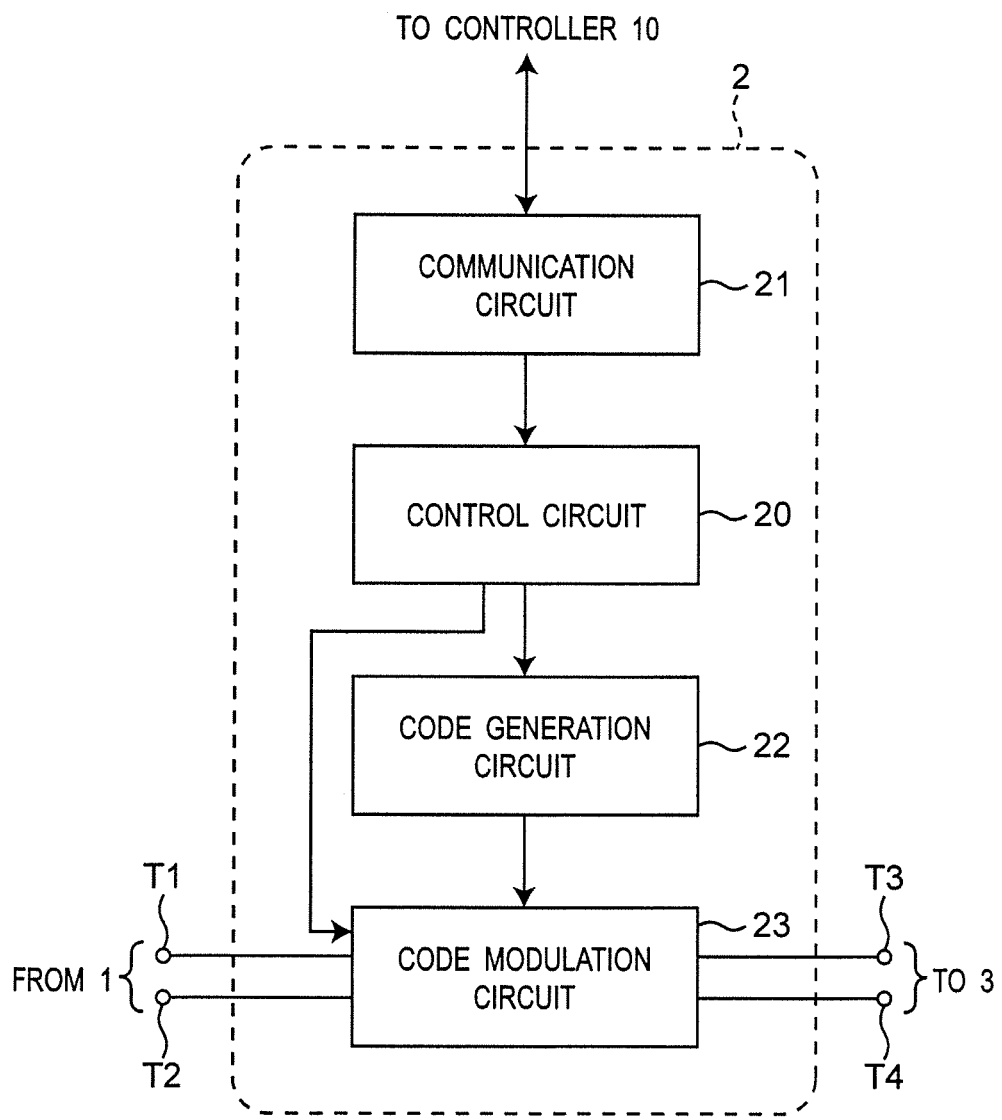
FIG. 5 is a block diagram showing a configuration of a code modulator 2 of FIG. 1.

FIG. 5 is a block diagram showing a configuration of the code modulator 2 of FIG. 1. Referring to FIG. 5, the code modulator 2 is provided with a control circuit 20, a communication circuit 21, a code generation circuit 22, and a code modulation circuit 23. The communication circuit 21 receives a synchronization signal and a control signal from the controller 10, the control signal including a code sequence itself or information specifying the code sequence, and outputs the received signals to the control circuit 20. In this case, the synchronization signal may be, for example, trigger signals to start and end modulation, or time information indicating a start time and an end time of modulation. Based on the control signal, the control circuit 20 controls the code generation circuit 22 so as to generate a modulation code based on a code sequence and output the modulation code to the code modulation circuit 23, and controls start and end of operation of the code modulation circuit 23. The code modulation circuit 23 has input terminals T1 and T2 connected to the power generator 1, and output terminals T3 and T4 connected to the transmission path 3.

Figure 6:
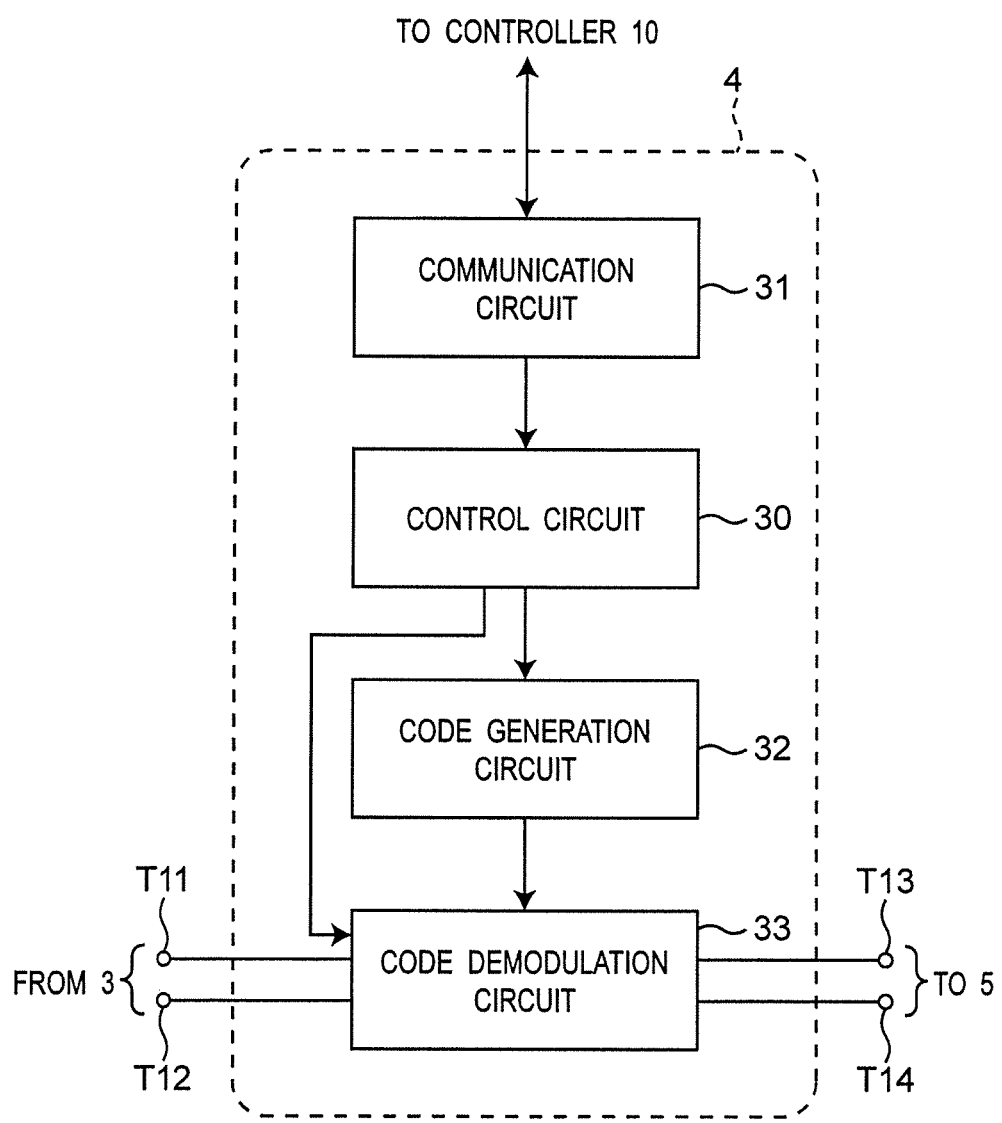
FIG. 6 is a block diagram showing a configuration of a code demodulator 4 of FIG. 1.

FIG. 6 is a block diagram showing a configuration of the code demodulator 4 of FIG. 1. Referring to FIG. 6, The code demodulator 4 is provided with a control circuit 30, a communication circuit 31, a code generation circuit 32, and a code demodulation circuit 33. The communication circuit 31 receives a synchronization signal and a control signal from the controller 10, the control signal including a code sequence itself or information specifying the code sequence, and outputs the received signals to the control circuit 30. In this case, the synchronization signal may be, for example, trigger signals to start and end demodulation, or time information indicating a start time and an end time of demodulation. Based on the control signal, the control circuit 30 controls the code generation circuit 32 so as to generate a demodulation code based on a code sequence and output the demodulation code to the code demodulation circuit 33, and controls start and end of operation of the code demodulation circuit 33. The code demodulation circuit 33 has input terminals T11 and T12 connected to the transmission path 3, and output terminals T13 and T14 connected to the load 5.

Note that in the power transmission system of FIG. 1, the control signals from the controller 10 to the code modulator 2 and the code demodulator 4 may be transmitted via control signal lines different from the transmission path 3, or may be transmitted via the transmission path 3 in a manner multiplexed with the code-modulated wave using some multiplexing scheme. In the latter case, it is possible to omit cables provided for communication from the controller 10 to the code modulator 2 and the code demodulator 4, and reduce cost.

Figure 7:
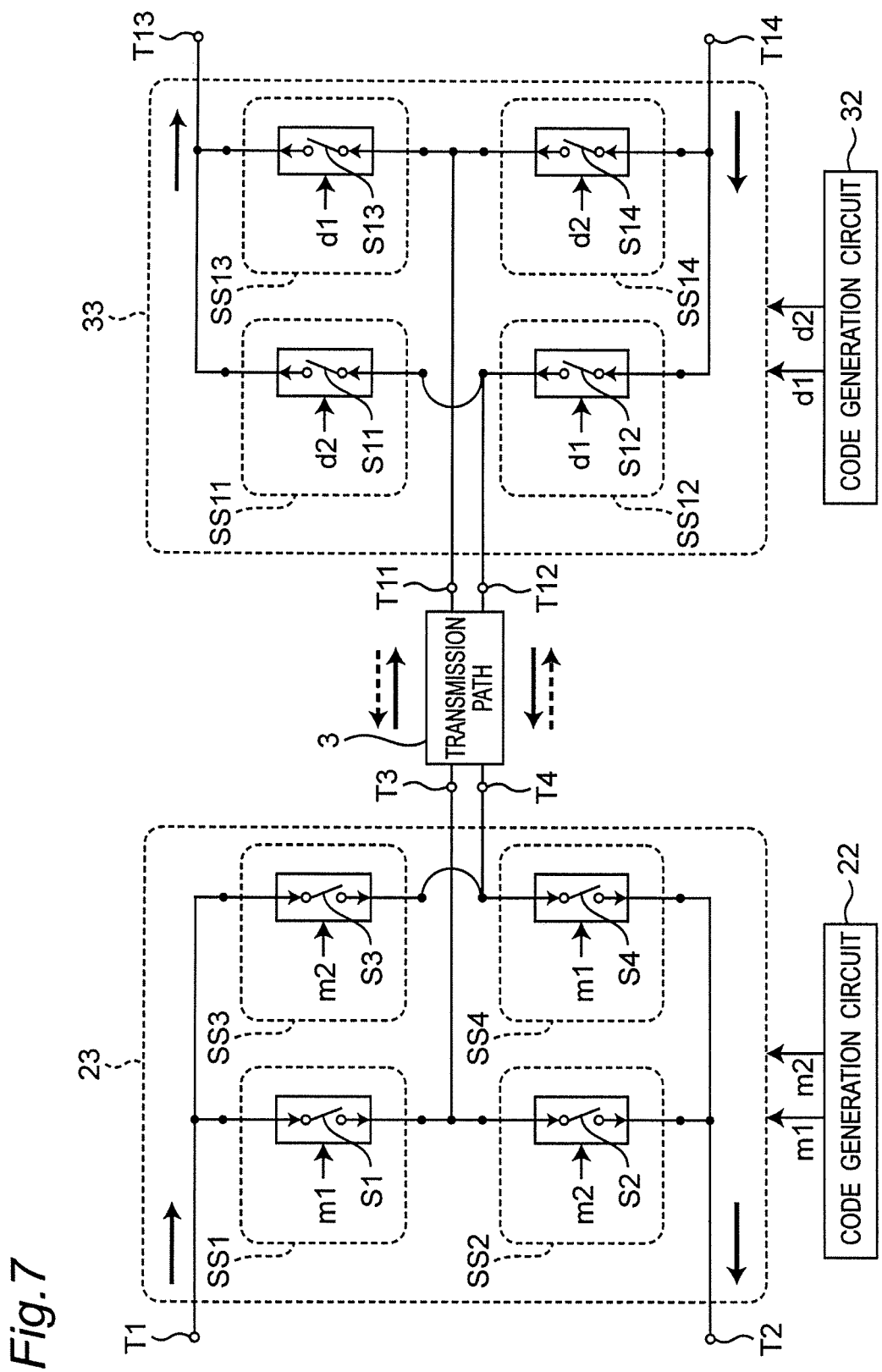
FIG. 7 is a block diagram showing configurations of a code modulation circuit 23 and a code demodulation circuit 33 of FIG. 1.

FIG. 7 is a block diagram showing configurations of the code modulation circuit 23 and the code demodulation circuit 33 of FIG. 1. Referring to FIG. 7, the code modulation circuit 23 is provided with four switch circuits SS1 to SS4 connected in a bridge configuration. The switch circuits SS1 to SS4 include unidirectional switch elements S1 to S4, respectively, each made of, for example, a metal-oxide-semiconductor (MOS) transistor. In addition, the code demodulation circuit 33 is provided with four switch circuits SS11 to SS14 connected in a bridge configuration. The switch circuits SS11 to SS14 include unidirectional switch elements S11 to S14, respectively, each made of, for example, an MOS transistor.

The code generation circuit 22 generates and outputs the modulation codes m1 and m2 to the code modulation circuit 23 under control of the control circuit 20, in order to operate the code modulator 2 according to the modulation code m0 as described above. The switch elements S1 and S4 of the code modulation circuit 23 are controlled according to the modulation code m1, and the switch elements S2 and S3 of the code modulation circuit 23 are controlled according to the modulation code m2. Each of the modulation codes m1 and m2 has code values "1" and "0". For example, when a signal of the code value "1" is inputted to each of the switch elements S1 to S4, each of the switch elements S1 to S4 is turned on. When a signal of the code value "0" is inputted to each of the switch elements S1 to S4, each of the switch elements S1 to S4 is turned off. Note that switch elements other than the switch elements S1 to S4 described in the present description operate in a similar manner. In this case, the switch elements S1 to S4 have directionality as follows. When the switch element S1 is turned on, the switch element S1 outputs a generated current inputted from the terminal T1, to the terminal T3. When the switch element S3 is turned on, the switch element S3 outputs a generated current inputted from the terminal T1, to the terminal T4. When the switch element S2 is turned on, the switch element S2 outputs a modulated current inputted from the terminal T3, to the terminal T2. When the switch element S4 is turned on, the switch element S4 outputs a modulated current inputted from the terminal T4, to the terminal T2.

The code generation circuit 32 generates and outputs the demodulation codes d1 and d2 to the code demodulation circuit 33 under control of the control circuit 30, in order to operate the code demodulator 4 according to the demodulation code d0 as described above. The switch elements S11 and S14 of the code demodulation circuit 33 are controlled according to the demodulation code d2, and the switch elements S12 and S13 of the code demodulation circuit 33 are controlled according to the demodulation code d1. Each of the demodulation codes d1 and d2 has code values "1" and "0". In this case, the switch elements S11 to S14 have directionality as described below. When the switch element S11 is turned on, the switch element S11 outputs a modulated current inputted from the terminal T12, to the terminal T13. When the switch element S13 is turned on, the switch element S13 outputs a modulated current inputted from the terminal T11, to the terminal T13. When the switch element S12 is turned on, the switch element S12 outputs a demodulated current inputted from the terminal T14, to the terminal T12. When the switch element S14 is turned on, the switch element S14 outputs a demodulated current inputted from the terminal T14, to the terminal T11.

In the notation of FIG. 7, directions of current flows in the switch elements S11 to S14 of the code demodulator 4 are opposite to directions of current flows in the switch elements S1 to S4 of the code modulator 2.

Figure 8A:
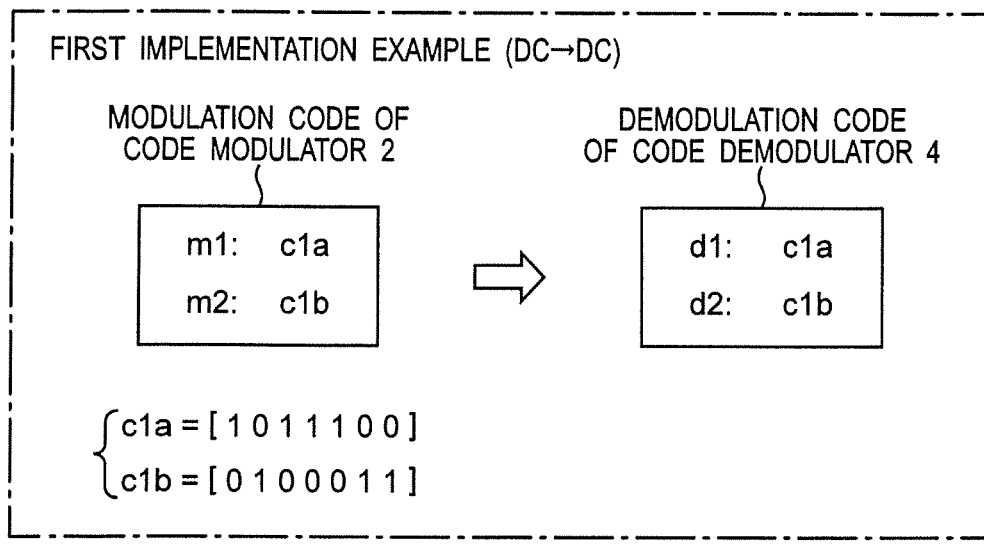
FIG. 8A is a diagram showing an example of a modulation code of the code modulator 2 and a demodulation code of the code demodulator 4 in the power transmission system of FIG. 1, as a first implementation example in which direct-current power is transmitted and received.

FIG. 8A is a diagram showing an example of a modulation code of the code modulator 2 and a demodulation code of the code demodulator 4 in the power transmission system of FIG. 1, as a first implementation example in which direct-current power is transmitted and received. More specifically, FIG. 8A shows an example of the modulation codes m1 and m2 inputted to the switch elements S1 to S4 of the code modulator 2, and the demodulation codes d1 and d2 inputted to the switch elements S11 to S14 of the code demodulator 4.

As shown in FIG. 8A, the modulation code m1 and the demodulation code d1 are identical to each other, and each is made of a code sequence c1a. In addition, the modulation code m2 and the demodulation code d2 are identical to each other, and each is made of a code sequence c1*b*. In addition, the code sequences c1*a* and c1*b* are configured such that when the code value of a certain bit of the code sequence c1*a* is "1", the code value of a corresponding bit of the code sequence c1*b* is "0"; and when the code value of a certain bit of the code sequence c1*a* is "0", the code value of a corresponding bit of the code sequence c1*b* is "1".

Accordingly, among the switch elements S1 to S4 and S11 to S14 of FIG. 7, when a switch element receiving the code value of a certain bit of the code sequence c1*a* is turned on, the switch element receiving the code value of a corresponding bit of the code sequence c1*b* is turned off. In addition, when the switch element receiving the code value of a certain bit of the code sequence c1*a* is turned off, the switch element receiving the code value of a corresponding bit of the code sequence c1*b* is turned on.

According to the code modulation circuit 23 of FIG. 7, when the switch elements S1 and S4 are turned on, the switch elements S2 and S3 are turned off; and when the switch elements S1 and S4 are turned off, the switch elements S2 and S3 are turned on. Thus, when the switch elements S1 and S4 are turned on, and the switch elements S2 and S3 are turned off, the modulated current I2 flows in the transmission path 3 in a positive direction, i.e., in a direction of solid arrows. On the other hand, when the switch elements S1 and S4 are turned off, and the switch elements S2 and S3 are turned on, the modulated current I2 flows in the transmission path 3 in a negative direction, i.e., in a direction of dotted arrows. Accordingly, as shown in FIG. 4, when the direct-current generated current I1 is inputted to the code modulator 2, the alternating-current modulated current I2 can be transmitted to the transmission path 3.

In the code demodulation circuit 33 of FIG. 7, the switch elements S11 to S14 are turned on or off in response to the demodulation codes d1 and d2 in synchronization with the code modulation circuit 23. In this case, the switch elements S12 and S13 are turned on or off in accordance with the demodulation code d1 identical to the modulation code m1, and the switch elements S11 and S14 are turned on or off in accordance with the demodulation code d2 identical to the modulation code m2. Thus, when the code value of the modulation code m1 is "1", and the code value of the modulation code m2 is "0", i.e., when the modulated current I2 flows in the transmission path 3 in the positive direction, the code value of the demodulation code d1 is "1", and the code value of the demodulation code d2 is "0". Accordingly, by turning on the switch elements S13 and S12 and turning off the switch elements S11 and S14, the demodulated current I3 flows at the output terminals T13 and T14 of the code demodulation circuit 33 in the positive direction, i.e., in the direction of the solid arrows. On the other hand, when the code value of the modulation code m1 is "0", and the code value of the modulation code m2 is "1", i.e., when the modulated current I2 flows in the transmission path 3 in the negative direction, the code value of the demodulation code d1 is "0", and the code value of the demodulation code d2 is "1". Accordingly, by turning on the switch elements S11 and S14 and turning off the switch elements S12 and S13, the demodulated current I3 again flows at the output terminals T13 and T14 of the code demodulation circuit 33 in the positive direction, i.e., in the direction of the solid arrows.

As described above, when using the modulation codes m1 and m2 and the demodulation codes d1 and d2 of FIG. 8A, equivalently, the code modulator 2 operates according to the modulation code m0 of Mathematical Expression (1), and the code demodulator 4 operates according to the demodulation code d0 of Mathematical Expression (2).

As described above, according to FIGS. 7 and 8A, when the direct-current generated current I1 is inputted to the code modulator 2, it is possible to extract the demodulated current I3 from the code demodulator 4, the demodulated current I3 being also a direct current similarly to the generated current I1 inputted to the code modulator 2. Therefore, according to the first embodiment, it is possible to modulate the direct-current generated current I1 by code modulation into the alternating-current modulated current I2, and then, transmit the modulated current I2 via the transmission path 3, and then, demodulate the modulated current I2 into the direct-current demodulated current I3.

Figure 8B:
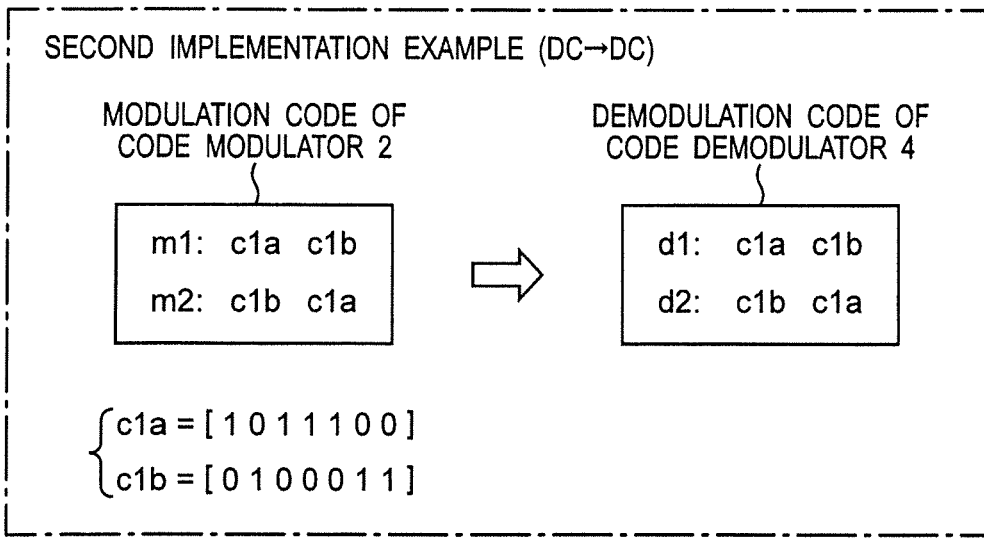
FIG. 8B is a diagram showing an example of a modulation code of the code modulator 2 and a demodulation code of the code demodulator 4 in the power transmission system of FIG. 1, as a second implementation example in which direct-current power is transmitted and received.

FIG. 8B is a diagram showing an example of a modulation code of the code modulator 2 and a demodulation code of the code demodulator 4 in the power transmission system of FIG. 1, as a second implementation example in which direct-current power is transmitted and received. When in each of the code sequences c1*a* and c1*b*, the number of bits of the code value "1" is equal to the number of bits of the code value "0", the modulated current I2 being modulated by code modulation and flowing in the transmission path 3 includes, in average, no direct-current component, but includes only an alternating-current component. However, in some code sequence, the number of bits of the code value "1" is different from the number of bits of the code value "0", and thus, a direct-current component occurs. When using such a code sequence, by concatenating the code sequence with a code sequence of bits having code values inverted from those of corresponding bits, respectively, it is possible to generate a modulation code and a demodulation code, in each of which the number of bits of the code value "1" is equal to the number of bits of the code value "0". According to the example of FIG. 8B, each of the modulation code m1 and the demodulation code d1 is a code sequence [c1*a* c1*b*] which is a concatenation of the code sequence c1*a* and the code sequence c1*b*, and each of the modulation code m2 and the demodulation code d2 is a code sequence [c1*b* c1*a*] which is a concatenation of the code sequence c1*b* and the code sequence c1*a*. As a result, the average value of the code-modulated current I2 flowing in the transmission path 3 becomes zero, and the modulated current I2 includes only an alternating-current component.

Note that the power generator 1 or the load 5 may be a power storage apparatus, such as a battery and a capacitor. When a power storage apparatus is incorporated in the power transmission system according to the present embodiment, it is possible to effectively utilize power generated during hours of low or no power consumption, and thus, improve overall power efficiency.

Second Embodiment

In the first embodiment, we have described the power transmission system which modulates and transmits a direct-current generated current by code modulation. Meanwhile, in a second embodiment, we describe a power transmission system which modulates and transmits a single-phase alternating-current generated current by code modulation.

The power transmission system according to the second embodiment includes a code modulator 2A and a code demodulator 4A, which will be described below with reference to FIGS. 10 and 11, in place of the code modulator 2 and the code demodulator 4 of FIG. 1. The other portions of the power transmission system according to the second embodiment are configured in a manner similar to that of the power transmission system according to the first embodiment.

Figure 9:
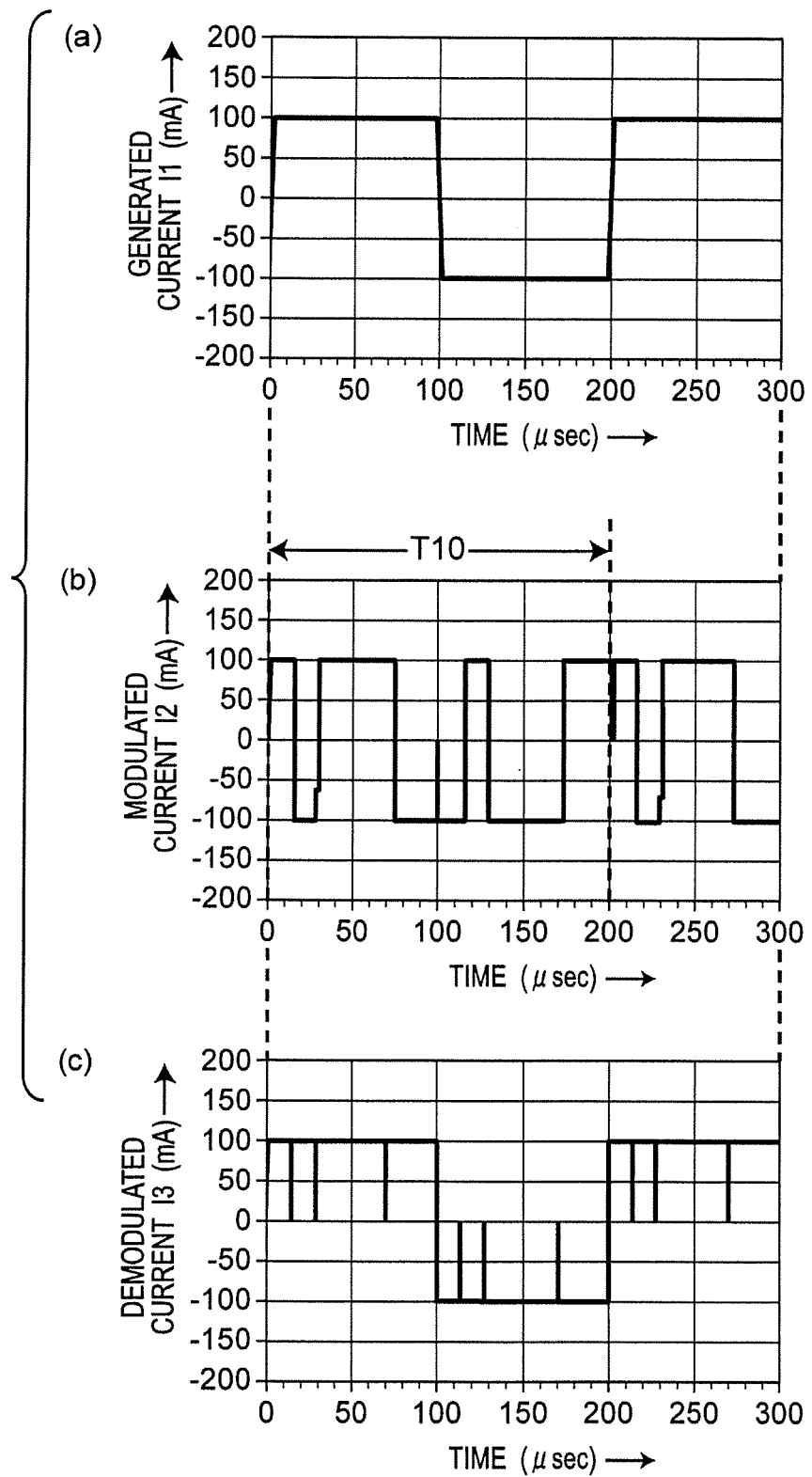
FIG. 9 is a waveform diagram showing exemplary signal waveforms in the power transmission system according to a second embodiment, in which: (a) shows a signal waveform of a generated current I1; (b) shows a signal waveform of a modulated current I2; and (c) shows a signal waveform of a demodulated current I3.

FIG. 9 is a waveform diagram, where (a) to (c) show exemplary signal waveforms in the power transmission system according to the second embodiment. In FIG. 9, (a) shows a signal waveform of a generated current I1; (b) shows a signal waveform of a modulated current I2; and (c) shows a signal waveform of a demodulated current I3. More specifically, FIG. 9 shows exemplary signal waveforms generated as follows: the code modulator 2A modulates the (single-phase) alternating-current generated current I1 by code modulation, and then, the modulated current I2 is transmitted via a transmission path 3, and then, the code demodulator 4A demodulates the modulated current I2 by code demodulation.

The power generator 1 generates the alternating-current generated current I1. For example, the alternating-current generated current I1 has a rectangular waveform at a frequency of 5 kHz, which cyclically repeats positive and negative periods every 200 microseconds. Also in this case, the code modulator 2A multiplies the generated current I1 by a modulation code m0 to generate the alternating modulated current I2, in a manner similar to the code modulation of the direct-current generated current I1 as shown in FIG. 4. The code demodulator 4A multiplies the modulated current I2 by a demodulation code d0 identical to the modulation code m0 to reproduce the alternating-current power generated by the power generator 1, and supply the reproduced alternating-current power to a load 5.

The frequency of the modulation code m0 and the demodulation code d0 is set to frequencies higher than the frequency of the generated current I1 and the frequency of the demodulated current I3. According to the exemplary signal waveform of FIG. 9, the alternating-current generated current I1 (FIG. 9(a)) is multiplied by the modulation code m0 having a frequency of 35 kHz to generate the modulated current I2 (FIG. 9(b)) of the code-modulated wave. In this case, the duration of each bit of the modulation code m0 is 1/(35 kHz)/2=14.2 microseconds.

Each bit of the modulation code m0 and the demodulation code d0 has a code value "1" or "−1". In case of transmission of the alternating-current generated current I1, the meaning of the code value "1" or "−1" in a period when the generated current I1 is positive (period from 0 to 100 microsecond in FIG. 9(a)) is different from that of a period when the generated current I1 is negative (period from 100 to 200 microsecond in FIG. 9(a)). In the period when the generated current I1 is positive, the code value "1" of the modulation code m0 indicates that the code modulator 2A outputs a current in the same direction as the direction of an inputted current, and the code value "4" of the modulation code m0 indicates that the code modulator 2A outputs a current in the direction opposite to the direction of an inputted current. Similarly, in the period when the generated current I1 is positive, the code value "1" of the demodulation code d0 indicates that the code demodulator 4A outputs a current in the same direction as the direction of an inputted current, and the code value "−1" of the demodulation code d0 indicates that the code demodulator 4A outputs a current in the direction opposite to the direction of an inputted current. In the period when the generated current I1 is negative, the code value "1" of the modulation code m0 indicates that the code modulator 2A outputs a current in the direction opposite to the direction of an inputted current, and the code value "−1" of the modulation code m0 indicates that the code modulator 2A outputs a current in the same direction as the direction of an inputted current. Similarly, in the period when the generated current I1 is negative, the code value "1" of the demodulation code d0 indicates that the code demodulator 4A outputs a current in the direction opposite to the direction of an inputted current, and the code value "−1" of the demodulation code d0 indicates that the code demodulator 4A outputs a current in the same direction as the direction of an inputted current.

For example, the modulation code m0 and the demodulation code d0 are given as follows.

$$m0=[1\ -1\ 1\ 1\ 1\ -1\ -1\ -1\ 1\ -1\ -1\ -1\ 1\ 1] \tag{6}$$

$$d0=m0=[1\ -1\ 1\ 1\ 1\ -1\ -1\ -1\ 1\ -1\ -1\ -1\ 1\ 1] \tag{7}$$

Similarly to the code demodulation according to the first embodiment, the modulated current I2 of the code-modulated wave generated by the modulation code m0 is multiplied by the demodulation code d0. This multiplication is denoted as follows.

$$m0 \times d0=[1\ 1\ 1\ 1\ 1\ 1\ 1\ 1\ 1\ 1\ 1\ 1\ 1\ 1] \tag{8}$$

As apparent from Mathematical Expression (8), the demodulated current I3 (FIG. 8(c)) is obtained, which is an alternating current similarly to the original generated current I1.

As described above, it is possible to achieve power transmission in an accurately synchronized manner, without power loss, by using the method of code modulation and code demodulation according to the present embodiment. In addition, it is possible to achieve efficient power transmission for a longer period, for example, by repeatedly using the modulation code m0 and demodulation code d0 as described above.

Figure 10:
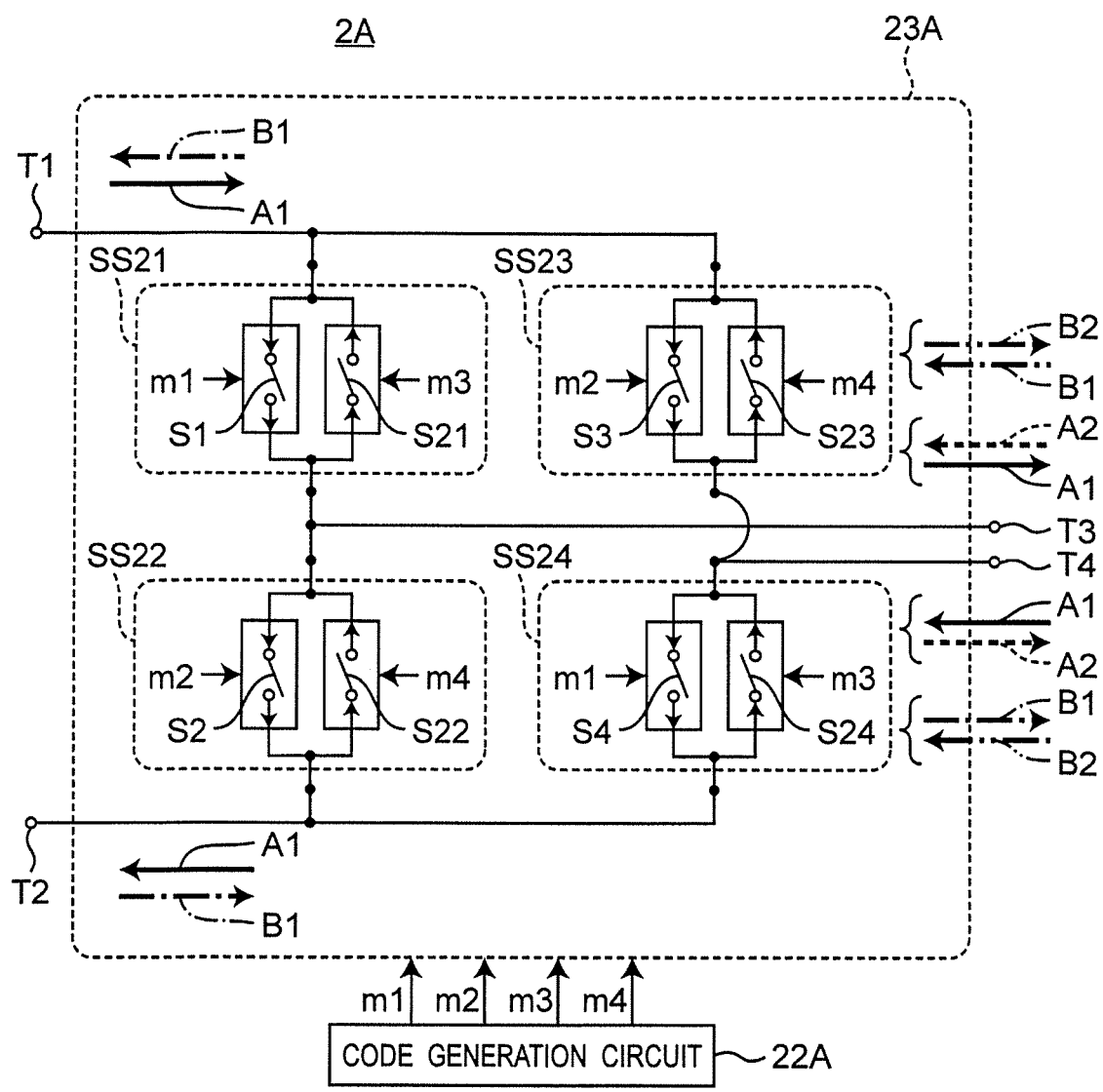
FIG. 10 is a block diagram showing a partial configuration of a code modulator 2A of the power transmission system according to the second embodiment.

FIG. 10 is a block diagram showing a partial configuration of the code modulator 2A of the power transmission system according to the second embodiment. The code modulator 2A of FIG. 10 is provided with a code generation circuit 22A and a code modulation circuit 23A, in place of the code generation circuit 22 and the code modulation circuit 23 of FIG. 5. The code modulator 2A of FIG. 10 is further provided with a control circuit 20 and a communication circuit 21 similarly to the code modulator 2 of FIG. 5, which are omitted in FIG. 10 for ease of illustration.

The code generation circuit 22A and the code modulation circuit 23A of FIG. 10 are different from the code generation circuit 22 and the code modulation circuit 23 of FIG. 7 in following points.

(1) The code generation circuit 22A generates four modulation codes m1 to m4 in place of the two modulation codes m1 and m2, and outputs the generated modulation codes m1 to m4 to the code modulation circuit 23A.

(2) The code modulation circuit 23A is provided with four bidirectional switch circuits SS21 to SS24 connected in a bridge configuration, in place of the unidirectional switch circuits SS1 to SS4.

The code generation circuit 22A generates and outputs the modulation codes m1 to m4 to the code modulation circuit 23A under control of the control circuit 20, in order to operate the code modulator 2A according to the modulation code m0 as described above. Each of the modulation codes m1 to m4 has code values "1" and "0".

In the code modulation circuit 23A, the switch circuit SS21 is provided with the switch element S1 of FIG. 7 to be turned on and off in response to the modulation code m1, and further provided with a switch element S21 having directionality opposite to that of the switch element S1, connected in parallel to the switch element S1, and to be turned on and off in response to the modulation code m3. The switch circuit SS22 is provided with the switch element S2 of FIG. 7 to be turned on and off in response to the modulation code m2, and further provided with a switch element S22 having directionality opposite to that of the switch element S2, connected in parallel to the switch element S2, and to be turned on and off in response to the modulation code m4. The switch circuit SS23 is provided with the switch element S3 of FIG. 7 to be turned on and off in response to the modulation code m2, and further provided with a switch element S23 having directionality opposite to that of the switch element S3, connected in parallel to the switch element S3, and to be turned on and off in response to the modulation code m4. The switch circuit SS24 is provided with the switch element S4 of FIG. 7 to be turned on and off in response to the modulation code m1, and further provided with a switch element S24 having directionality opposite to that of the switch element S4, connected in parallel to the switch element S4, and to be turned on and off in response to the modulation code m3. Each of the switch elements S21 to S24 is made of, for example, an MOS transistor. The code modulation circuit 23A has terminals T1 and T2 connected to a power generator 1, and terminals T3 and T4 connected to the transmission path 3. Alternating-current power is inputted from the power generator 1 to the code modulation circuit 23A. The code modulation circuit 23A modulates the alternating-current power by code modulation, and then, outputs a code-modulated wave to the transmission path 3.

Figure 11:
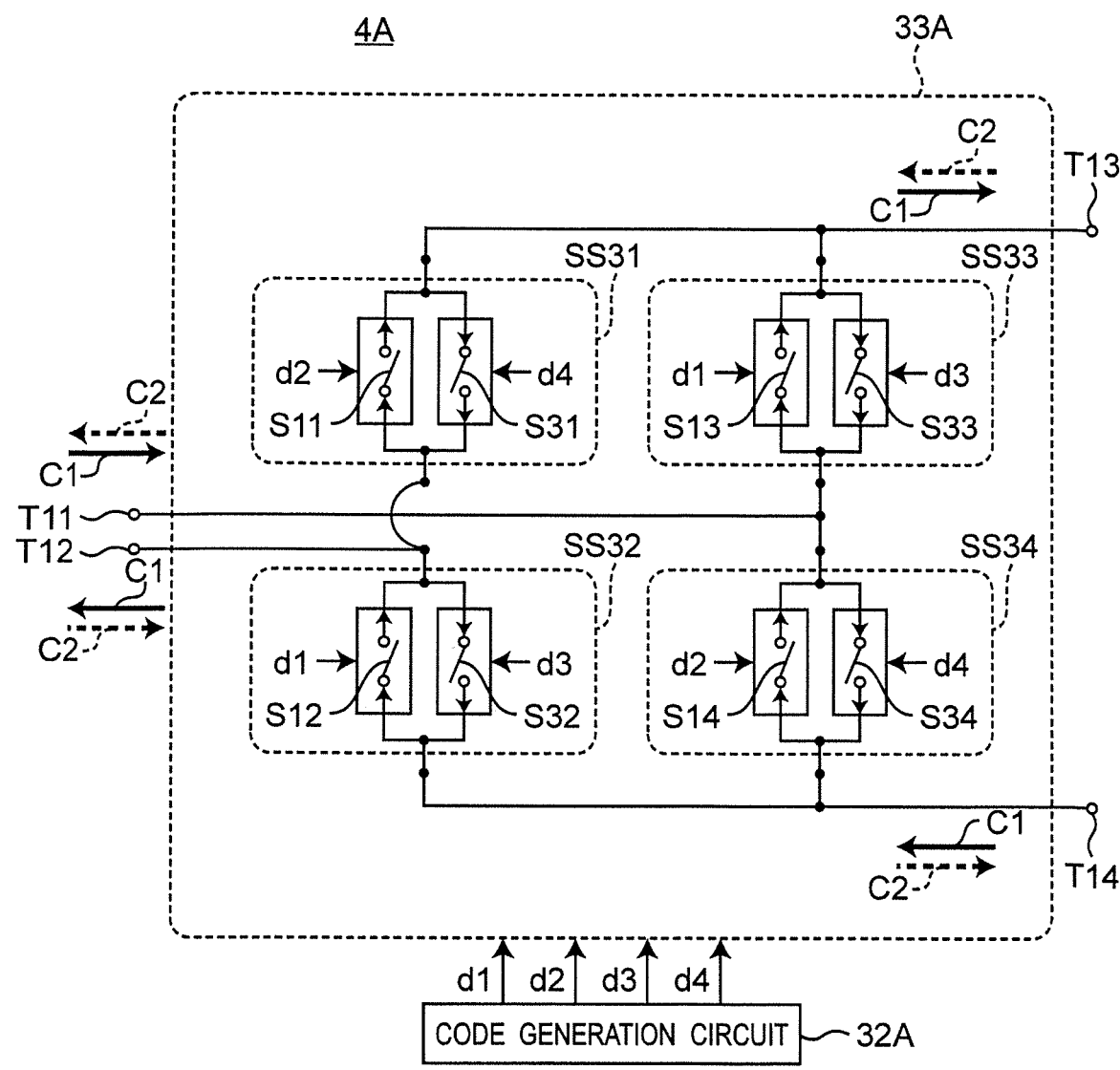
FIG. 11 is a block diagram showing a partial configuration of a code demodulator 4A of the power transmission system according to the second embodiment.

FIG. 11 is a block diagram showing a partial configuration of the code demodulator 4A of the power transmission system according to the second embodiment. The code demodulator 4A of FIG. 11 is provided with a code generation circuit 32A and a code demodulation circuit 33A, in place of the code generation circuit 32 and the code demodulation circuit 33 of FIG. 6. The code demodulator 4A of FIG. 11 is further provided with a control circuit 30 and a communication circuit 31 similarly to the code demodulator 4 of FIG. 5, which are omitted in FIG. 11 for ease of illustration.

The code generation circuit 32A and the code demodulation circuit 33A of FIG. 11 are different from the code generation circuit 32 and the code demodulation circuit 33 of FIG. 7 in following points.

(1) The code generation circuit 32A generates four demodulation codes d1 to d4 in place of the two modulation codes d1 and d2, and outputs the generated demodulation codes d1 to d4 to the code demodulation circuit 33A.
(2) The code demodulation circuit 33A is provided with four bidirectional switch circuits SS31 to SS34 connected in a bridge configuration, in place of the unidirectional switch circuits SS11 to SS14.

The code generation circuit 32A generates and outputs the demodulation codes d1 to d4 to the code demodulation circuit 33A under control of the control circuit 30, in order to operate the code demodulator 4A according to the demodulation code d0 as described above. Each of the demodulation codes d1 and d4 has code values "1" and "0".

In the code demodulation circuit 33A, the switch circuit SS31 is provided with the switch element S11 of FIG. 7 to be turned on and off in response to the demodulation code d2, and further provided with a switch element S31 having directionality opposite to that of the switch element S11, connected in parallel to the switch element S11, and to be turned on and off in response to the demodulation code d4. The switch circuit SS32 is provided with the switch element S12 of FIG. 7 to be turned on and off in response to the demodulation code d1, and further provided with a switch element S32 having directionality opposite to that of the switch element S12, connected in parallel to the switch element S12, and to be turned on and off in response to the demodulation code d3. The switch circuit SS33 is provided with the switch element S13 of FIG. 7 to be turned on and off in response to the demodulation code d1, and further provided with a switch element S33 having directionality opposite to that of the switch element S13, connected in parallel to the switch element S13, and to be turned on and off in response to the demodulation code d3. The switch circuit SS34 is provided with the switch element S14 of FIG. 7 to be turned on and off in response to the demodulation code d2, and further provided with a switch element S34 having directionality opposite to that of the switch element S14, connected in parallel to the switch element S14, and to be turned on and off in response to the demodulation code d4. Each of the switch elements S31 to S34 is made of, for example, an MOS transistor. The code demodulation circuit 33A has terminals T11 and T12 connected to the transmission path 3, and terminals T13 and T14 connected to the load 5. An alternating-current code-modulated wave is inputted from the transmission path 3 to the code demodulation circuit 33A. The code demodulation circuit 33A demodulates the code-modulated wave by code demodulation into alternating-current demodulated power, and then outputs the demodulated power to the load 5.

Figure 12A:
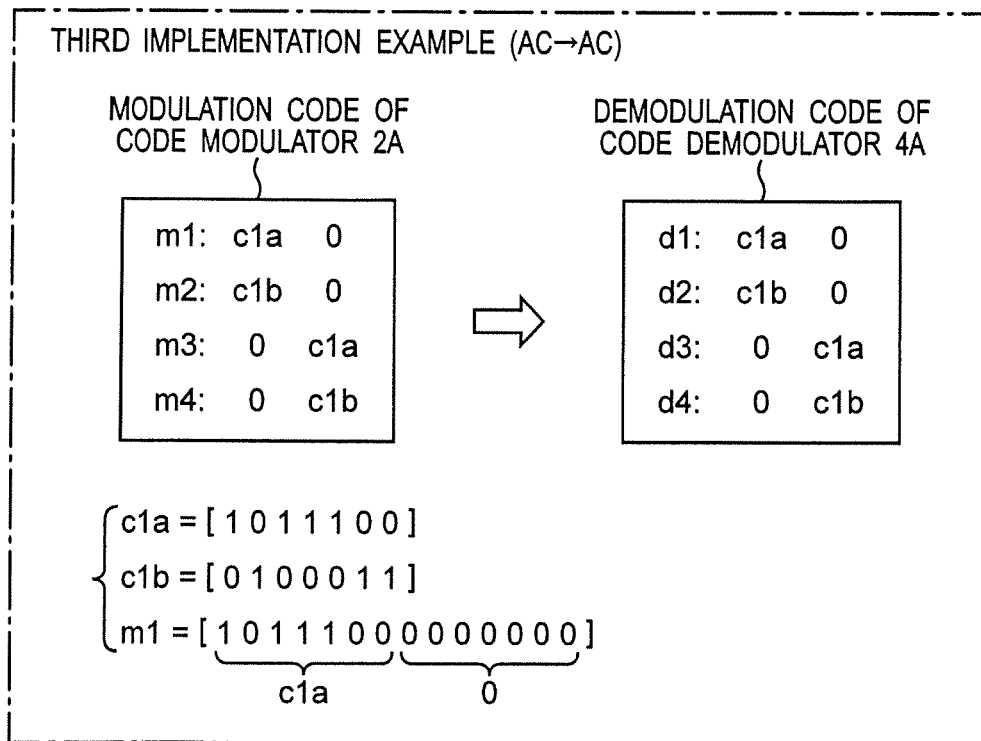
FIG. 12A is a diagram showing an example of a modulation code of the code modulator 2A and a demodulation code of the code demodulator 4A in the power transmission system according to the second embodiment, as a third implementation example in which alternating-current power is transmitted and received.

FIG. 12A is a diagram showing an example of a modulation code of the code modulator 2A and a demodulation code of the code demodulator 4A in the power transmission system according to the second embodiment, as a third implementation example in which alternating-current power is transmitted and received. More specifically, FIG. 12A shows an example of the modulation codes m1 to m4 inputted to the bidirectional switch circuits SS21 to SS24 of the code modulation circuit 23A, and the demodulation codes d1 to d4 inputted to the bidirectional switch circuits SS31 to SS34 of the code demodulation circuit 33A.

As shown in FIG. 12A, the modulation code m1 and the demodulation code d1 are identical to each other, and the modulation code m2 and the demodulation code d2 are identical to each other. Similarly, the modulation code m3 and the demodulation code d3 are identical to each other, and the modulation code m4 and the demodulation code d4 are identical to each other. In addition, similarly to the case of direct-current power transmission, code sequences $c1a$ and $c1b$ are configured such that when the code value of a certain bit of the code sequence $c1a$ is "1", the code value of a corresponding bit of the code sequence $c1b$ is "0"; and when the code value of a certain bit of the code sequence $c1a$ is "0", the code value of a corresponding bit of the code sequence $c1b$ is "1".

FIG. 12A shows a case in which the duration of the code sequence $c1a$ and the code sequence $c1b$ is set to be equal to a half of the cycle of the alternating-current generated current I1. In a period when the alternating-current generated current I1 flows in the positive direction (in example of FIG. 12A, first half period of each cycle), the modulation codes m1 and m2 are the code sequences $c1a$ and $c1b$, respectively, and on the other hand, all code values of the modulation codes m3 and m4 are "0". In a period when the alternating-current generated current I1 flows in the negative direction (in example of FIG. 12A, second half period of each cycle), all the code values of the modulation codes m1 and m2 are "0", and on the other hand, the modulation codes m3 and m4 are the code sequences $c1a$ and $c1b$, respectively.

Each of the modulation codes m1 to m4 for one cycle is generated by concatenating bits for a first half of each cycle with bits for a second half of each cycle. Accordingly, in the first half of each cycle, the switch elements S1 to S4 are turned on and off according to the modulation codes m1 and m2, and on the other hand, the switch elements S21 to S24 are disconnected and no current flows. In addition, in the second half of each cycle, the switch elements S1 to S4 are disconnected and no current flows, and on the other hand, the switch elements S21 to S24 are turned on and off according to the modulation codes m3 and m4. Similarly to the modulation codes m1 to m4, each of the demodulation codes d1 to d4 for one cycle is generated by concatenating bits for the first half of each cycle with bits for the second half of each cycle.

Now, operation of the code modulation circuit 23A is described.

At first, operation is described for a case in which the generated current I1 flows at the input terminals T1 and T2 in the positive direction, i.e., in a direction of solid arrows A1. In this case, when the switch elements S1 and S4 receiving the code value "1" of the modulation code m1 are turned on, the switch elements S2 and S3 receiving the code value "0" of the modulation code m2 are turned off. In addition, when the switch elements S1 and S4 receiving the code value "0" of the modulation code m1 are turned off, the switch elements S2 and S3 receiving the code value "1" of the modulation code m2 are turned on. Thus, when the switch elements S1 and S4 are turned on, and the switch elements S2 and S3 are turned off, the modulated current I2 flows in the transmission path 3 in a positive direction, i.e., in a direction of the solid arrows A1. On the other hand, when the switch elements S1 and S4 are turned off, and the switch elements S2 and S3 are turned on, the modulated current I2 flows in the transmission path 3 in a negative direction, i.e., in a direction of dotted arrows A2. Accordingly, when the current of positive period of the alternating-current generated current I1 is inputted to the code modulation circuit 23A, it is possible to transmit the alternating-current modulated current I2 to the transmission path 3, as shown in FIG. 9(b).

Next, operation is described for a case in which the generated current I1 flows at the input terminals T1 and T2 in a negative direction, i.e., in a direction of chain arrows B1. In this case, when the switch elements S21 and S24 receiving the code value "1" of the modulation code m3 are turned on, the switch elements S22 and S23 receiving the code value "0" of the modulation code m4 are turned off. In addition, when the switch elements S21 and S24 receiving the code value "0" of the modulation code m3 are turned off, the switch elements S22 and S23 receiving the code value "1" of the modulation code m4 are turned on. Thus, when the switch elements S21 and S24 are turned on, and the switch elements S22 and S23 are turned off, the modulated current I2 flows in the transmission path 3 in a negative direction, i.e., in a direction of the chain arrows B1. On the other hand, when the switch elements S21 and S24 are turned off, and the switch elements S22 and S23 are turned on, the modulated current I2 flows in the transmission path 3 in a positive direction, i.e., in a direction of two-dot chain arrows B2. Accordingly, when the current of negative period of the alternating-current generated current I1 is inputted to the code modulation circuit 23A, it is possible to transmit the alternating-current modulated current I2 to the transmission path 3, as shown in FIG. 9(b).

As described with reference to FIG. 10, the code modulation circuit 23A can generate the alternating-current modulated current I2, as shown in FIG. 9(b), in both the positive and negative periods of the alternating-current generated current I1.

Next, operation of the code demodulation circuit 33A of FIG. 11 is described.

At first, we consider a case in which the generated current I1 flows at the input terminals T1 and T2 of the code modulation circuit 23A in the positive direction, i.e., in the direction of the solid arrows A1. In this case, the alternating-current modulated current I2 flowing in the positive and negative directions is inputted to the input terminals T11 and T12 of the code demodulation circuit 33A via the transmission path 3. When the code demodulation circuit 33A correctly performs demodulation operation, the demodulated current I3 flows at the output terminals T13 and T14 of the code demodulation circuit 33A in a positive direction, i.e., in a direction of solid arrows C1. These operations are described below. In this case, all code values of the demodulation code d3 and the demodulation code d4 are "0", and all the switch elements S31 to S34 are turned off.

At first, operation of the code demodulation circuit 33A is described for a case in which the generated current I1 flows at the input terminals T1 and T2 of the code modulation circuit 23A in the positive direction, and the modulated current I2 flows at the input terminals T11 and T12 of the code demodulation circuit 33A in the positive direction, i.e., in the direction of the solid arrows C1. In this case, the code value of the code sequence c1a is "1", and the code value of the code sequence c1b is "0". Accordingly, the switch elements S12 and S13 receiving the code value "1" of the demodulation code d1 are turned on, and the switch elements S11 and S14 receiving the code value "0" of the demodulation code d2 are turned off. Therefore, the demodulated current I3 flows at the output terminals T13 and T14 in the positive direction, i.e., in the direction of the solid arrows C1.

Next, operation of the code demodulation circuit 33A is described for a case in which the generated current I1 flows at the input terminals T1 and T2 of the code modulation circuit 23A in the positive direction, and the modulated current I2 flows at the input terminals T11 and T12 of the code demodulation circuit 33A in the negative direction, i.e., in the direction of dotted arrows C2. In this case, the code value of the code sequence c1a is "0", and the code value of the code sequence c1b is "1". Accordingly, the switch elements S12 and S13 receiving the code value "0" of the demodulation code d1 are turned off, and the switch elements S11 and S14 receiving the code value "1" of the demodulation code d2 are turned on. Therefore, the demodulated current I3 flows at the output terminals T13 and T14 in the positive direction, i.e., in the direction of the solid arrows C1. Accordingly, when the current of positive period of the alternating-current generated current I1 is inputted to the code modulation circuit 23A, the code demodulation circuit 33A can output the demodulated current I3 which is correctly demodulated with positive polarity, to the load 5, as shown in FIG. 9(c).

Next, we consider a case in which the generated current I1 flows at the input terminals T1 and T2 of the code modulation circuit 23A in the negative direction, i.e., in the direction of the chain arrows B1. Similarly to the above case, the alternating-current modulated current I2 flowing in the positive and negative directions is inputted to the input terminals T11 and T12 of the code demodulation circuit 33A via the transmission path 3. When the code demodulation circuit 33A correctly performs demodulation operation, the demodulated current I3 flows at the output terminals T13 and T14 of the code demodulation circuit 33A in the negative direction, i.e., in a direction of the dotted arrows C2. These operations are described below. In this case, all code values of the demodulation codes d1 and d2 are "0", and all the switch elements S11 to S14 are turned off.

At first, described is operation of the code demodulation circuit 33A for a case in which the generated current I1 flows at the input terminals T1 and T2 of the code modulation circuit 23A in the negative direction, and the modulated current I2 flows at the input terminals T11 and T12 of the code demodulation circuit 33A in the negative direction, i.e., in the direction of dotted arrows C2. In this case, the code value of the code sequence c1a is "1", and the code value of the code sequence c1b is "0". Accordingly, the switch elements S32 and S33 receiving the code value "1" of the demodulation code d3 are turned on, and the switch elements S31 and S34 receiving the code value "0" of the demodulation code d4 are turned off. Therefore, the demodulated current I3 flows at the output terminals T13 and T14 in the negative direction, i.e., in the direction of the dotted arrows C2.

Next, operation of the code demodulation circuit 33A is described for a case in which the generated current I1 flows at the input terminals T1 and T2 of the code modulation circuit 23A in the negative direction, and the modulated current I2 flows at the input terminals T11 and T12 of the code demodulation circuit 33A in the positive direction, i.e., in the direction of the solid arrows C1. In this case, the code value of the code sequence c1a is "0", and the code value of the code sequence c1b is "1". Accordingly, the switch elements S32 and S33 receiving the code value "0" of the demodulation code d3 are turned off, and the switch elements S31 and S34 receiving the code value "1" of the demodulation code d4 are turned on. Therefore, the demodulated current I3 flows at the output terminals T13 and T14 in the negative direction, i.e., in the direction of the dotted arrows C2. Accordingly, when the current of negative period of the alternating-current generated current I1 is inputted to the code modulation circuit 23A, the code demodulation circuit 33A can output the demodulated current I3 which is correctly demodulated with negative polarity, to the load 5, as shown in FIG. 9(c).

As described above, when using the modulation codes m1 to m4 and the demodulation codes d1 to d4 of FIG. 12A, equivalently, the code modulator 2A operates according to the modulation code m0 of Mathematical Expression (6), and the code demodulator 4A operates according to the demodulation code d0 of Mathematical Expression (7).

As described above, according to FIGS. 10, 11, and 12A, when the alternating-current generated current I1 is inputted to the code modulator 2A, it is possible to extract the demodulated current I3 from the code demodulator 4A, the demodulated current I3 being also an alternating current similarly to the generated current I1 inputted to the code modulator 2A. Therefore, according to the second embodiment, it is possible to modulate the alternating-current generated current I1 by code modulation into the alternating-current modulated current I2, and then, transmit the modulated current I2 via the transmission path 3, and then, demodulate the modulated current I2 into the alternating-current demodulated current I3.

Figure 12B:
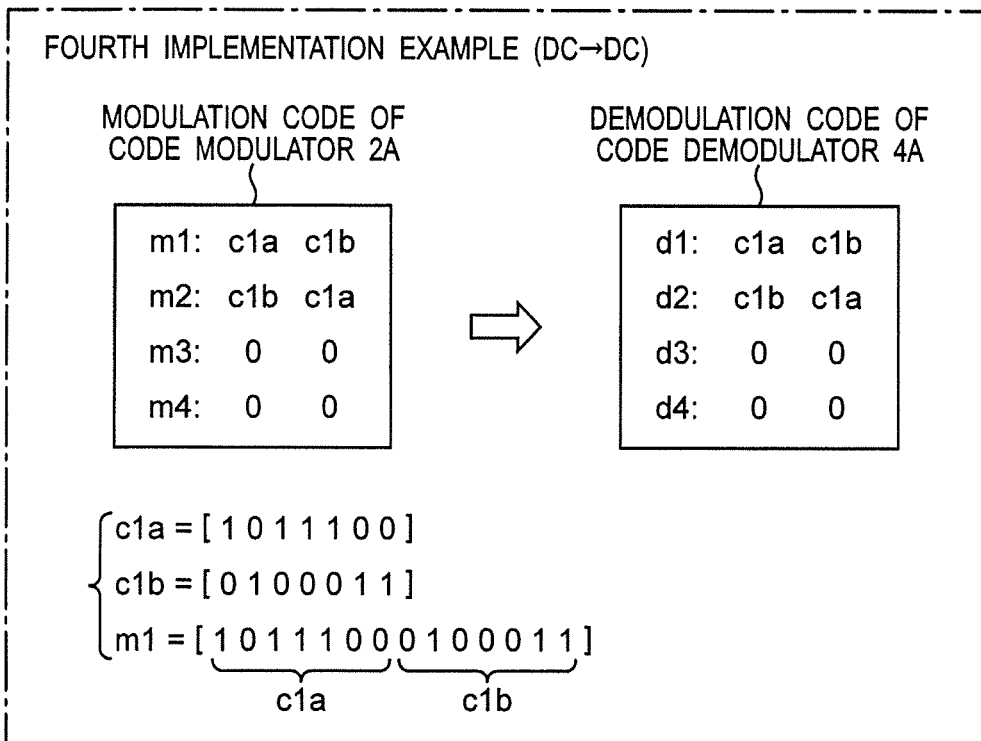
FIG. 12B is a diagram showing an example of a modulation code of the code modulator 2A and a demodulation code of the code demodulator 4A in the power transmission system according to the second embodiment, as a fourth implementation example in which direct-current power is transmitted and received.

FIG. 12B is a diagram showing an example of a modulation code of the code modulator 2A and a demodulation code of the code demodulator 4A in the power transmission system according to the second embodiment, as a fourth implementation example in which direct-current power is transmitted and received. In this case, in the code modulation circuit 23A of FIG. 10 and the code demodulation circuit 33A of FIG. 11, all code values of the modulation codes m3 and m4 and the demodulation codes d3 and d4 are set to "0" as shown in FIG. 12B, and thus, the switch elements S21 to S24 and S31 to S34 are turned off. Thus, the code modulation circuit 23A of FIG. 10 and the code demodulation circuit 33A of FIG. 11 operate as the code modulation circuit 23 and the code demodulation circuit 33 of FIG. 7, respectively. Accordingly, it is possible to achieve direct-current power transmission of FIG. 4 by generating the modulation codes m1 and m2 and the demodulation codes d1 and d2 from the code sequences c1a and c1b as shown in FIG. 12B. Thus, by changing the modulation codes m1 to m4 and the demodulation codes d1 to d4, it is possible to achieve a favorable power transmission system capable of supporting both direct-current power transmission and alternating-current power transmission using the code modulation circuit 23A of FIG. 10 and the code demodulation circuit 33A of FIG. 11.

The direct-current power generator 1 may be, for example, a photovoltaic power generator. The alternating-current power generator 1 may be, for example, a power generator provided with a turbine rotated by thermal power, hydraulic power, wind power, nuclear power, tidal power, or the like.

As described above, by using the modulation code and the demodulation code identical to each other, the power transmission system according to the second embodiment is capable of modulating and transmitting the direct-current generated current I1 and demodulating the modulated current into the direct-current demodulated current I3, and is also capable of modulating and transmitting the alternating-current generated current I1 and demodulating the modulated current into the alternating-current demodulated current I3. In addition, by using the demodulation code different from the modulation code, the power transmission system according to the second embodiment is capable of modulating and transmitting the direct-current generated current I1 and demodulating the modulated current into the alternating-current demodulated current I3, and is also capable of modulating and transmitting the alternating-current generated current I1 and demodulating the modulated current into the direct-current demodulated current I3.

Since the code modulation circuit 23A of FIG. 10 and the code demodulation circuit 33A of FIG. 11 are provided with the bidirectional switch circuits SS21 to SS24 and SS31 to SS34, these circuits are reversible. More specifically, the code modulation circuit 23A is also operable as a code demodulation circuit to demodulate a modulated current inputted from the terminals T3 and T4 and output the demodulated current from the terminals T1 and T2. The code demodulation circuit 33A is also operable as a code modulation circuit to modulate a generated current inputted from the terminals T13 and T14 and output the modulated current from the terminals T11 and T12. Thus, it is possible to transmit power from the code demodulator provided with the code demodulation circuit 33A, to the code modulator provided with the code modulation circuit 23A.

FIGS. 10 to 11 show the example in which each of the bidirectional switch circuits SS21 to SS34 is made of a pair of switch elements connected in parallel such that currents flow in opposite directions (S1, S21; S2, S22; S3, S23; S4, S24; S11, S31; S12, S32; S13, S33; S14, S34). Alternatively, each of the bidirectional switch circuits SS21 to SS34 may be made of a pair of switch elements connected in series, as shown in FIGS. 13A to 14D (S41, S51; S42, S52; S43, S53; S44, S54). In each of FIGS. 13A to 14D, the direction from top to bottom is referred to as a "positive direction", and the direction from bottom to top is referred to as a "negative direction".

Figure 13A:
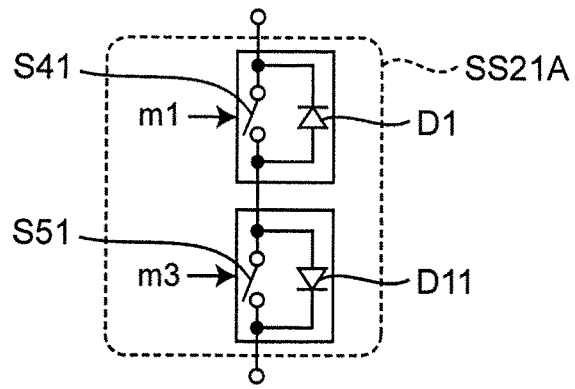
FIG. 13A is a circuit diagram showing a configuration of a bidirectional switch circuit SS21A for a code modulation circuit 23A used in a power transmission system according to a modified embodiment of the second embodiment.

FIG. 13A is a circuit diagram showing a configuration of a bidirectional switch circuit SS21A for a code modulation circuit 23A used in a power transmission system according to a modified embodiment of the second embodiment. The switch circuit SS21A of FIG. 13A corresponds to the switch circuit SS21 of FIG. 10, and is made of series connection of: (1) a switch element S41 connected in parallel with a diode D1 allowing a current to flow in the negative direction, and turned on and off in accordance with the modulation code m1; and (2) a switch element S51 connected in parallel with a diode D11 allowing a current to flow in the positive direction, and turned on and off in accordance with the modulation code m3.

Figure 13B:
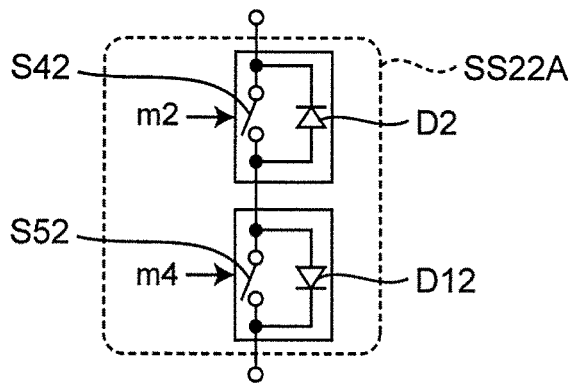
FIG. 13B is a circuit diagram showing a configuration of a bidirectional switch circuit SS22A for the code modulation circuit 23A used in the power transmission system according to the modified embodiment of the second embodiment.

FIG. 13B is a circuit diagram showing a configuration of a bidirectional switch circuit SS22A for the code modulation circuit 23A used in the power transmission system according to the modified embodiment of the second embodiment. The switch circuit SS22A of FIG. 13B corresponds to the switch circuit SS22 of FIG. 10, and is made of series connection of: (1) a switch element S42 connected in parallel with a diode D2 allowing a current to flow in the negative direction, and turned on and off in accordance with the modulation code m2; and (2) a switch element S52 connected in parallel with a diode D12 allowing a current to flow in the positive direction, and turned on and off in accordance with the modulation code m4.

Figure 13C:
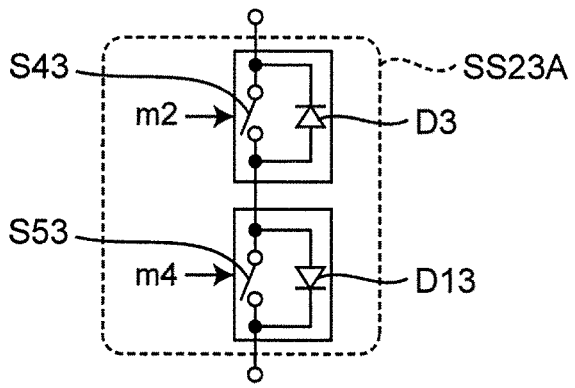
FIG. 13C is a circuit diagram showing a configuration of a bidirectional switch circuit SS23A for the code modulation circuit 23A used in the power transmission system according to the modified embodiment of the second embodiment.

FIG. 13C is a circuit diagram showing a configuration of a bidirectional switch circuit SS23A for the code modulation circuit 23A used in the power transmission system according to the modified embodiment of the second embodiment. The switch circuit SS23A of FIG. 13C corresponds to the switch circuit SS23 of FIG. 10, and is made of series connection of: (1) a switch element S43 connected in parallel with a diode D3 allowing a current to flow in the negative direction, and turned on and off in accordance with the modulation code m2; and (2) a switch element S53 connected in parallel with a diode D13 allowing a current to flow in the positive direction, and turned on and off in accordance with the modulation code m4.

Figure 13D:
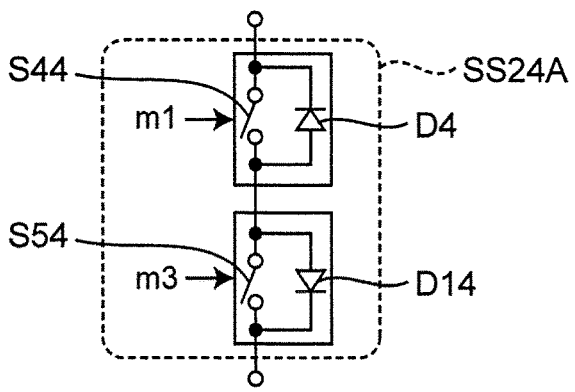
FIG. 13D is a circuit diagram showing a configuration of a bidirectional switch circuit SS24A for the code modulation circuit 23A used in the power transmission system according to the modified embodiment of the second embodiment.

FIG. 13D is a circuit diagram showing a configuration of a bidirectional switch circuit SS24A for the code modulation circuit 23A used in the power transmission system according to the modified embodiment of the second embodiment. The switch circuit SS24A of FIG. 13D corresponds to the switch circuit SS24 of FIG. 10, and is made of series connection of: (1) a switch element S44 connected in parallel with a diode D4 allowing a current to flow in the negative direction, and turned on and off in accordance with the modulation code m1; and (2) a switch element S54 connected in parallel with a diode D14 allowing a current to flow in the positive direction, and turned on and off in accordance with the modulation code m3.

Figure 14A:
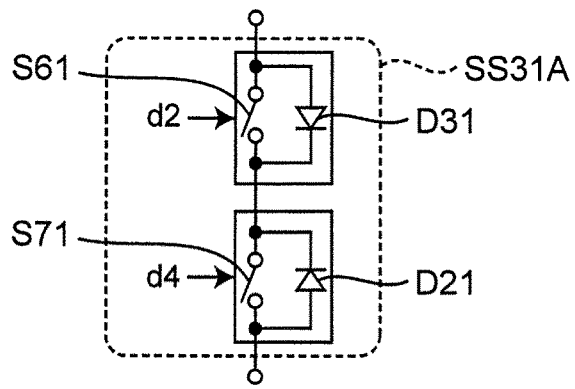
FIG. 14A is a circuit diagram showing a configuration of a bidirectional switch circuit SS31A for a code demodulation circuit 33A used in the power transmission system according to the modified embodiment of the second embodiment.

FIG. 14A is a circuit diagram showing a configuration of a bidirectional switch circuit SS31A for a code demodulation circuit 33A used in the power transmission system according to the modified embodiment of the second embodiment. The switch circuit SS31A of FIG. 14A corresponds to the switch circuit SS31 of FIG. 11, and is made of series connection of: (1) a switch element S61 connected in parallel with a diode D31 allowing a current to flow in the positive direction, and turned on and off in accordance with the demodulation code d2; and (2) a switch element S71 connected in parallel with a diode D21 allowing a current to flow in the negative direction, and turned on and off in accordance with the demodulation code d4.

Figure 14B:
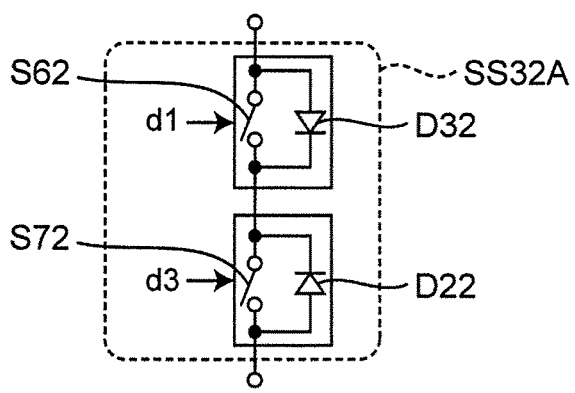
FIG. 14B is a circuit diagram showing a configuration of a bidirectional switch circuit SS32A for the code demodulation circuit 33A used in the power transmission system according to the modified embodiment of the second embodiment.

FIG. 14B is a circuit diagram showing a configuration of a bidirectional switch circuit SS32A for the code demodulation circuit 33A used in the power transmission system according to the modified embodiment of the second embodiment. The switch circuit SS32A of FIG. 14B corresponds to the switch circuit SS32 of FIG. 11, and is made of series connection of: (1) a switch element S62 connected in parallel with a diode D32 allowing a current to flow in the positive direction, and turned on and off in accordance with the demodulation code d1; and (2) a switch element S72 connected in parallel with a diode D22 allowing a current to flow in the negative direction, and turned on and off in accordance with the demodulation code d3.

Figure 14C:
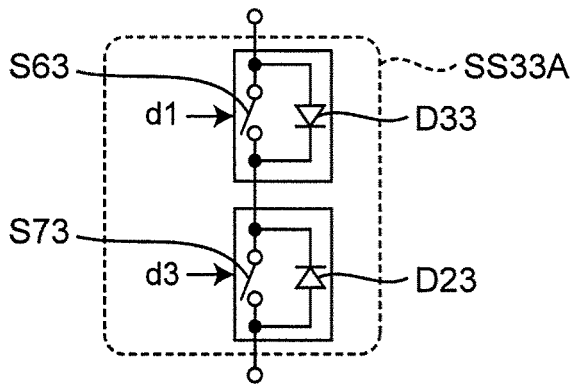
FIG. 14C is a circuit diagram showing a configuration of a bidirectional switch circuit SS33A for the code demodulation circuit 33A used in the power transmission system according to the modified embodiment of the second embodiment.

FIG. 14C is a circuit diagram showing a configuration of a bidirectional switch circuit SS33A for the code demodulation circuit 33A used in the power transmission system according to the modified embodiment of the second embodiment. The switch circuit SS33A of FIG. 14C corresponds to the switch circuit SS33 of FIG. 11, and is made of series connection of: (1) a switch element S63 connected in parallel with a diode D33 allowing a current to flow in the positive direction, and turned on and off in accordance with the demodulation code d1; and (2) a switch element S73 connected in parallel with a diode D23 allowing a current to flow in the negative direction, and turned on and off in accordance with the demodulation code d3.

Figure 14D:
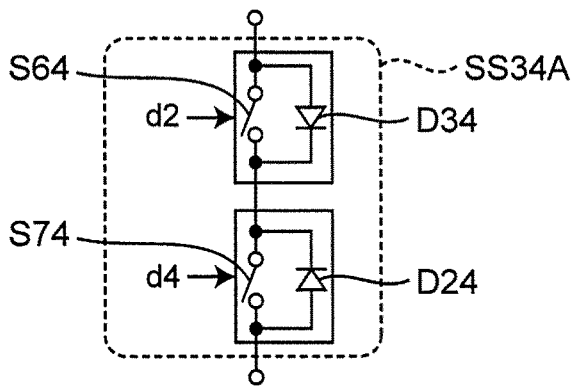
FIG. 14D is a circuit diagram showing a configuration of a bidirectional switch circuit SS34A for the code demodulation circuit 33A used in the power transmission system according to the modified embodiment of the second embodiment.

FIG. 14D is a circuit diagram showing a configuration of a bidirectional switch circuit SS34A for the code demodulation circuit 33A used in the power transmission system according to the modified embodiment of the second embodiment. The switch circuit SS34A of FIG. 14D corresponds to the switch circuit SS34 of FIG. 11, and is made of series connection of: (1) a switch element S64 connected in parallel with a diode D34 allowing a current to flow in the positive direction, and turned on and off in accordance with the demodulation code d2; and (2) a switch element S74 connected in parallel with a diode D24 allowing a current to flow in the negative direction, and turned on and off in accordance with the demodulation code d4.

Referring to FIG. 13A to FIG. 14D, each of the switch elements S41 to S74 may be made of, for example, an MOS transistor. Parallel parasitic (body) diodes D1 to D34 of MOS transistors may be used. For example, when each of the switch circuits SS21A to SS34A of FIGS. 13A to 14D is implemented by a switch element of an MOS transistor and one diode, two MOS transistors and two diodes are required for each one of the bidirectional switch circuit SS21A to SS34A. Meanwhile, packaged MOS transistors are widely available, including a built-in diode having good reverse characteristics. When using such packaged MOS transistors, each of the bidirectional switch circuits SS21A to SS34A can be made of two switch elements, and thus, size can be reduced.

Third Embodiment

In the first and second embodiments, we have described the power transmission systems which transmit power from the one power generator 1 to the one load 5. Meanwhile, in a third embodiment, we describe a power transmission system which transmits powers from a plurality of power generators to a plurality of loads.

Figure 15:
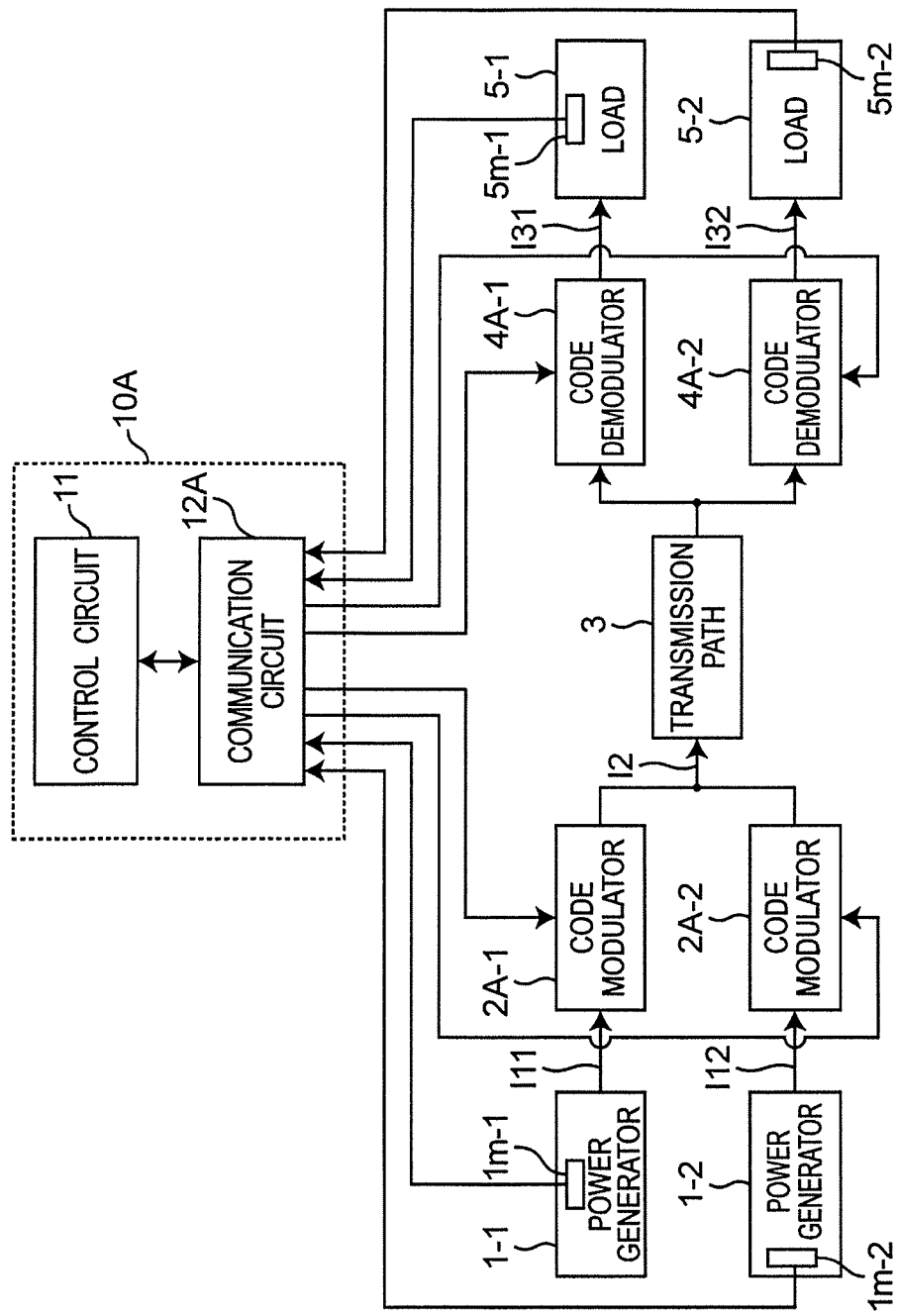
FIG. 15 is a block diagram showing a configuration of a power transmission system according to a third embodiment.

FIG. 15 is a block diagram showing a configuration of a power transmission system according to the third embodiment. Referring to FIG. 15, the power transmission system according to the third embodiment includes a plurality of power generators 1-1 and 1-2, a plurality of code modulators 2A-1 and 2A-2, a transmission path 3, a plurality of code demodulators 4A-1 and 4A-2, a plurality of loads 5-1 and 5-2, and a controller 10A.

The controller 10A is provided with a control circuit 11 and a communication circuit 12A. The control circuit 11 communicates with the code modulators 2A-1 and 2A-2 and the code demodulators 4A-1 and 4A-2 via the communication circuit 12A, and controls operations of the code modulators 2A-1 and 2A-2 and the code demodulators 4A-1 and 4A-2.

In the power transmission system of FIG. 15, each of the code modulators 2A-1 and 2A-2 operates as a power transmitter apparatus, and each of the code demodulators 4A-1 and 4A-2 operates as a power receiver apparatus. Each code modulator of the code modulators 2A-1 and 2A-2 modulates first power to generate a code-modulated wave by code modulation using a modulation code based on a code sequence, and transmits the code-modulated wave to one of the code demodulators 4A-1 and 4A-2 via the transmission path 3. Each one of the code demodulators 4A-1 and 4A-2 receives the code-modulated wave from one of the code modulators 2A-1 and 2A-2 via the transmission path 3, and demodulates the received code-modulated wave to generate second power by code demodulation using a demodulation code based on a code sequence identical to the code sequence of the modulation code used for the code modulation. The first powers are, for example, powers generated by the power generators 1-1 and 1-2, and are shown as generated currents I11 and I12 in FIG. 15. The code-modulated wave is alternating-current power modulated by code modulation, and is shown as a modulated current I2 in FIG. 15. The second power are, for example, powers to be supplied to the loads 5-1 and 5-2, and are shown as demodulated currents I31 and I32 in FIG. 15.

In this case, the code modulators 2A-1 and 2A-2 and the code demodulators 4A-1 and 4A-2 of FIG. 15 are configured and operated similarly to the code modulator 2A and the code demodulator 4A according to the second embodiment.

The power transmission system of FIG. 15 is further provided with power meters 1m-1, 1m-2, 5m-1, and 5m-2. Each of the power meters 1m-1 and 1m-2 is first power measuring means which measures an amount of the first power. More specifically, each of the power meters 1m-1 and 1m-2 measures an amount of power generated by the power generators 1-1 and 1-2 and transmitted from the power generators 1-1 and 1-2 to the code modulators 2A-1 and 2A-2. Each of the power meters 5m-1 and 5m-2 is second power measuring means which measures an amount of the second power. More specifically, each of the power meters 5m-1 and 5m-2 measures an amount of power transmitted from the code demodulators 4A-1 and 4A-2 to the loads 5-1 and 5-2, and used by the loads 5-1 and 5-2. The amounts of powers measured by the power meters 1m-1, 1m-2, 5m-1, and 5m-2 are transmitted to the controller 10A.

The controller 10A controls operations of the code modulators 2A-1 and 2A-2 and the code demodulators 4A-1 and 4A-2 based on the amounts of powers received from the power meters 1m-1, 1m-2, 5m-1, and 5m-2. For example, the controller 10A transmits control signals to the code modulators 2A-1 and 2A-2 and the code demodulators 4A-1 and 4A-2, the control signals including synchronization signals for synchronizing the code modulators 2A-1 and 2A-2 and the code demodulators 4A-1 and 4A-2 to each other, thus achieving code modulation and code demodulation of power in an accurately synchronized manner.

The controller 10A transmits the code sequences of the modulation codes, or information specifying the code sequences, to at least one of the code modulators 2A-1 and 2A-2, which is to transmit power, and transmits the code sequences of the demodulation codes, or information specifying the code sequences, to at least one of the code demodulators 4A-1 and 4A-2, which is to receive power. For example, when transmitting power from the code modulator 2A-1 to the code demodulator 4A-1, the controller 10A sets a modulation code to the code modulator 2A-1, and a demodulation code to the code demodulator 4A-1, based on one code sequence. When simultaneously transmitting power from the code modulator 2A-2 to the code demodulator 4A-2, the controller 10A sets a modulation code to the code modulator 2A-2, and a demodulation code to the code demodulator 4A-2, based on another different code sequence. When simultaneously transmitting powers from the plurality of code modulators 2A-1 and 2A-2 to the plurality of code demodulators 4A-1 and 4A-2, a plurality of low-correlated (e.g., orthogonal) code sequences may be used.

Thus, it is possible to transmit powers from the plurality of power generators 1-1 and 1-2 to the plurality of loads 5-1 and 5-2.

Now, we describe exemplary operations of the code modulators 2A-1 and 2A-2 and the code demodulators 4A-1 and 4A-2 for transmitting powers generated by the power generators 1-1 and 1-2 to the loads 5-1 and 5-2.

In the third embodiment, we describe a case in which the power generators 1-1 and 1-2 output direct-current powers, direct-current power is inputted to the load 5-1, and alternating-current power is inputted to the load 5-2. That is, when transmitting power from the power generator 1-2 to the load 5-2, direct-current power is converted into alternating-current power.

Figure 16A:
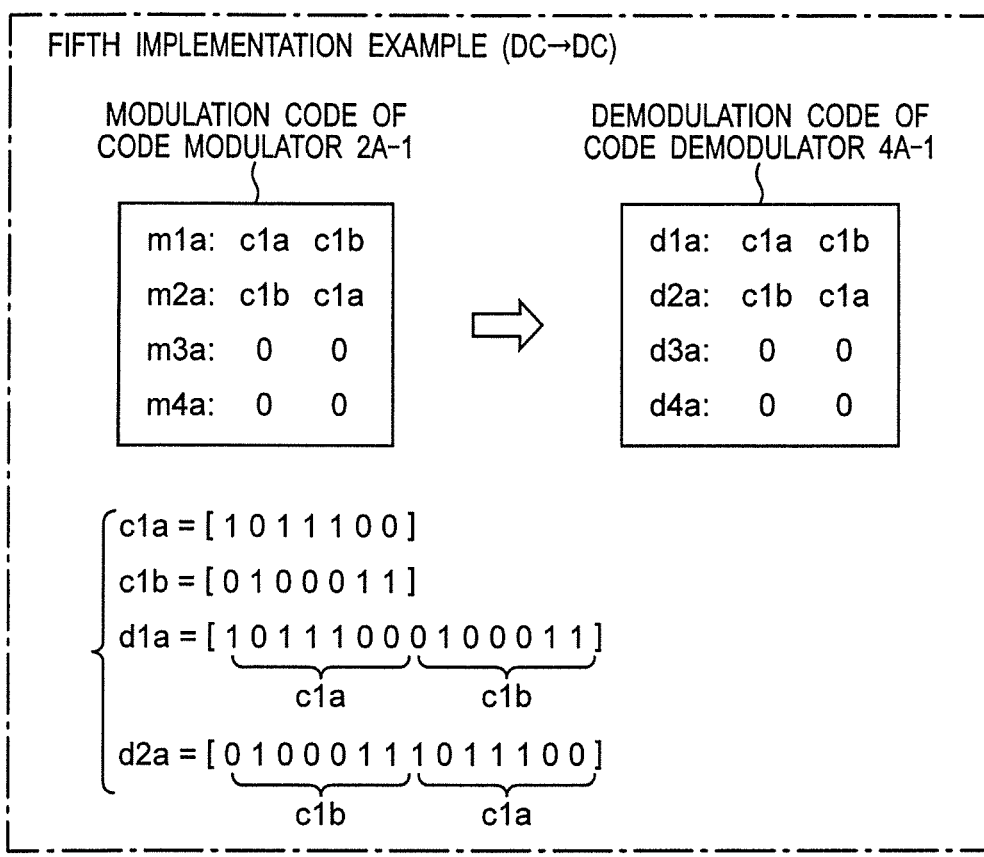
FIG. 16A is a diagram showing an example of a modulation code of a code modulator 2A-1 and a demodulation code of a code demodulator 4A-1 in the power transmission system of FIG. 15, as a fifth implementation example in which direct-current power is transmitted and received.

FIG. 16A is a diagram showing an example of a modulation code of the code modulator 2A-1 and a demodulation code of the code demodulator 4A-1 in the power transmission system of FIG. 15 according to the third embodiment, in which direct-current power is transmitted and received. In addition, FIG. 16B is a diagram showing an example of a modulation code of the code modulator 2A-2 and a demodulation code of the code demodulator 4A-2 in the power transmission system of FIG. 15 according to the third embodiment, in which direct-current power is transmitted and alternating-current power is received.

FIG. 16A shows modulation codes inputted to the switch elements S1 to S4, S21 to S24 of the code modulation circuit 23A (FIG. 10) of the code modulator 2A-1, and demodulation codes inputted to the switch elements S11 to S14, S31 to S34 of the code demodulation circuit 33A (FIG. 11) of the code demodulator 4A-1. In this case, modulation codes m1a to m4a of FIG. 16A correspond to the modulation codes m1 to m4 of the code modulation circuit 23A of FIG. 10, respectively, and demodulation codes d1a to d4a of FIG. 16A correspond to the demodulation codes d1 to d4 of the code demodulation circuit 33A of FIG. 11, respectively. In this case, as described with reference to FIG. 12B, by setting all the code values of the modulation codes m3a and m4a and the demodulation codes d3a and d4a to "0", the switch elements S21 to S24 and S31 to S34 are turned off. In addition, the modulation codes m1a and m2a and the demodulation codes d1a and d2a are generated from the code sequence c1a and the code sequence c1b, as described with reference to FIG. 12B.

Figure 16B:
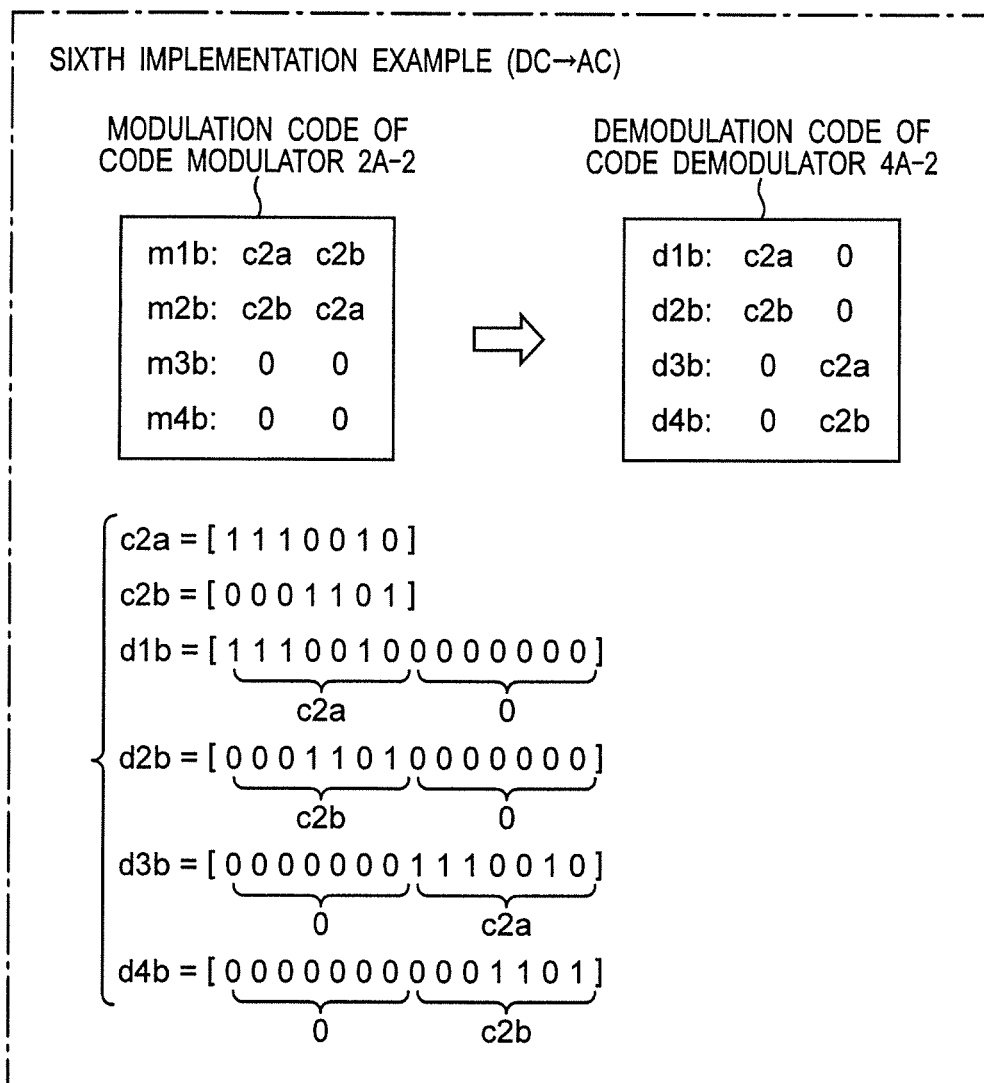
FIG. 16B is a diagram showing an example of a modulation code of the code modulator 2A-2 and a demodulation code of the code demodulator 4A-2 in the power transmission system of FIG. 15, as a sixth implementation example in which direct-current power is transmitted and alternating-current power is received.

Further, FIG. 16B shows modulation codes inputted to the switch elements S1 to S4, S21 to S24 of the code modulation circuit 23A (FIG. 10) of the code modulator 2A-2, and demodulation codes inputted to the switch elements S11 to S14, S31 to S34 of the code demodulation circuit 33A (FIG. 11) of the code demodulator 4A-2. In this case, modulation codes m1$a$ to m4$a$ of FIG. 16B correspond to the modulation codes m1 to m4 of the code modulation circuit 23A of FIG. 10, respectively, and demodulation codes d1$a$ to d4$a$ of FIG. 16B correspond to the demodulation codes d1 to d4 of the code demodulation circuit 33A of FIG. 11, respectively. In this case, by setting all the code values of the modulation codes m3$b$ and m4$b$ to "0", the switch elements S21 to S24 are turned off. In addition, the modulation codes m1$b$ and m2$b$ and the demodulation codes d1$b$ to d4$b$ are generated from the code sequence c2$a$ and the code sequence c2$b$. The principle of code modulation and code demodulation of currents is similar to that of the first and second embodiments, and therefore, its explanation is omitted here.

Figure 17:
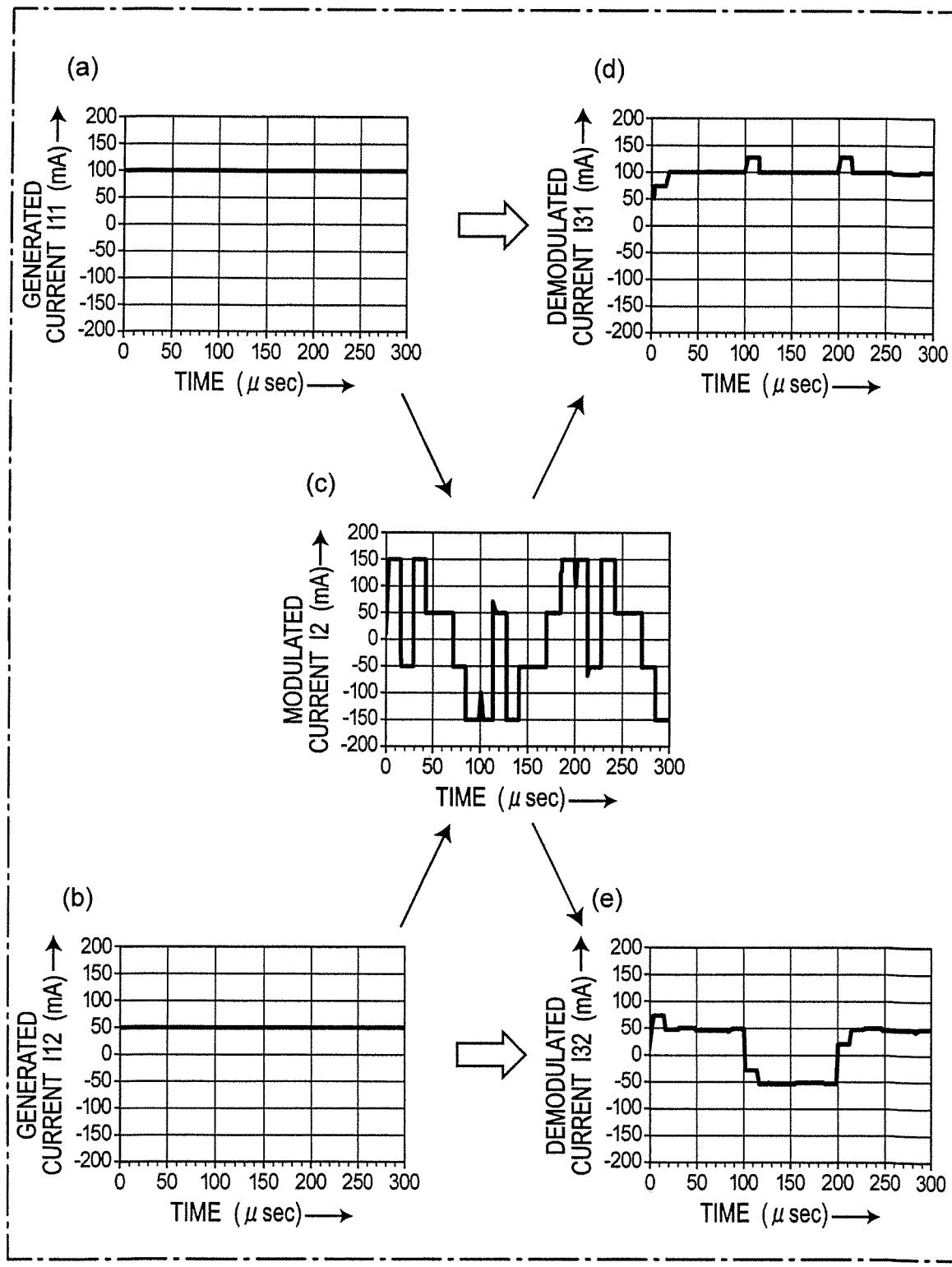
FIG. 17 is a waveform diagram showing exemplary signal waveforms in the power transmission system according to the third embodiment, in which: (a) shows a signal waveform of a generated current I11; (b) shows a signal waveform of a generated current I12; (c) shows a signal waveform of a modulated current I2; (d) shows a signal waveform of a demodulated current I31; and (e) shows a signal waveform of a demodulated current I32.

Now, with reference to FIG. 17, we describe an operation of transmitting powers from the plurality of power generators 1-1 and 1-2 to the plurality of loads 5-1 and 5-2.

FIG. 17 are waveform diagrams, where (a) to (e) show exemplary signal waveforms of the power transmission system according to the third embodiment. In FIG. 17, (a) shows a signal waveform of a generated current I11, (b) shows a signal waveform of a generated current I12, (c) shows a signal waveform of a modulated current I2, (d) shows a signal waveform of a demodulated current I31, and (e) shows a signal waveform of a demodulated current I32.

The code modulator 2A-1 modulates the direct-current generated current I11 by code modulation into an alternating-current code-modulated wave. Similarly, the code modulator 2A-2 modulates the direct-current generated current I12 by code modulation into an alternating-current code-modulated wave. As shown in FIG. 17(c), the code-modulated wave generated by the code modulator 2A-1 and the code-modulated wave generated by the code modulator 2A-2 are transmitted as the combined modulated current I2 via the transmission path 3.

As described above, the code modulators 2A-1 and 2A-2 have an identical configuration, and are configured in a manner similar to that of the code modulator 2A of FIG. 10. In addition, the code demodulators 4A-1 and 4A-2 also have an identical configuration, and are configured in a manner similar to that of the code demodulator 4A of FIG. 11. The difference between the code modulators 2A-1 and 2A-2, and the difference between the code demodulators 4A-1 and 4A-2 reside in the use of different sets of the code sequences c1$a$ and c1$b$, and the code sequences c2$a$ and c2$b$. The code modulator 2A-1 and the code demodulator 4A-1 use the code sequences c1$a$ and c1$b$, and the code modulator 2A-2 and the code demodulator 4A-2 use the code sequences c2$a$ and c2$b$. In this case, the code sequences c1$a$ and c2$a$ are orthogonal to each other, and therefore, the code sequences c1$b$ and c2$b$ are also orthogonal to each other. In this case, Gold sequences of seven stages are adopted, and different Gold sequences are set to the code sequences c1$a$ and c2$a$.

The code demodulators 4A-1 and 4A-2 can demodulate the modulated current I2 to extract powers generated by the corresponding code modulators 2A-1 and 2A-2, respectively, by using the orthogonal code sequences c1$a$ and c2$a$. Accordingly, as shown in FIGS. 17(d) and (e), the generated currents I11 and I12 are inputted to the code modulators 2A-1 and 2A-2, and then, the currents are transmitted as code-modulated waves, and then, the corresponding code demodulators 4A-1 and 4A-2 correctly demodulate and output the demodulated currents I31 and I32. As a result, the demodulated currents I31 and I32 having desired waveforms (direct current or alternating current) and desired magnitudes are supplied to the loads 5-1 and 5-2, respectively.

As described above, according to the present embodiment, it is possible to simultaneously perform two power transmissions via the one transmission path 3 in a multiplexed manner, and separate the transmitted powers from each other, by using the code modulators 2A-1 and 2A-2 and the code demodulators 4A-1 and 4A-2. Accordingly, it is possible to achieve a favorable power transmission system capable of simultaneously transmitting currents of desired magnitudes from the two power generators 1-1 and 1-2 to the two loads 5-1 and 5-2.

By measuring instantaneous powers at the code modulators 2A-1 and 2A-2 or the code demodulators 4A-1 and 4A-2 and comparing the instantaneous powers with the code sequences, it is possible to know which of the power generators 1-1 and 1-2 transmits power, which of the loads receives power, and what amount of power is transmitted. Accordingly, when a plurality of the different power generators 1-1 and 1-2 requiring different generation costs are connected, it is possible to conduct power business with electricity charges dependent on which of the power generators 1-1 and 1-2 transmits power. Alternatively, in case of a system having variable power transmission efficiency depending on which of the power generators 1-1 and 1-2 transmits power and which of the loads 5-1 and 5-2 receives the power, it is possible to achieve optimum power supply by managing and analyzing information on power transmission.

As described above, according to the present embodiment, it is possible to provide the power transmission system capable of efficiently supplying power from the one or more power generators 1-1 and 1-2 to the one or more loads 5-1 and 5-2, by using the code modulators 2A-1 and 2A-2 and the code demodulators 4A-1 and 4A-2.

In the above described embodiment, we indicated the example of the power transmission system including the two power generators 1-1 and 1-2 and the two loads 5-1 and 5-2, but the present disclosure is not limited thereto. It is possible to provide power transmission systems including the one power generator 1-2 and the two or more loads 5-1 and 5-2, or including two or more power generators 1-1 and 1-2 and the two or more loads 5-1 and 5-2. In this case, it is possible to simultaneously perform a number of power transmissions using one transmission path 3. Accordingly, it is possible to reduce costs for installation of the transmission path 3, and reduce costs by reducing the number of transmission paths 3, etc.

In the above described embodiment, we indicated the example in which each of the code modulators 2A-1 and 2A-2 of FIG. 15 is configured as the code modulation circuit 23A of FIG. 10, but the present disclosure is not limited thereto. For example, when the output powers from the power generators 1-1 and 1-2 are direct-current powers, each of the code modulators 2A-1 and 2A-2 may be configured as the code modulation circuit 23 of FIG. 7. In addition, when the input powers to the loads 5-1 and 5-2 are direct-current powers, each of the code demodulators 4A-1 and 4A-2 may be configured as the code demodulation circuit 33 of FIG. 7. In these cases, it is possible to simplify the circuit configurations of the code modulators 2A-1 and 2A-2 and the code demodulators 4A-1 and 4A-2, and accordingly, there are advantageous effects of reducing the number of parts, reducing costs, and reducing size of the apparatuses.

In the third embodiment, we indicated the example of the power transmission system which transmits powers from two power generators each having direct-current output power, to one load having direct-current input power, and to one load having alternating-current input power, but the present disclosure is not limited thereto. The power transmission system may receive powers from any number of power generators each having direct-current output power, and from any number of power generators each having alternating-current output power. In addition, the power transmission system may supply powers to any number of loads each having direct-current input power, and to any number of loads each having alternating-current input power.

Photovoltaic power generation, which generates most of natural energy, generates direct-current power. On the other hand, wind power generation and geothermal power generation generate alternating-current power. In this case, since it is not desirable that both direct-current power supplies and alternating-current power supplies are connected to the same power network, according to conventional power transmission systems, all power generators (power supplies) and loads should be of only direct current or only alternating current.

On the other hand, according to the power transmission system according to the present embodiment, by using code modulation and code demodulation, it is possible simultaneously transmit powers from a direct-current power supply to a direct-current load, from a direct-current power supply to an alternating-current load, from an alternating-current power supply to a direct-current load, and from an alternating-current power supply to an alternating-current load, via one transmission path.

Thus, according to the first to third embodiments, it is possible to provide a favorable power transmission system capable of correctly perform code modulation and code demodulation of power, and further, capable of simultaneously performing a plurality of power transmissions in a multiplexed manner via one transmission path.

Fourth Embodiment

Figure 18:
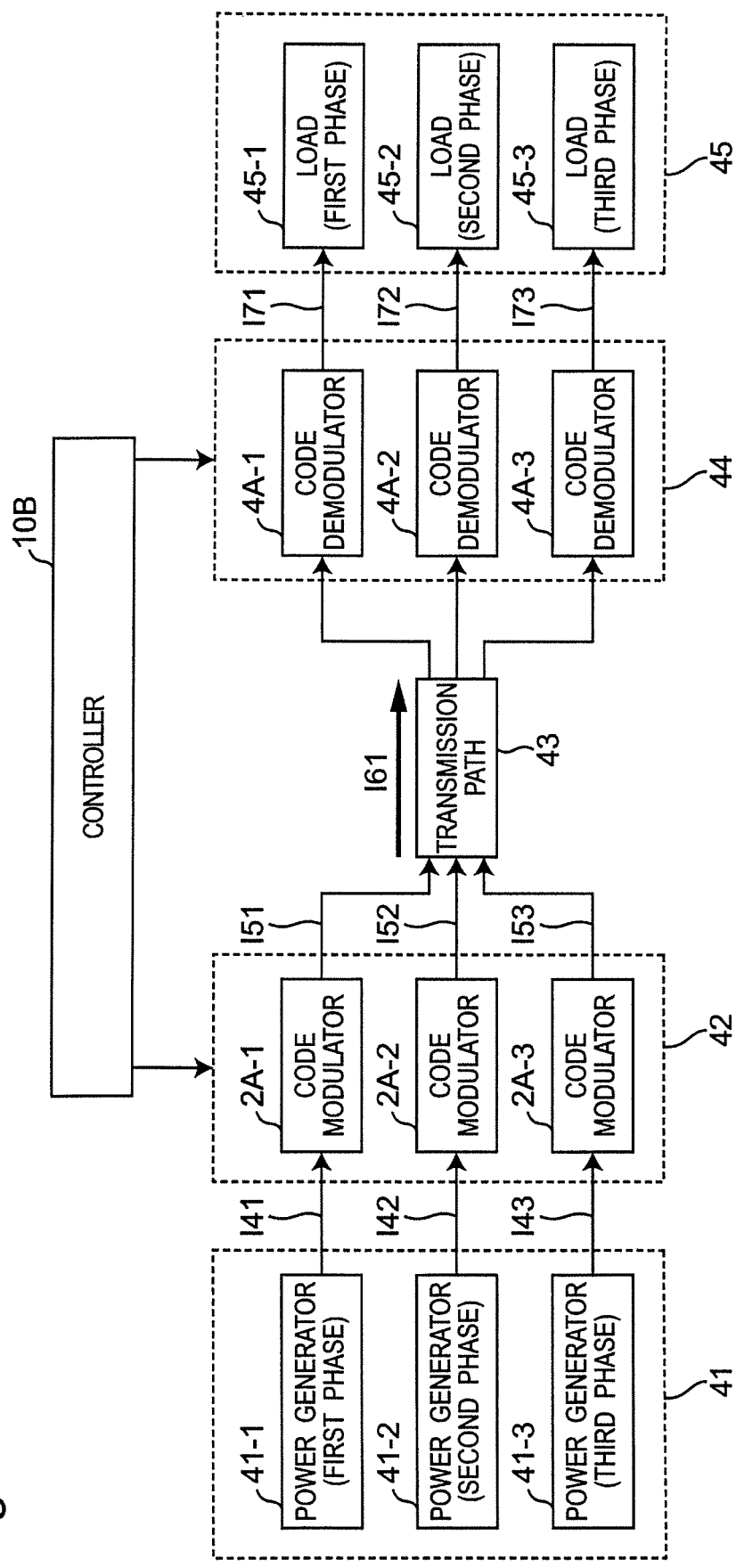
FIG. 18 is a block diagram showing a configuration of a power transmission system according to a fourth embodiment.

FIG. 18 is a block diagram showing a configuration of a power transmission system according to a fourth embodiment. Referring to FIG. 18, the power transmission system according to the fourth embodiment includes a three-phase power generator 41, a code modulation subsystem 42, a transmission path 43, a code demodulation subsystem 44, a three-phase load 45, and a controller 10B. According to the power transmission system of FIG. 18, the code modulation subsystem 42 operates as a power transmitter apparatus, and the code demodulation subsystem 44 operates as a power receiver apparatus.

The three-phase power generator 41 generates three-phase alternating-current power, including powers of first to third phase components with a phase difference of 120 degrees. FIG. 18 indicates first- to third-phase windings of the three-phase power generator 41, as power generators 41-1 to 41-3, respectively, and indicates powers of first to third phase components, as generated currents I41 to I43, respectively.

The code modulation subsystem 42 includes code modulators 2A-1 to 2A-3 configured in a manner similar to that of the code modulators 2A-1 and 2A-2 of FIG. 15. Each of the code modulators 2A-1 to 2A-3 is provided with the code modulation circuit 23A of FIG. 10, and operates in a manner similar to that of the code demodulator according to the second embodiment. The code modulators 2A-1 to 2A-3 modulate powers of first to third phase components of three-phase alternating-current power to generate code-modulated waves, respectively, by code modulation using modulation codes based on code sequences different from each other, and transmit the code-modulated waves to the code demodulation subsystem 44 via the transmission path 43. FIG. 18 indicates the code-modulated waves generated by the code modulators 2A-1 to 2A-3, as modulated currents I51 to I53, respectively.

The transmission path 43 transmits modulated current I61, in which the modulated currents I51 to I53 are superposed on one another, from the code modulation subsystem 42 to the code demodulation subsystem 44.

The code demodulation subsystem 44 includes code demodulators 4A-1 to 4A-3 configured in a manner similar to that of the code demodulators 4A-1 and 4A-2 of FIG. 15. Each of the code demodulators 4A-1 to 4A-3 is provided with the code demodulation circuit 33A of FIG. 11, and operates in a manner similar to that of the code demodulator according to the second embodiment. Each of the code demodulators 4A-1 to 4A-3 demodulates one code-modulated wave of the received code-modulated waves (i.e., modulated currents I51 to I53) by code demodulation using a demodulation code based on a code sequence identical to the code sequence of the modulation code used for the code modulation of the one code-modulated wave. Thus, each of the code demodulators 4A-1 to 4A-3 generates code-demodulated power as power of one of first to third phase components of three-phase alternating-current power. FIG. 18 indicates code-demodulated powers as demodulated currents I71 to I73.

The three-phase load 45 operates with three-phase alternating-current power generated by the code demodulation subsystem 44. The three-phase load 45 is, e.g., a three-phase motor. FIG. 18 indicates first- to third-phase windings of the three-phase load 45, as loads 45-1 to 45-3, respectively.

Figure 19:
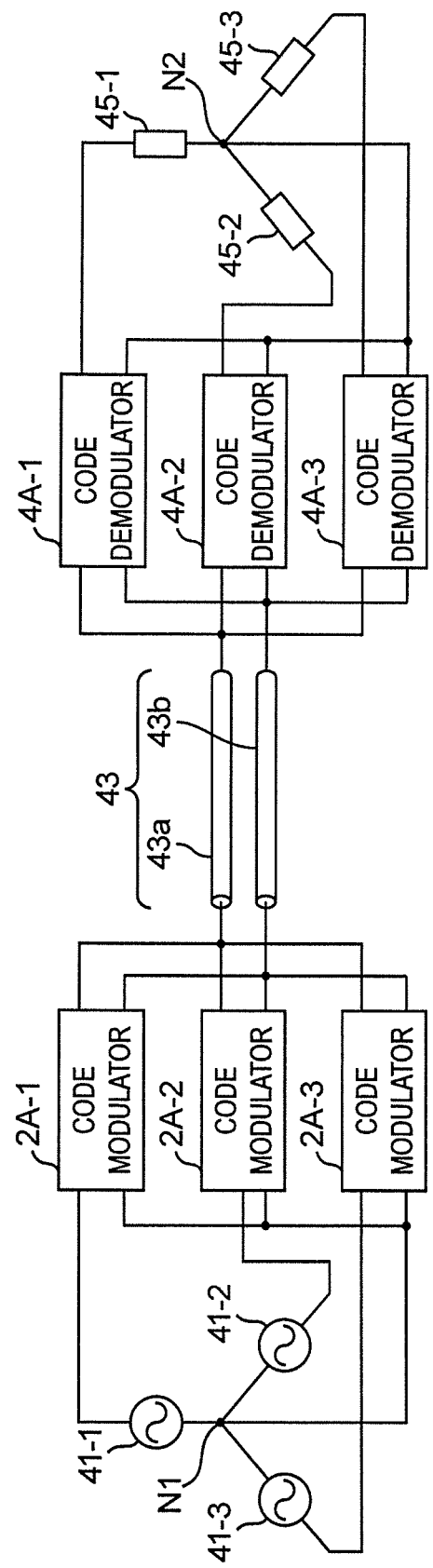
FIG. 19 is a diagram showing a first implementation example of a transmission path 43 of FIG. 18.

FIG. 19 is a diagram showing a first implementation example of the transmission path 43 of FIG. 18. The power generators 41-1 to 41-3 and the code modulators 2A-1 to 2A-3 may be connected to each other using Y connection. The code-modulated waves generated by the code modulators 2A-1 to 2A-3 may be transmitted to the code demodulators 4A-1 to 4A-3, via the transmission path 43 including two power lines 43a and 43b. The code demodulators 4A-1 to 4A-3 and the loads 45-1 to 45-3 may be connected to each other using Y connection. N1 and N2 denotes neutral points.

Figure 20:
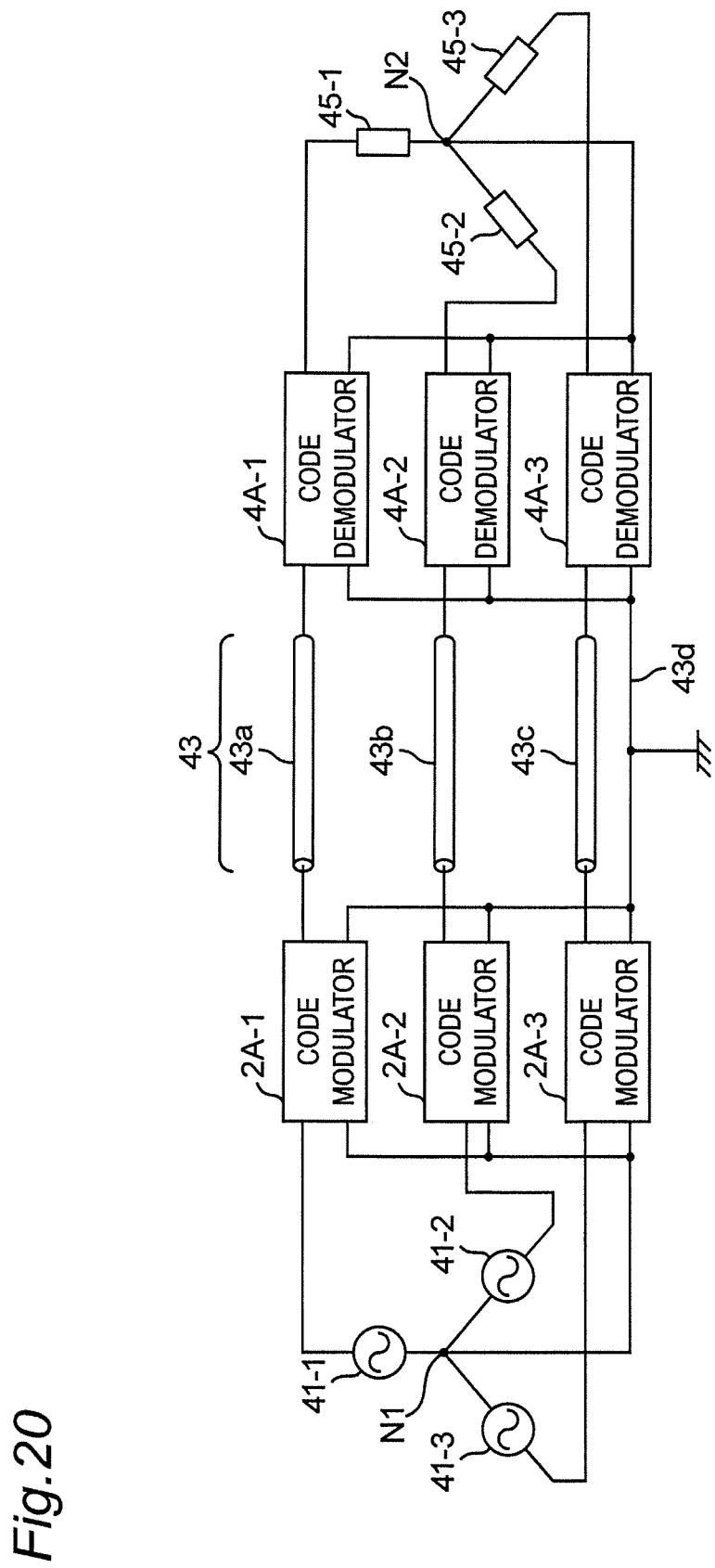
FIG. 20 is a diagram showing a second implementation example of the transmission path 43 of FIG. 18.

FIG. 20 is a diagram showing a second implementation example of the transmission path 43 of FIG. 18. Code modulation waves generated by the code modulators 2A-1 to 2A-3 may be transmitted to the code demodulators 4A-1 to 4A-3, via the transmission path 43 including three power lines 43a to 43c and a ground line 43d (three-phase four-lines).

Figure 21:
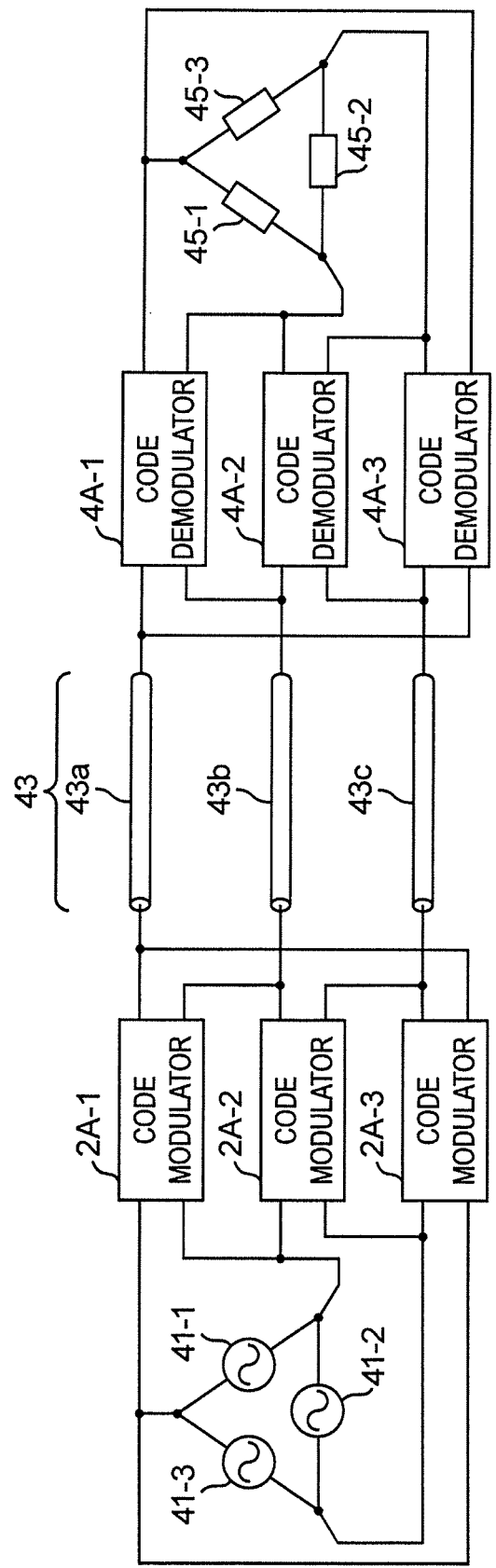
FIG. 21 is a diagram showing a third implementation example of the transmission path 43 of FIG. 18.

FIG. 21 is a diagram showing a third implementation example of the transmission path 43 of FIG. 18. The power generators 41-1 to 41-3 and the code modulators 2A-1 to 2A-3 may be connected to each other using Δ connection. The code-modulated waves generated by the code modulators 2A-1 to 2A-3 may be transmitted to the code demodulators 4A-1 to 4A-3, via the transmission path 43 including the three power lines 43a to 43c. The code demodulators 4A-1 to 4A-3 and the loads 45-1 to 45-3 may be connected to each other using Δ connection.

The power generators 41-1 to 41-3 and the code modulators 2A-1 to 2A-3 may be connected to each other using Y connection, while the code demodulators 4A-1 to 4A-3 and the loads 45-1 to 45-3 may be connected using Δ connection. In addition, the power generators 41-1 to 41-3 and the code modulators 2A-1 to 2A-3 may be connected to each other using Δ connection, while the code demodulators 4A-1 to 4A-3 and the loads 45-1 to 45-3 may be connected using Y connection. In either of these cases, any one of the transmission path 43 of FIG. 19, the transmission path 43 of FIG. 20, and the transmission path 43 of FIG. 21 may be used.

Figure 22:
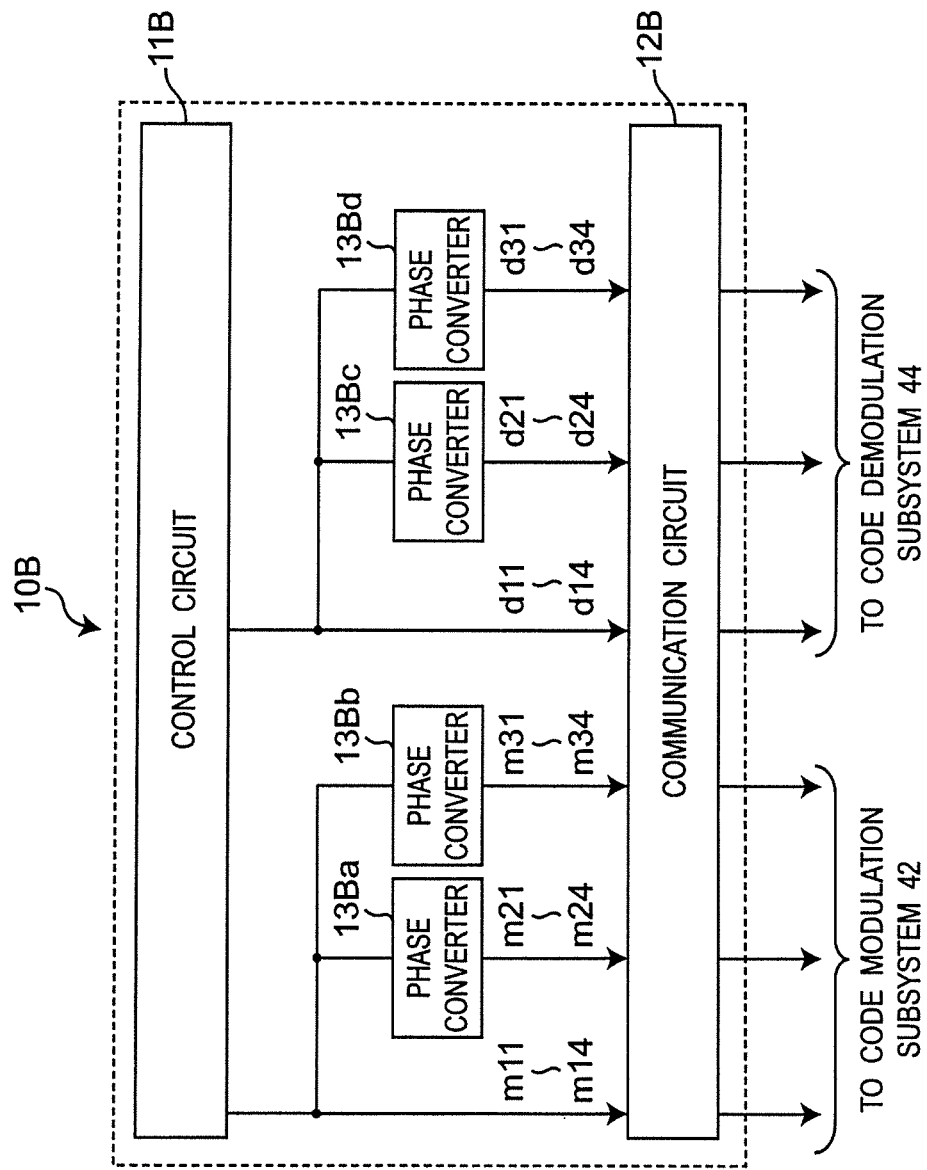
FIG. 22 is a block diagram showing a configuration of a controller 10B of FIG. 18.

FIG. 22 is a block diagram showing a configuration of the controller 10B of FIG. 18. The controller 10B is provided with a control circuit 11B, a communication circuit 12B, and phase converters 13Ba to 13Bd.

The control circuit 11B communicates with the code modulators 2A-1 to 2A-3 of the code modulation subsystem 42, and the code demodulators 4A-1 to 4A-3 of the code demodulation subsystem 44, via the communication circuit 12B, and controls operations of these modulators and demodulators. For ease of illustration, FIG. 22 shows only components for setting modulation codes and demodulation codes.

The controller 10B sets code sequences of modulation codes, or information specifying the code sequences, to the code modulators 2A-1 to 2A-3 of the code modulation subsystem 42, and sets code sequences of demodulation codes, or information specifying the code sequences, to the code demodulators 4A-1 to 4A-3 of the code demodulation subsystem 44. The controller 10B sets modulation codes and demodulation codes based on an identical code sequence, to a pair of the code modulator and the code demodulator which transmit and receive the corresponding phase of the three-phase alternating-current power. The controller 10B sets modulation codes m11 to m14, to the code modulator 2A-1, and sets demodulation codes d11 to d14 identical to the modulation codes m11 to m14, to the code demodulator 4A-1. The controller 10B sets modulation codes m21 to m24, to the code modulator 2A-2, and sets demodulation codes d21 to d24 identical to the modulation codes m21 to m24, to the code demodulator 4A-2. The controller 10B sets modulation codes m31 to m34, to the code modulator 2A-3, and sets demodulation codes d31 to d34 identical to the modulation codes m31 to m34, to the code demodulator 4A-3. The modulation codes m11 to m14, the modulation codes m21 to m24, and the modulation codes m31 to m34 (and corresponding demodulation codes) are low correlated to each other, e.g., orthogonal to each other.

The controller 10B may use phase converters 13Ba to 13Bd as shown in FIG. 22, in order to generate modulation codes and demodulation codes which are low-correlated or orthogonal to each other. The phase converters 13Ba and 13Bb shift the phases of the modulation codes m11 to m14 by predetermined amounts of phase shifts to generate the modulation codes m21 to m24 and the modulation codes m31 to m34, respectively. The phase converters 13Bc and 13Bd shift the phases of the demodulation codes d11 to d14 by predetermined amounts of phase shifts to generate the demodulation codes d21 to d24 and the demodulation codes d31 to d34, respectively.

Next, with reference to FIGS. 23A to 24D, we describe a method for transmitting powers of the three-phase power generator 41 to the respective phases' loads 45-1 to 45-3 of the three-phase load, using code modulation and code demodulation.

FIG. 23A is a diagram showing an example of modulation codes of the code modulator 2A-1 and demodulation codes of the code demodulator 4A-1 in the power transmission system of FIG. 18, as a seventh implementation example in which three-phase alternating-current power is transmitted and received. FIG. 23A shows modulation codes inputted to switch elements S1 to S4, and S21 to S24 of the code modulation circuit 23A (FIG. 10) of the code modulator 2A-1, and demodulation codes inputted to switch elements S11 to S14, and S31 to S34 of the code demodulation circuit 33A (FIG. 11) of the code demodulator 4A-1. The modulation codes m11 to m14 of FIG. 23A correspond to the modulation codes m1 to m4 of the code modulation circuit 23A of FIG. 10, respectively, and the demodulation codes d11 to d14 of FIG. 23A correspond to the demodulation codes d1 to d4 of the code demodulation circuit 33A of FIG. 11, respectively.

Figure 23B:
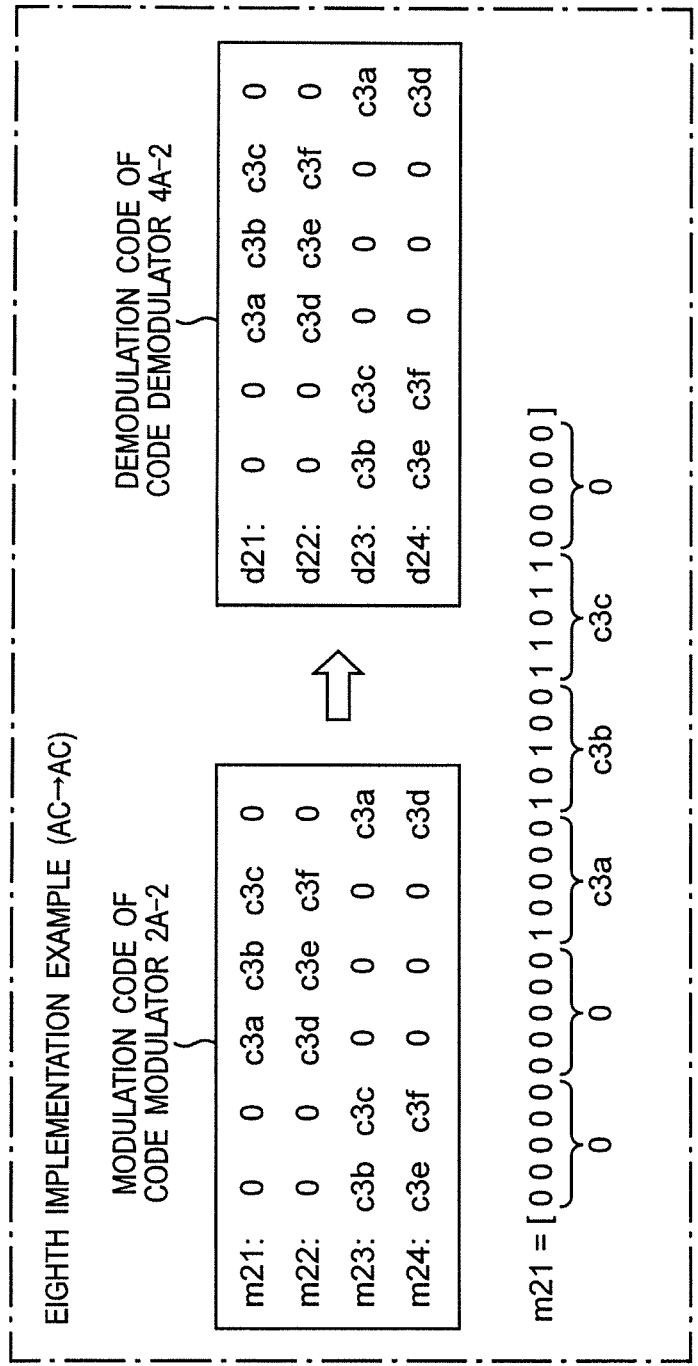
FIG. 23B is a diagram showing an example of a modulation code of the code modulator 2A-2 and a demodulation code of the code demodulator 4A-2 in the power transmission system of FIG. 18, as an eighth implementation example in which three-phase alternating-current power is transmitted and received.

FIG. 23B is a diagram showing an example of modulation codes of the code modulator 2A-2 and demodulation codes of the code demodulator 4A-2 in the power transmission system of FIG. 18, as an eighth implementation example in which three-phase alternating-current power is transmitted and received. FIG. 23B shows modulation codes inputted to switch elements S1 to S4, and S21 to S24 of the code modulation circuit 23A (FIG. 10) of the code modulator 2A-2, and demodulation codes inputted to switch elements S11 to S14, and S31 to S34 of the code demodulation circuit 33A (FIG. 11) of the code demodulator 4A-2. The modulation codes m21 to m24 of FIG. 23B correspond to the modulation codes m1 to m4 of the code modulation circuit 23A of FIG. 10, respectively, and the demodulation codes d21 to d24 of FIG. 23B correspond to the demodulation codes d1 to d4 of the code demodulation circuit 33A of FIG. 11, respectively.

Figure 23C:
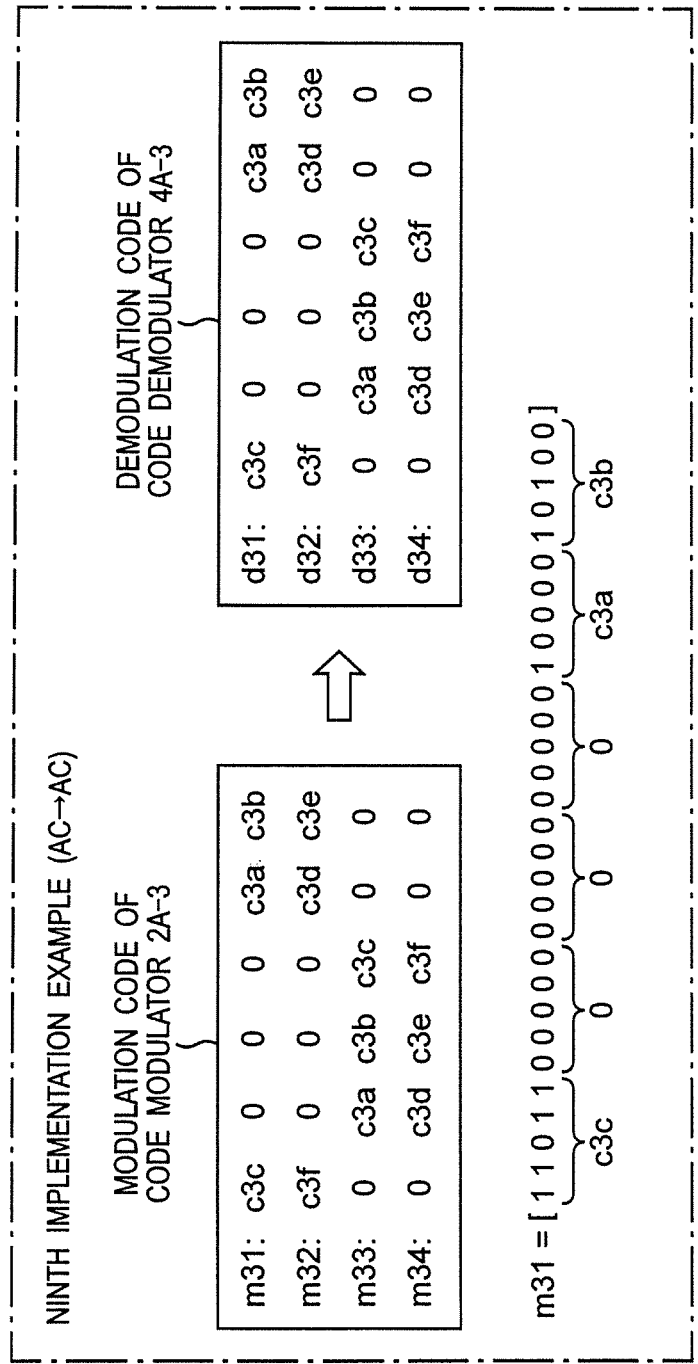
FIG. 23C is a diagram showing an example of a modulation code of the code modulator 2A-3 and a demodulation code of the code demodulator 4A-3 in the power transmission system of FIG. 18, as a ninth implementation example in which three-phase alternating-current power is transmitted and received.

FIG. 23C is a diagram showing an example of modulation codes of the code modulator 2A-3 and demodulation codes of the code demodulator 4A-3 in the power transmission system of FIG. 18, as a ninth implementation example in which three-phase alternating-current power is transmitted and received. FIG. 23C shows modulation codes inputted to switch elements S1 to S4, and S21 to S24 of the code modulation circuit 23A (FIG. 10) of the code modulator 2A-3, and demodulation codes inputted to switch elements S11 to S14, and S31 to S34 of the code demodulation circuit 33A (FIG. 11) of the code demodulator 4A-3. The modulation codes m31 to m34 of FIG. 23C correspond to the modulation codes m1 to m4 of the code modulation circuit 23A of FIG. 10, respectively, and the demodulation codes d31 to d34 of FIG. 23C correspond to the demodulation codes d1 to d4 of the code demodulation circuit 33A of FIG. 11, respectively.

The principle of code modulation and code demodulation of current is similar to that of the second embodiment, and therefore, its explanation is omitted here.

Next, we describe a mechanism for generating the modulated currents I51 to I53 by code modulation using the code modulators 2A-1 to 2A-3, superposing the modulated currents I51 to I53 to generate the modulated current I61, demodulating the modulated current I61 to generate the demodulated currents I71 to I73 by code demodulation using the code demodulators 4A-1 to 4A-3, and passing the demodulated currents I71 to I73 to the desired loads 45-1 to 45-3, respectively.

As described above, the code modulators 2A-1 to 2A-3 have the same configuration with each other, and are provided with the code modulation circuit 23A of FIG. 10. The differences among the code modulators 2A-1 to 2A-3 reside in use of the modulation codes m11 to m14, the modulation codes m21 to m24, and the modulation codes m31 to m34, which are different from each other. In addition, the code demodulators 4A-1 to 4A-3 also have the same configuration with each other, and are provided with the code demodulation circuit 33A of FIG. 11. The differences among the code demodulators 4A-1 to 4A-3 reside in use of the demodulation codes d11 to d14, the demodulation codes d21 to d24, and the demodulation codes d31 to d34, which are different from each other.

The modulation codes of the code modulator 2A-1 are set in a manner similar to that of the modulation codes of the third implementation example in which alternating-current power is transmitted and received (FIG. 12A) in the power transmission system according to the second embodiment. More specifically, in a first half period of each cycle of the alternating current, in which a positive current flows, a code sequence [c3a c3b c3c] is assigned as the modulation code m11, and a code sequence [c3d c3e c3f] is assigned as the modulation code m12, and thus, the switch elements S1 to S4 are controlled accordingly. In this period, the modulation code m13 and the modulation code m14 are kept zero, and thus, the switch elements S21 to S24 are disconnected, and no current flows. On the other hand, in a second half period of each cycle of the alternating current, in which a negative current flows, the modulation code m11 and the modulation code m12 are kept zero, and thus, the switch elements S1 to S4 are disconnected, and no current flows. In this period, a code sequence [c3a c3b c3c] is assigned as the modulation code m13, and the code sequence [c3d c3e c3f] is assigned as the modulation code m14, and thus, the switch elements S21 to S24 are controlled accordingly.

The modulation codes of the code modulator 2A-2 are set by shifting the phases of the modulation codes of the code modulator 2A-1 by a predetermined amount of phase shift using the phase converter 13Ba, such that the second-phase generated current I42 is associated with the first-phase generated current I41 by the phase shift. According to the present implementation example, since the respective phases' generated currents I41 to I43 of the three-phase power generator 41 are code-modulated, the second-phase generated current I42 is phase-shifted in advance by 120 degrees with respect to the first-phase generated current I41. Therefore, as shown in FIG. 23B, the modulation codes of the code modulator 2A-2 is set by shifting the phase of the modulation codes of the code modulator 2A-1 by 120 degrees in advance.

Similarly, the modulation codes of the code modulator 2A-3 are set by shifting the phases of the modulation codes of the code modulator 2A-1 by a predetermined amount of phase shift using the phase converter 13Bb, such that the third-phase generated current I43 is associated with the first-phase generated current I41 by the phase shift. According to the present implementation example, since the respective phases' generated currents I41 to I43 of the three-phase power generator 41 are code-modulated, the third-phase generated current I43 is phase-shifted in advance by 240 degrees with respect to the first-phase generated current I41. Therefore, as shown in FIG. 23C, the modulation codes of the code modulator 2A-3 is set by shifting the phase of the modulation codes of the code modulator 2A-1 by 240 degrees in advance.

The modulation codes of the code modulators 2A-2 to 2A-3 are generated from the modulation codes of the code modulator 2A-1 using the phase converters 13Ba and 13Bb. Accordingly, the modulation codes of the code modulators 2A-1 to 2A-3 can be generated with burden lower than that of independently generating the respective modulation codes of the code modulators 2A-1 to 2A-3.

In this case, Gold sequences of five stages are adopted, and different Gold sequences are assigned as the code sequences c3a to c3f. The code sequence c3a and the code sequence c3c are orthogonal to each other, and the code sequence c3d and the code sequence c3f are orthogonal to each other. Accordingly, the modulation codes m11 to m14 are also orthogonal to each other, the modulation codes m21 to m24 are also orthogonal to each other, and the modulation codes m31 to m34 are also orthogonal to each other, each made of the code sequences c3a to c3f.

Demodulation codes of the code demodulators 4A-1 to 4A-3 are set in a manner similar to that of the modulation codes of the code modulators 2A-1 to 2A-3.

Accordingly, three sets of modulation codes for modulating power of three phase components of three-phase alternating-current power by code modulation are orthogonal to each other, and synchronized with corresponding phase components. Three sets of demodulation codes for demodulating the superposed three code-modulated waves by code demodulation are orthogonal to each other, and are synchronized with the corresponding phase components of the three-phase alternating-current power.

Figure 24A:
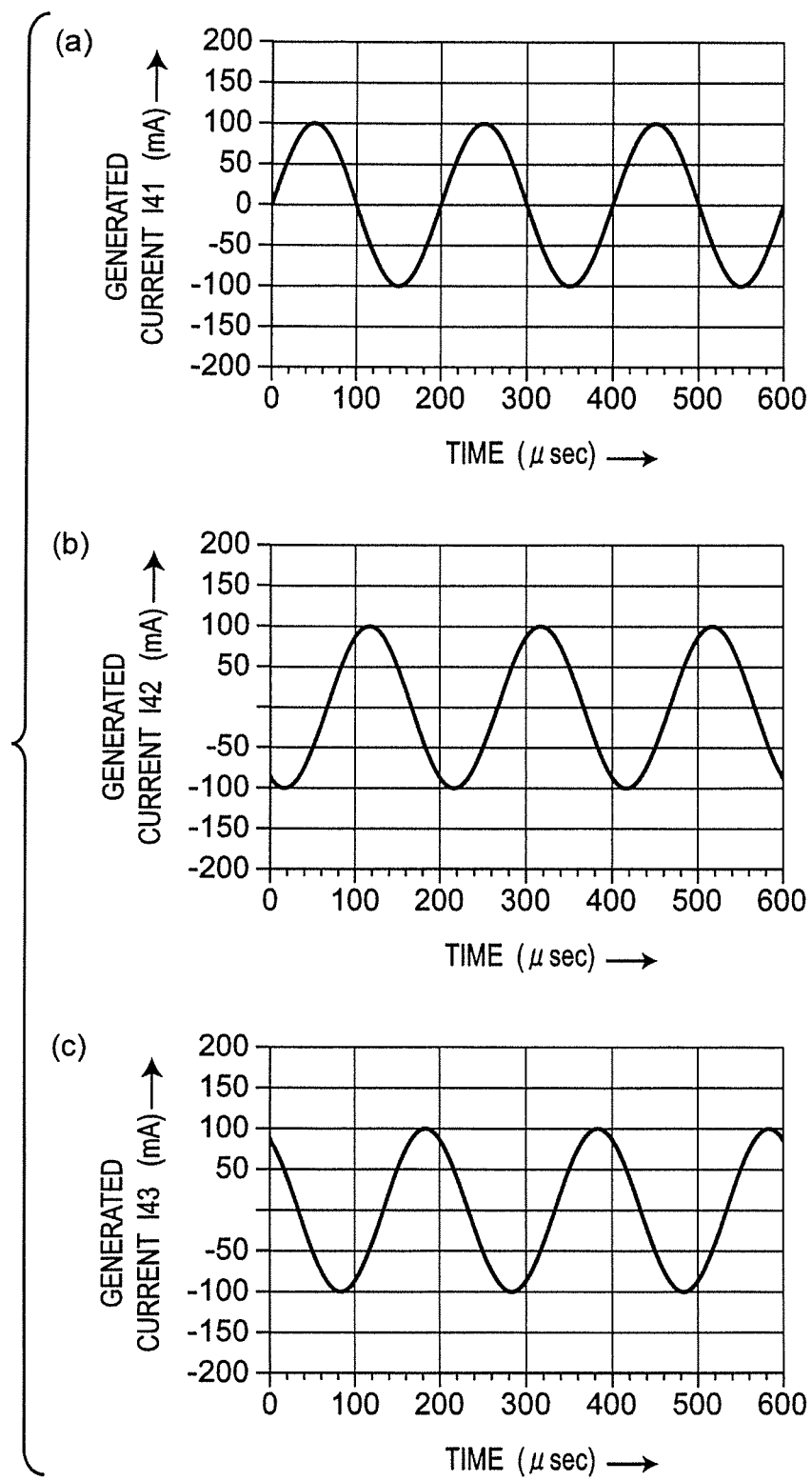
FIG. 24A is a waveform diagram showing exemplary signal waveforms in the power transmission system of FIG. 18, in which: (a) shows a signal waveform of a generated current I41; (b) shows a signal waveform of a generated current I42; and (c) shows a signal waveform of a generated current I43.
Figure 24B:
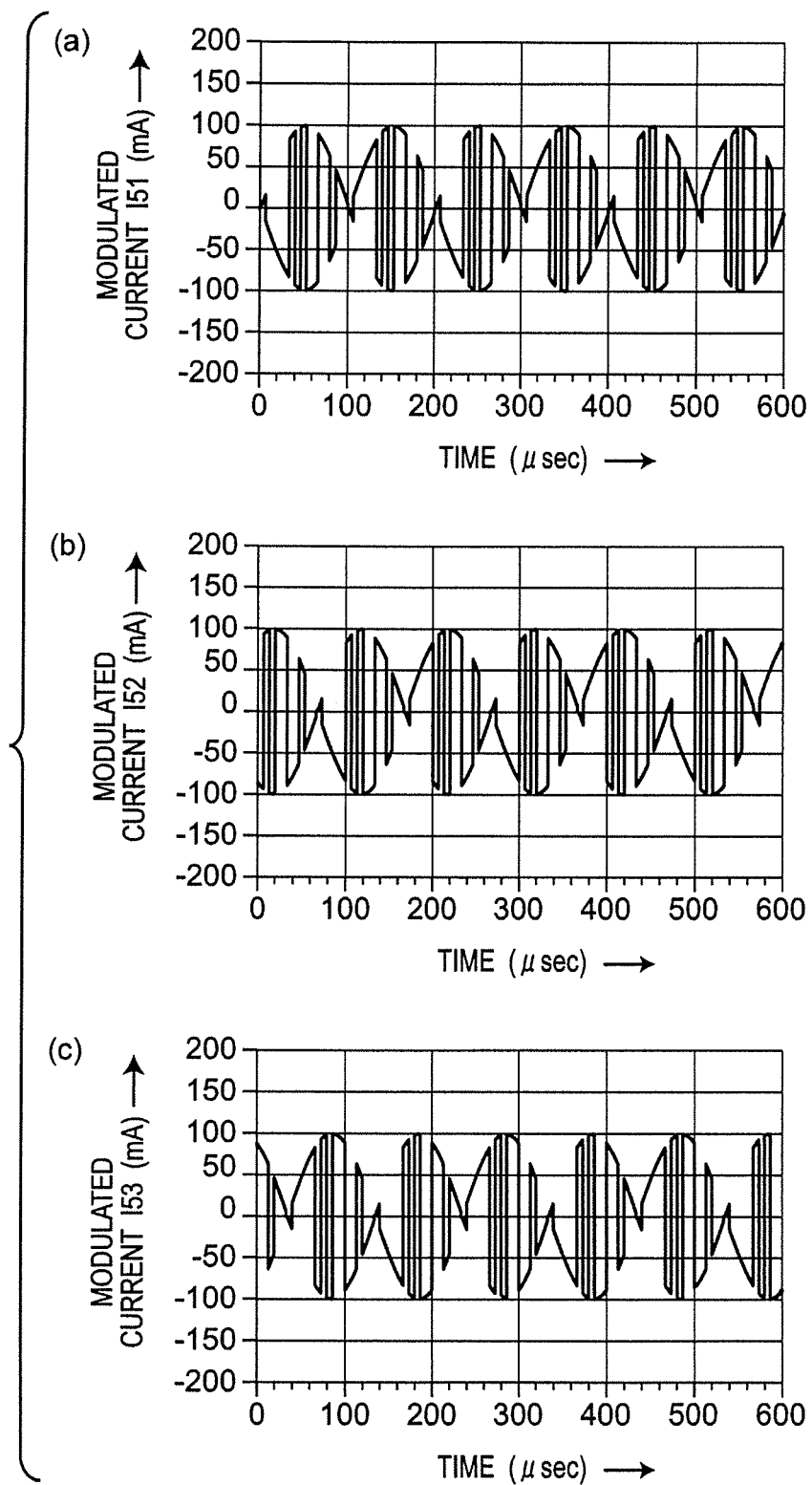
FIG. 24B is a waveform diagram showing exemplary signal waveforms in the power transmission system of FIG. 18, in which: (a) shows a signal waveform of a modulated current I51; (b) shows a signal waveform of a modulated current I52; and (c) shows a signal waveform of a modulated current I53.
Figure 24C:
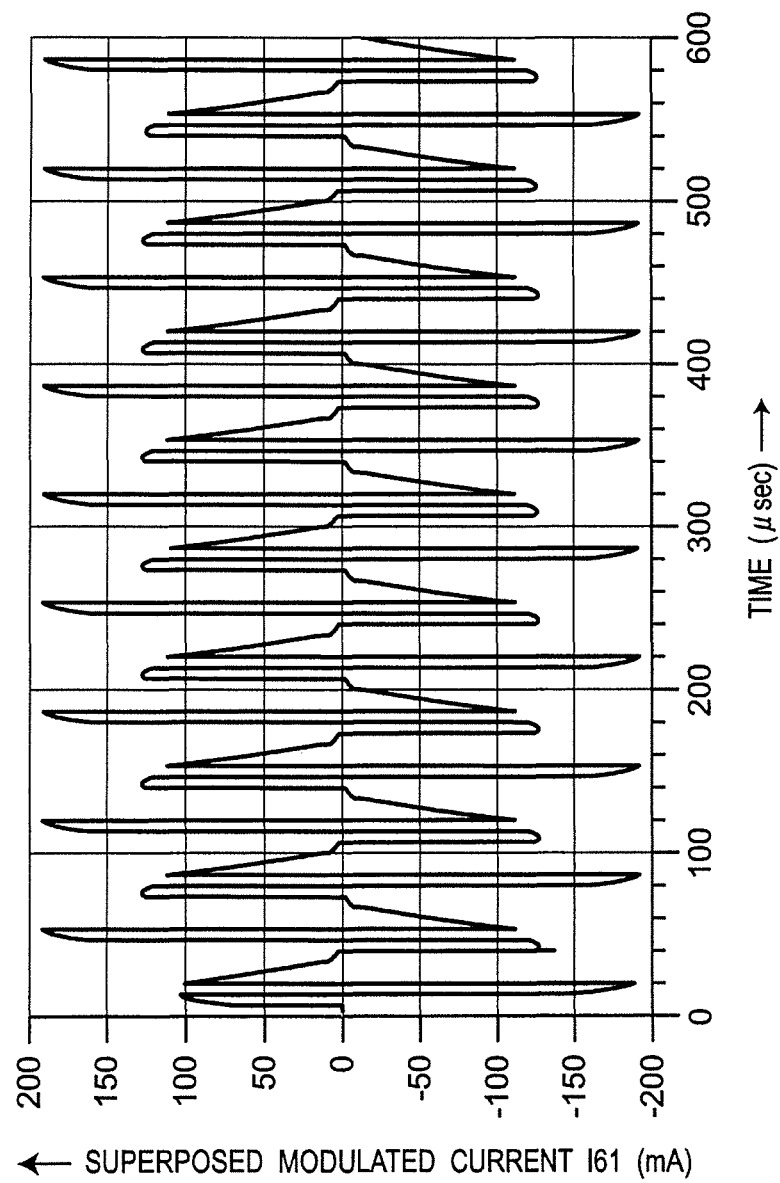
FIG. 24C is a waveform diagram of an exemplary signal waveform of the power transmission system of FIG. 18, showing a superposed modulated current I61.
Figure 24D:
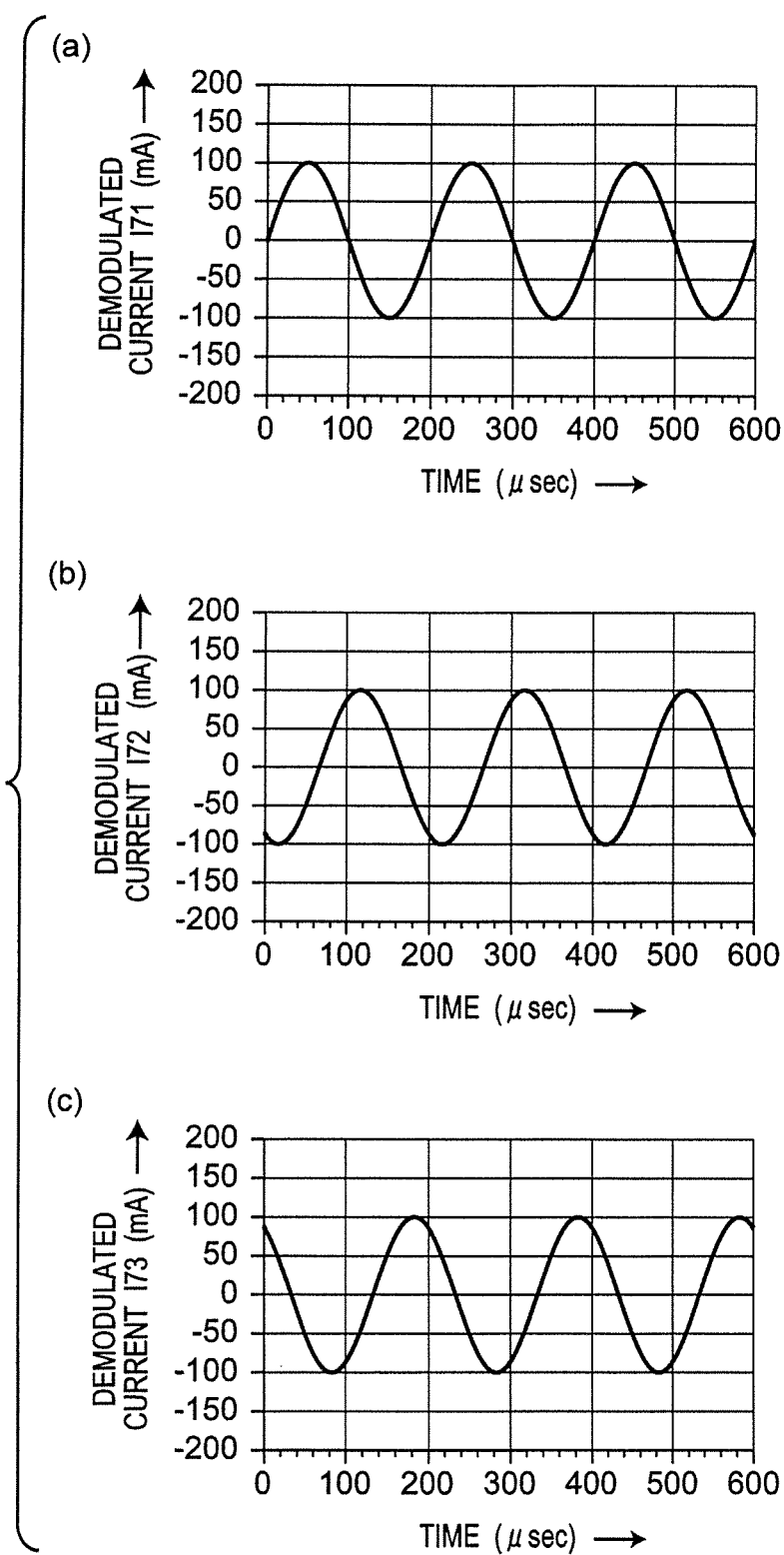
FIG. 24D is a waveform diagram showing exemplary signal waveforms in the power transmission system of FIG. 18, in which: (a) shows a signal waveform of a demodulated current I71; (b) shows a signal waveform of a demodulated current I72; and (c) shows a signal waveform of a demodulated current I73.

FIGS. 24A to 24D are waveform diagrams each showing exemplary signal waveforms of the power transmission system of FIG. 18. In FIG. 24A, (a) shows a signal waveform of the generated current I41, (b) shows a signal waveform of the generated current I42, and (c) shows a signal waveform of the generated current I43. In FIG. 24B, (a) shows a signal waveform of the modulated current I51, (b) shows a signal waveform of the modulated current I52, and (c) shows a signal waveform of the modulated current I53. FIG. 24C shows the superposed modulated current I61. In FIG. 24D, (a) shows a signal waveform of the demodulated current I71, (b) shows a signal waveform of the demodulated current I72, and (c) shows a signal waveform of the demodulated current I73.

For example, each of the respective phases' generated currents I41 to I43 of the three-phase power generator 41 has a sinusoidal waveform at a frequency of 5 kHz, which cyclically repeats positive and negative periods every 200 microseconds. In addition, the phase of the second-phase generated current I42 is shifted by 120 degrees in advance with respect to the phase of the first-phase generated current I41, and the phase of the third-phase generated current I43 is shifted by 240 degrees in advance with respect to the phase of the first-phase generated current I41.

As can be seen from FIGS. 24A to 24D, the generated currents I41 to I43 inputted to the code modulators 2A-1 to 2A-2 are correctly demodulated by the corresponding code demodulators 4A-1 to 4A-3, such that the demodulated currents I71 to I73 having desired magnitudes are passed to the loads 45-1 to 45-3, respectively.

As described above, according to the present embodiment, by using the code modulation subsystem 42 and the code demodulation subsystem 44, it is possible to transmit the respective phases' generated currents I41 to I43 of the three-phase power generator 41 via one transmission path 43 in a multiplexed manner, and separate the respective phases' demodulated currents I71 to I73 from each other. Accordingly, it is possible to achieve a favorable power transmission system capable of simultaneously transmitting of respective phases' currents of the three-phase power generator 41 to the three-phase load 45.

According to the present embodiment, it is possible to transmit power in the power transmission system including the three-phase power generator 41 and the three-phase load 45, with a simple configuration.

In addition, according to the present embodiment, by using code modulation and code demodulation, it is possible to transmit power even when the power transmission system includes a combination of different types of power supplies and/or loads (e.g., other power supplies and/or loads of single-phase, three-phase, or multiphase alternating current; power supplies and/or loads of direct current).

Three-phase power generators are widely used, mainly, in domestic and foreign industrial fields. Conventionally, when supplying power to an electrical facility using a three-phase power generator, three-phase four-wire cables (see FIG. 20) are often used as a transmission path. However, according to the present embodiment, single-phase two-wire cables can be used as a transmission path. Accordingly, it is possible to reduce costs for installation of the transmission path, and reduce costs by reducing the number of transmission paths, etc.

A power transmission system according to the present disclosure can actively specify combinations of an originating power supply and a destined load, and specify amounts of power to be transmitted, and then, simultaneously and independently transmit power among the combinations via one transmission path, as well as reduces the number of power conversion circuits involved in power transmission, and the number of power lines.

The power transmission system may include a power meter(s) for measuring entire generated power or respective phase-windings' generated power of the three-phase power generator 41, and may include a power meter(s) for measuring entire power consumption or respective phase-windings' power consumption of the three-phase load 45, in a manner similarly to that of the power meters 1m and 5m of FIG. 1. The power meters are not shown in FIG. 18 for ease of illustration.

In order to generate modulation codes and demodulation codes, it is not limited to use the phase converters 13Ba to 13Bd of the controller 10B, but any other method can be used, as long as it is possible to generate modulation codes and demodulation codes which are low-correlated or orthogonal to each other.

Next, with reference to FIGS. 25 to 28, we describe power transmission systems according to modified embodiments of the fourth embodiment.

Figure 25:
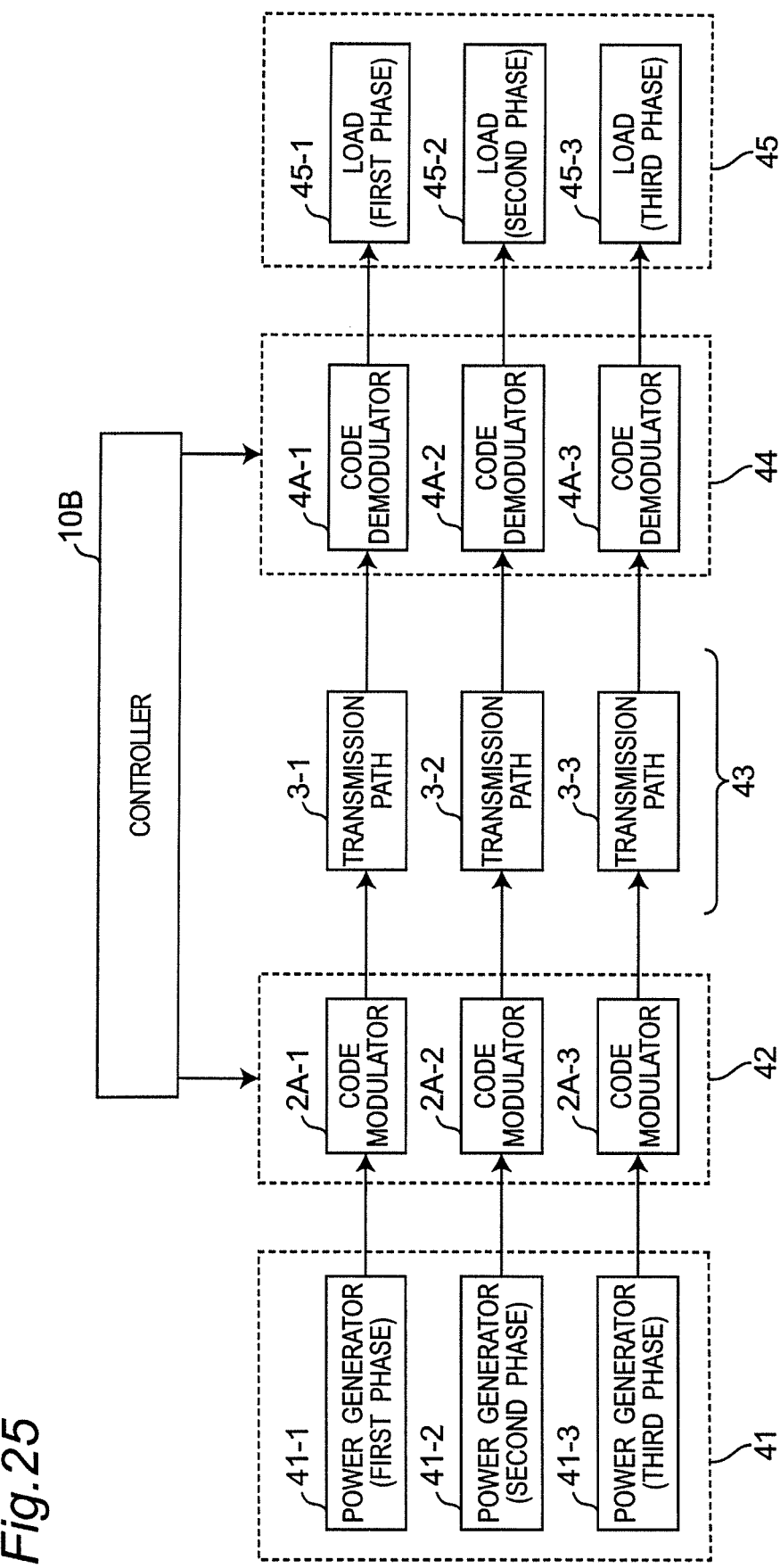
FIG. 25 is a block diagram showing a configuration of a power transmission system according to a first modified embodiment of the fourth embodiment.

FIG. 25 is a block diagram showing a configuration of a power transmission system according to a first modified embodiment of the fourth embodiment. The transmission path 43 of the power transmission system of FIG. 25 is not configured to transmit a superposed modulated current including respective phases' modulated currents as in the transmission path 43 of FIGS. 19 to 21, but is provided with transmission paths 3-1 to 3-3 for individually transmitting the respective phases' modulated currents. The transmission path 3-1 transmits a modulated current obtained by modulating the first-phase generated current of the three-phase power generator 41 by code modulation. The transmission path 3-2 transmits a modulated current obtained by modulating the second-phase generated current of the three-phase power generator 42 by code modulation. The transmission path 3-3 transmits a modulated current obtained by modulating the third-phase generated current of the three-phase power generator 43 by code modulation. Each of the transmission paths 3-1 to 3-3 includes, e.g., two power lines. In other respects, the power transmission system of FIG. 25 is configured in a manner similar to that of the power transmission system of FIG. 18.

According to the power transmission system shown in FIG. 25, by using the individual transmission paths 3-1 to 3-3 for flowing the respective phases' modulated currents of the three-phase power generator 41, it is possible to provide a favorable power transmission system capable of simultaneously transmitting desired currents to the three-phase load 45. For example, by using the existing transmission paths (e.g., any of transmission paths of FIGS. 19 to 21), it is possible to reduce costs for installation of the transmission paths.

Figure 26:
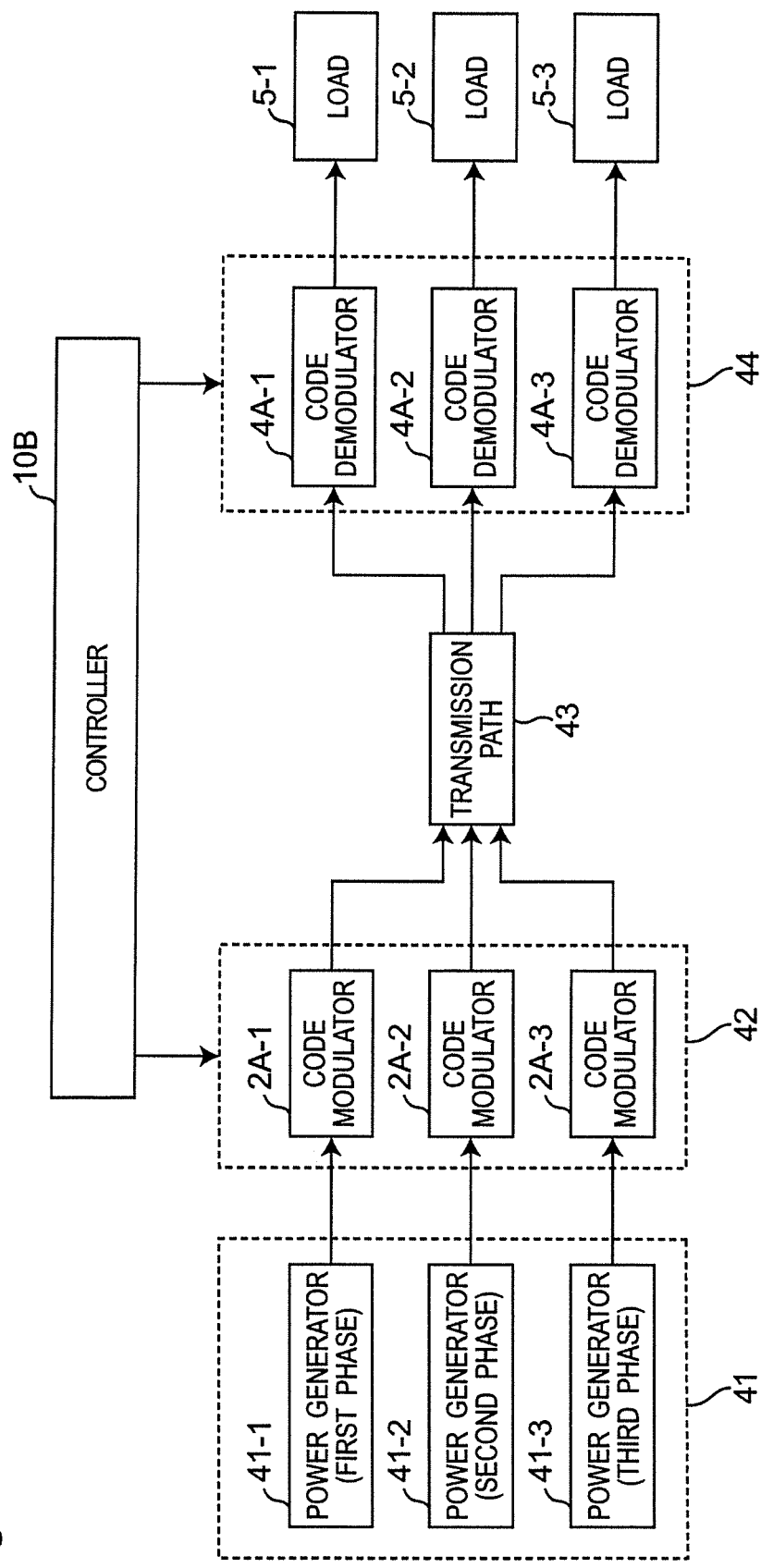
FIG. 26 is a block diagram showing a configuration of a power transmission system according to a second modified embodiment of the fourth embodiment.

FIG. 26 is a block diagram showing a configuration of a power transmission system according to a second modified embodiment of the fourth embodiment. The power transmission system of FIG. 26 includes three individual loads 5-1 to 5-3 in place of the three-phase load 45 of FIG. 18. Each of the loads 5-1 to 5-3 operates with direct current or single-phase alternating current, in a manner similarly to that of the loads of the power transmission systems according to the first to third embodiments.

The controller 10B of FIG. 26 sets modulation codes to the code modulators 2A-1 to 2A-3, and sets demodulation codes to the code demodulators 4A-1 to 4A-3, in a manner similarly to that of the controller 10B of FIG. 18.

According to the power transmission system of FIG. 26, at least one of the loads 5-1 to 5-3 may be provided at a location geographically remote from the other loads. The code demodulators 4A-1 to 4A-3 may also be provided at locations geographically remote from each other, dependent on the locations of the loads 5-1 to 5-3. In this case, each of the code demodulators 4A-1 to 4A-3 operates as a power receiver apparatus.

According to the power transmission system of FIG. 26, it is possible to supply respective phases' powers generated by the three-phase power generator 41, to the individual loads 5-1 to 5-3, and thus, it is possible to construct a flexible power transmission system.

Figure 27:
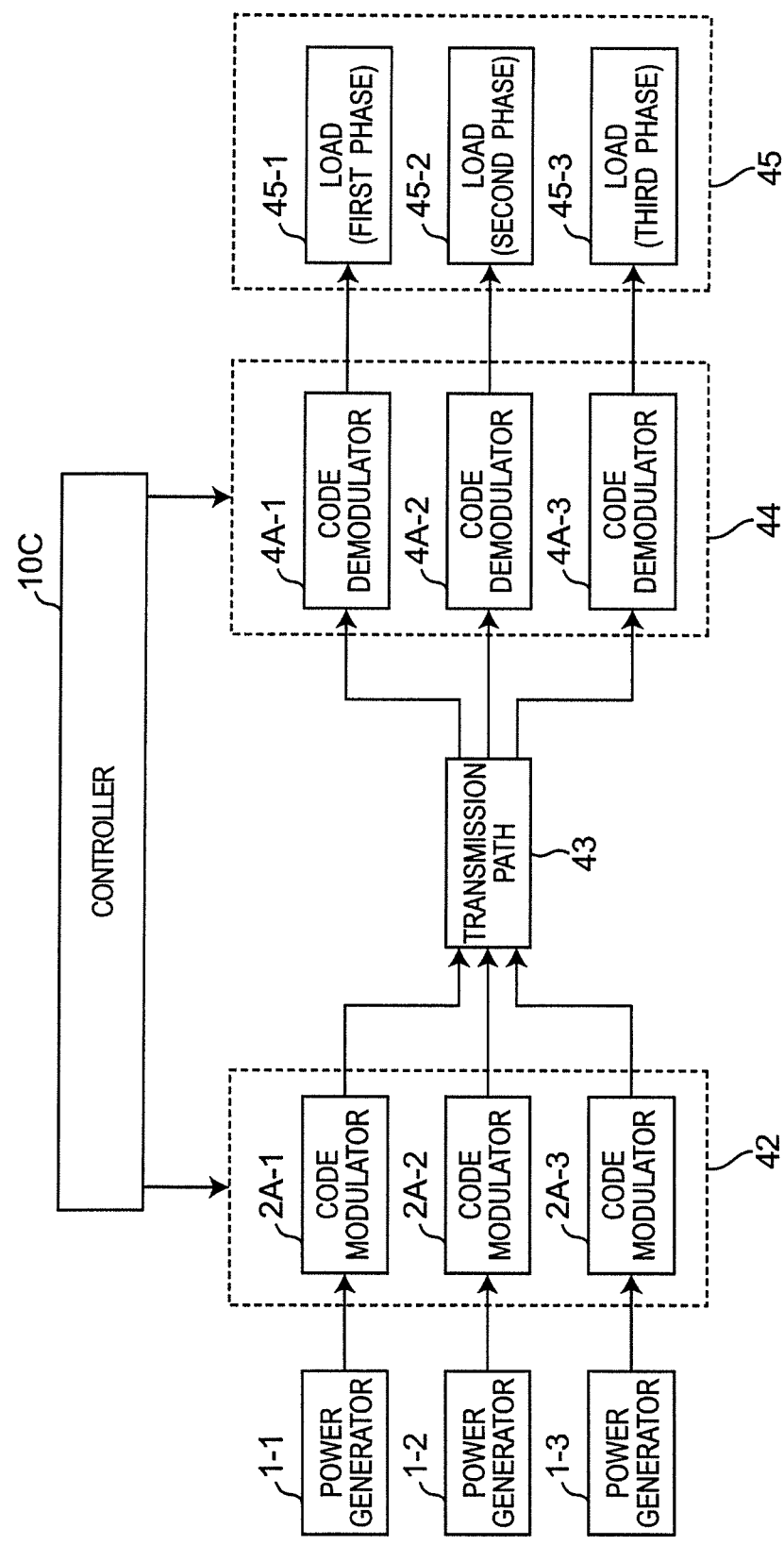
FIG. 27 is a block diagram showing a configuration of a power transmission system according to a third modified embodiment of the fourth embodiment.

FIG. 27 is a block diagram showing a configuration of a power transmission system according to a third modified embodiment of the fourth embodiment. The power transmission system of FIG. 27 includes three individual power generators 1-1 to 1-3 in place of the three-phase power generator 41 of FIG. 18, and includes a controller 10C in place of the controller 103. Each of the power generators 1-1 to 1-3 generates direct current or single-phase alternating current, in a manner similarly to that of the power generator of the power transmission system in each of the first to third embodiments.

The controller 10C of FIG. 27 sets modulation codes low-correlated or orthogonal to each other, to the code modulators 2A-1 to 2A-3, and sets demodulation codes corresponding to the modulation codes, to the code demodulators 4A-1 to 4A-3, respectively. Although the three-phase load 45 requires three-phase alternating-current power with a phase difference of 120 degrees to be inputted, the generated currents of the respective power generators 1-1 to 1-3 may not be alternating currents with a phase difference of 120 degrees. Accordingly, in order to supply three-phase alternating-current power to the three-phase load 45, the controller 10C multiplies the modulation codes or the demodulation codes by codes representing waveforms and phases of demodulated currents, in advance, such that the code demodulators 4A-1 to 4A-3 generates the demodulated currents by code demodulation with a phase difference of 120 degrees. In order to supply three-phase alternating-current power to the three-phase load 45, instead of using codes representing the waveforms and phases of the demodulated currents, the code modulators 2A-1 to 2A-3 may be provided with phase converters for shifting phases of generated currents or modulated currents, or the code demodulators 4A-1 to 4A-3 may be provided with phase converters for shifting phases of modulated currents or demodulated currents.

According to the power transmission system of FIG. 27, at least one of the power generators 1-1 to 1-3 may be provided at a location geographically remote from the other power generators. The code modulators 2A-1 to 2A-3 may also be provided at locations geographically remote from each other, dependent on the locations of the power generators 1-1 to 1-3. In this case, each of the code modulators 2A-1 to 2A-3 operates as a power transmitter apparatus.

Accordingly, it is possible supply powers for the three-phase load 45 requiring three-phase alternating-current power, from any three single-phase power generators, without using a three-phase power generator, and thus, it is possible to construct a flexible power transmission system.

Figure 28:
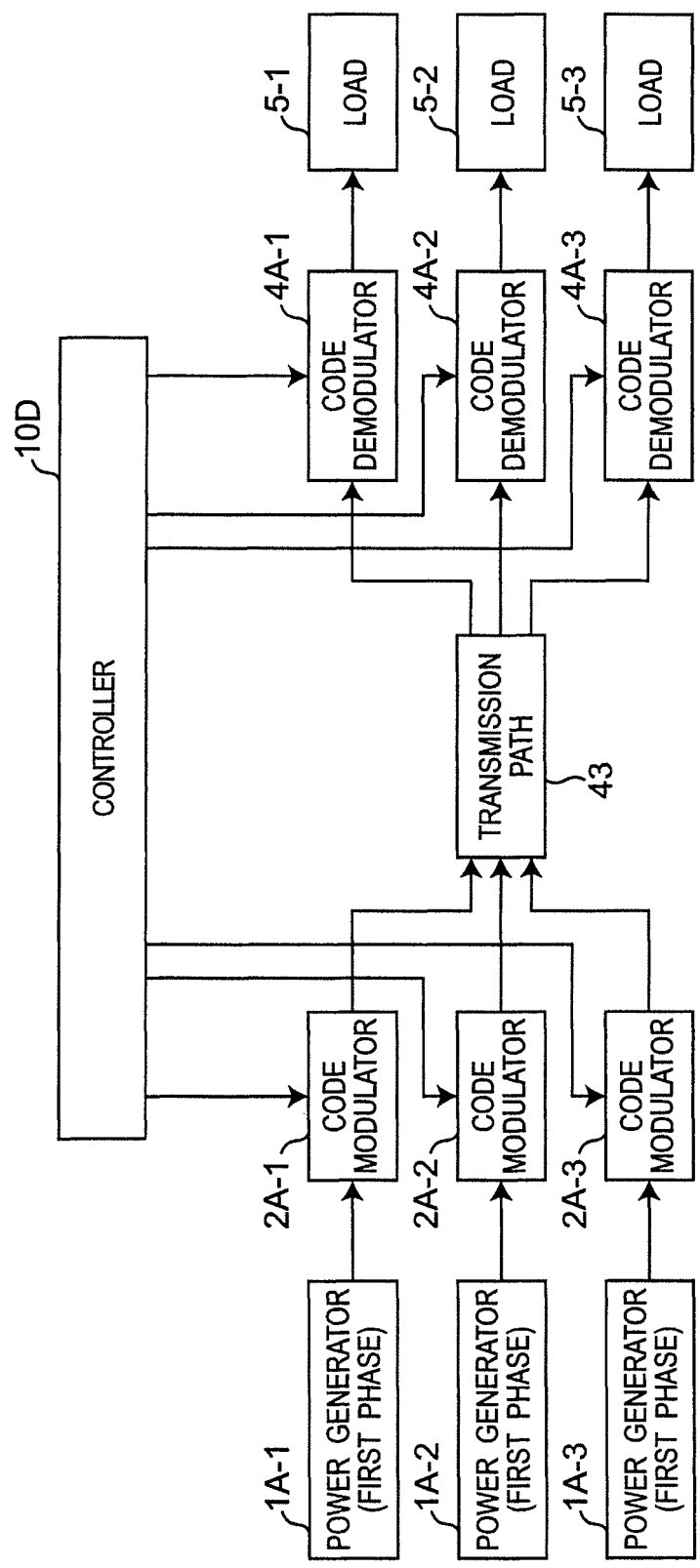
FIG. 28 is a block diagram showing a configuration of a power transmission system according to a fourth modified embodiment of the fourth embodiment.

FIG. 28 is a block diagram showing a configuration of a power transmission system according to a fourth modified embodiment of the fourth embodiment. The power transmission system of FIG. 28 includes power generators 1A-1 to 1A-3, the code modulators 2A-1 to 2A-3, the transmission path 43, the code demodulators 4A-1 to 4A-3, the loads 5-1 to 5-3, and a controller 10D. According to the power transmission system of FIG. 28, the code modulators 2A-1 to 2A-3 operate as power transmitter apparatuses, and the code demodulators 4A-1 to 4A-3 operate as power receiver apparatuses.

The power generator 1A-1 is a first-phase winding of a three-phase power generator or multiphase power generator. The power generator 1A-2 is a first-phase winding of another three-phase power generator or multiphase power generator. The power generator 1A-3 is a first-phase winding of yet another three-phase power generator or multiphase power generator. The code modulators 2A-1 to 2A-3, the transmission path 43, the code demodulators 4A-1 to 4A-3, and the loads 5-1 to 5-3 are configured in a manner similar to that of the corresponding constituent elements of FIG. 26.

The controller 10D sets modulation codes to the code modulator(s) which transmits power, among the code modulators 2A-1 to 2A-3, and sets demodulation codes to the code demodulator(s) which receives power, among the code demodulators 4A-1 to 4A-3. For example, when transmitting power from the code modulator 2A-1 to the code demodulator 4A-1, the controller 10D sets modulation codes to the code modulator 2A-1, and sets demodulation codes to the code demodulator 4A-1, both codes being based on one code sequence. When simultaneously transmitting power from the code modulator 2A-2 to the code demodulator 4A-2, the controller 10D sets modulation codes to the code modulator 2A-2, and sets demodulation codes to the code demodulator 4A-2, both codes being based on another different code sequence. When simultaneously transmitting power from the code modulator 2A-3 to the code demodulator 4A-3, the controller 10D sets modulation codes to the code modulator 2A-3, and sets demodulation codes to the code demodulator 4A-3, both codes being based on yet another different code sequence. When simultaneously transmitting powers from the plurality of code modulators 2A-1 to 2A-3 to the plurality of code demodulators 4A-1 to 4A-3, a plurality of code sequences low-correlated (e.g., orthogonal) to each other may be used.

The other phases' powers of the three-phase power generator or the multiphase power generator including the power generators 1A-1 to 1A-3 may also be modulated by code modulation using other code modulators, transmitted to other code demodulators via the transmission path 43, and supplied to other loads.

According to the power transmission system of FIG. 28, it is possible to supply respective phases' power generated by the three-phase power generators or other phase power generators to the individual loads 5-1 to 5-3, and thus, it is possible to construct a flexible power transmission system.

Fifth Embodiment

Figure 29:
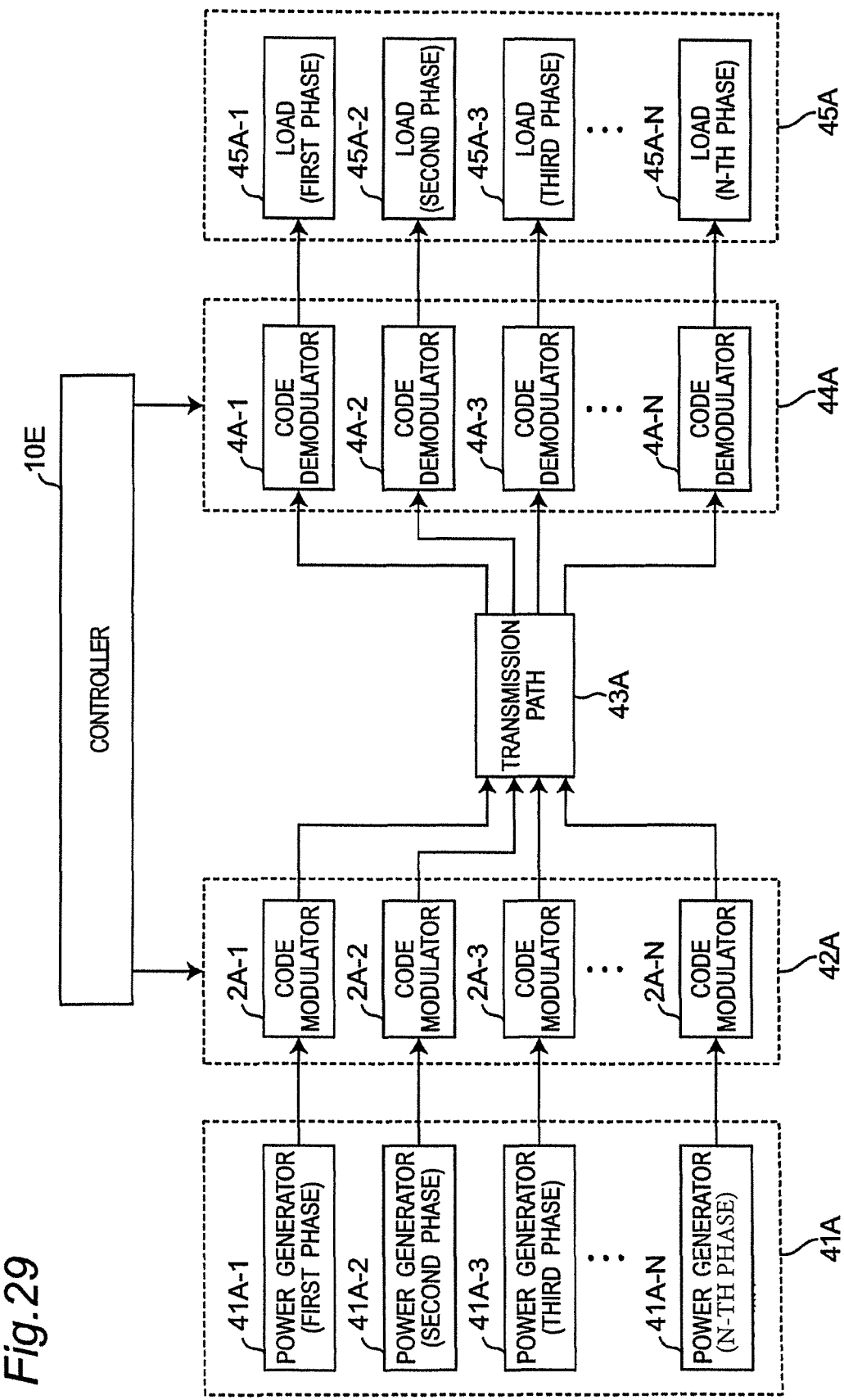
FIG. 29 is a block diagram showing a configuration of a power transmission system according to a fifth embodiment.

FIG. 29 is a block diagram showing a configuration of a power transmission system according to a fifth embodiment. The power transmission system according to the fifth embodiment of FIG. 29 includes an N-phase multiphase power generator 41A, a code modulation subsystem 42A, a transmission path 43A, a code demodulation subsystem 44A, an N-phase multiphase load 45A, and a controller 10E. N is an integer 2 or more. According to the power transmission system of FIG. 29, the code modulation subsystem 42A operates as a power transmitter apparatus, and the code demodulation subsystem 44A operates as a power receiver apparatus.

The multiphase power generator 41A generates multiphase alternating-current power, including powers of first to N-th phase components with a phase difference of 360/N degrees. FIG. 29 indicates first- to the N-th-phase windings of the multiphase power generator 41A, as power generators 41-1 to 41-N, respectively. The multiphase power generator 41A is provided with a power meter(s) for measuring frequencies of respective phases' generated powers, and their relative phases.

The code modulation subsystem 42A includes code modulators 2A-1 to 2A-N configured in a manner similar to that of the code modulators 2A-1 and 2A-2 of FIG. 15. Each of the code modulators 2A-1 to 2A-N is provided with the code modulation circuit 23A of FIG. 10, and operates in a manner similar to that of the code demodulator according to the second embodiment. The code modulators 2A-1 to 2A-N modulate powers of first to N-th phase components of multiphase alternating-current power to generate code-modulated waves, respectively, by code modulation using modulation codes based on code sequences different from each other, and transmit the code-modulated waves to the code demodulation subsystem 44A via the transmission path 43A.

The transmission path 43A transmits a modulated current, in which modulated currents generated by the code modulators 2A-1 to 2A-N are superposed on one another, from the code modulation subsystem 42A to the code demodulation subsystem 44A. The transmission path 43A may include, e.g., two power lines as shown in FIG. 19, N power lines and a ground line as shown in FIG. 20, or N power lines as shown in FIG. 21.

The code demodulation subsystem 44A includes the code demodulators 4A-1 to 4A-N configured in a manner similar to that of the code demodulators 4A-1 and 4A-2 of FIG. 15. Each of the code demodulators 4A-1 to 4A-N is provided with the code demodulation circuit 33A of FIG. 11, and operates in a manner similar to that of the code demodulator according to the second embodiment. Each of the code demodulators 4A-1 to 4A-N demodulates one code-modulated wave of the received superposed code-modulated waves by code demodulation using a demodulation code based on a code sequence identical to the code sequence of the modulation code used for the code modulation of the one code-modulated wave. In this manner, each of the code demodulators 4A-1 to 4A-N generates the code-demodulated power as power of one of first to N-th phase components of multiphase alternating-current power.

The multiphase load 45A operates with multiphase alternating-current power generated by the code demodulation subsystem 44A. The multiphase load 45A is, e.g., an N-phase motor. FIG. 29 indicates the first- to N-th-phase windings of the multiphase load 45A, as loads 45A-1 to 45A-N, respectively.

Figure 30:
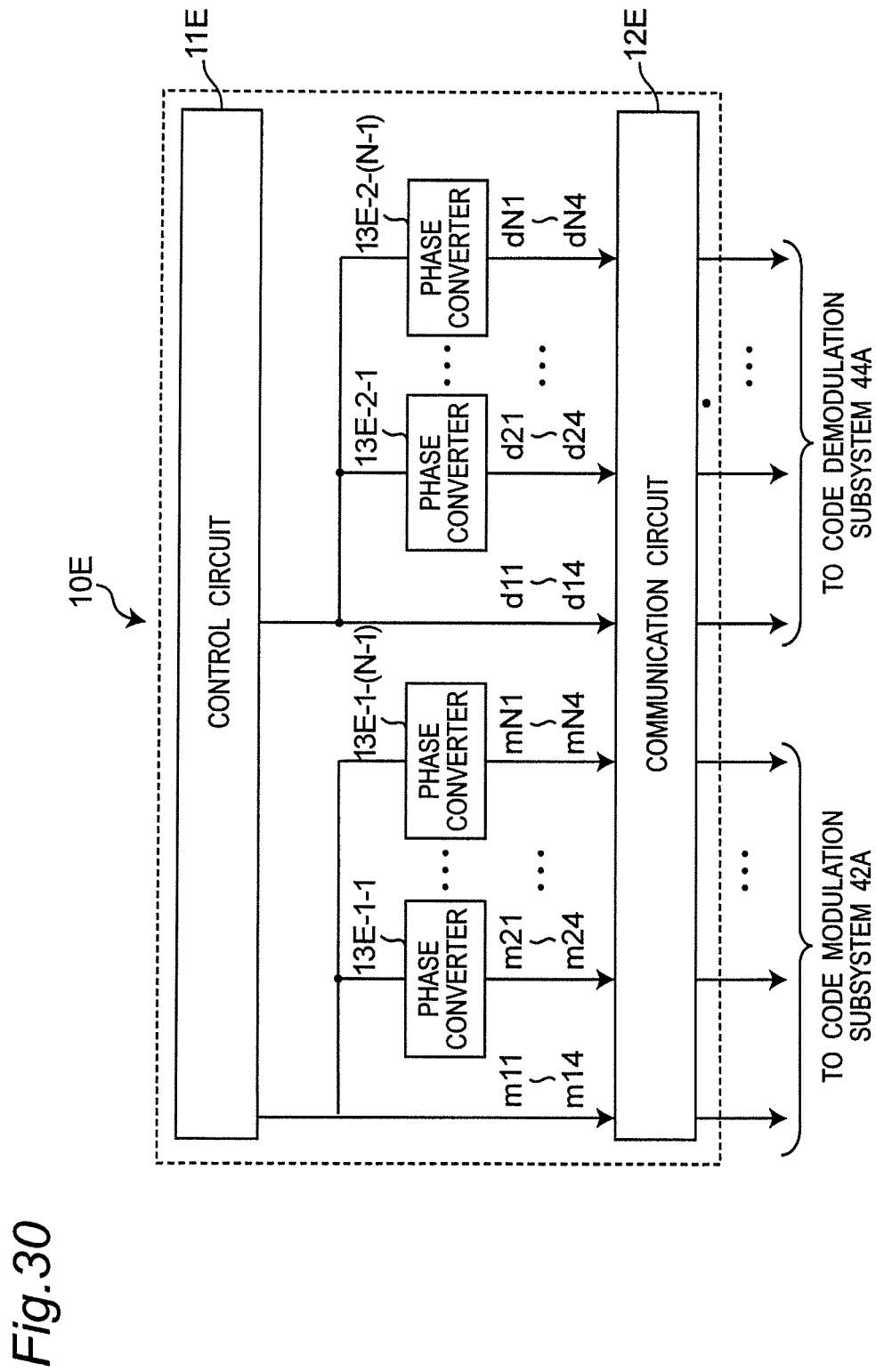
FIG. 30 is a block diagram showing a configuration of a controller 10E of FIG. 29.

FIG. 30 is a block diagram showing a configuration of the controller 10E of FIG. 29. The controller 10E is provided with a control circuit 11E, a communication circuit 12E, and phase converters 13E-1-1 to 13E-1-(N−1) and 13E-2-1 to 13E-2-(N−1).

The control circuit 11E communicates with the code modulators 2A-1 to 2A-N of the code modulation subsystem 42A, and the code demodulators 4A-1 to 4A-N of the code demodulation subsystem 44A, via the communication circuit 12E, and controls operations of these modulators and demodulators. For ease of illustration, FIG. 30 shows only components for setting modulation codes and demodulation codes.

The controller 10E sets code sequences of modulation codes, or information specifying the code sequences, to the code modulators 2A-1 to 2A-N of the code modulation subsystem 42A, and sets code sequences of demodulation codes, or information specifying the code sequences, to the code demodulators 4A-1 to 4A-N of the code demodulation subsystem 44A. The controller 10E sets modulation codes and demodulation codes based on an identical code sequence, to a pair of the code modulator and the code demodulator which transmit and receive the corresponding phase of the multiphase alternating-current power. The controller 10E sets modulation codes m11 to m14, to the code modulator 2A-1, and sets demodulation codes d11 to d14 identical to the modulation codes m11 to m14, to the code demodulator 4A-1. The controller 10E sets modulation codes m21 to m24, to the code modulator 2A-2, and sets demodulation codes d21 to d24 identical to the modulation codes m21 to m24, to the code demodulator 4A-2. The controller 10E sets the other modulation codes similarly, and sets modulation codes of modulation codes mN1 to mN4, to the code modulator 2A-N, and sets demodulation codes of demodulation codes dN1 to dN4 identical to the modulation codes mN1 to mN4, to the code demodulator 4A-N. The modulation codes m11 to m14, the modulation codes m21 to m24, . . . and the modulation codes mN1 to mN4 (and corresponding demodulation codes) are low correlated with each other, e.g., orthogonal to each other.

The controller 10E may use phase converters 13E-1-1 to 13E-1-(N−1) and 13E-2-1 to 13E-2-(N−1) as shown in FIG. 30, in order to generate modulation codes and demodulation codes which are low-correlated or orthogonal to each other. The phase converters 13E-1-1 to 13E-1-(N−1) shift shift the phases of the modulation codes m11 to m14 by predetermined amounts of phase shifts to generate the modulation codes m21 to m24, . . . and the modulation codes mN1 to mN4, respectively. The phase converters 13E-2-1 to 13E-2-(N−1) shift the phases of the demodulation codes d11 to d14 by predetermined amounts of phase shifts to generate the modulation codes d21 to d24, . . . and the demodulation codes dN1 to dN4, respectively.

Suppose that when k is any integer from 1 to N, modulation codes mk1 to mk4 are set to the code modulator 2A-k, and demodulation codes dk1 to dk4 are set to the code demodulator 4A-k, in order to supply power from the k-th-phase power generator 41A-k to the k-th-phase load 45A-k. In this case, the controller 10E shifts the phases of the modulation codes m11 to m14 by an amount of phase (k) defined by the following mathematical expression, to generate the modulation codes mk1 to mk4, respectively. Similarly, the controller 10E shifts the phases of the demodulation codes d11 to d14 by an amount of the phase (k) defined by the following mathematical expression, to generate demodulation codes of the demodulation codes dk1 to dk4, respectively.

$$phase(k) = \frac{2\pi}{N}(k-1). \tag{9}$$

In this manner, the relative phase between the modulation codes of the code modulator 2A-k and the modulation codes of the code modulator 2A-1 is identical to the relative phase between the k-th-phase generated current and the first-phase generated current of the multiphase power generator 41A. Similarly, the relative phase between the demodulation code of the code demodulator 4A-k and the demodulation code of the code demodulator 4A-1 is identical to the relative phase between the k-th-phase generated current and the first-phase generated current of the multiphase power generator 41A.

As described above, according to the present embodiment, by using the code modulation subsystem 42A and the code demodulation subsystem 44A, it is possible to transmit the respective phases' generated currents of the multiphase power generator 41A via one transmission path 43A in a multiplexed manner, and separate the respective phases' demodulated currents from each other. Accordingly, it is possible to achieve a favorable power transmission system capable of simultaneously transmitting of respective phases' currents of the multiphase power generator 41A to the multiphase load 45A. Thus, it is possible to construct a more flexible power transmission system using power obtained by a multiphase power generator, as well as a single-phase power generator and three-phase power generator.

In particular, conventional transmission of multiphase power requires a transmission path including a number of power lines equal to or larger than the number of phases of a power generator, and it is difficult to install such many power lines. On the other hand, according to the present embodiment, it is possible to transmit power using, for example, a transmission path including two power lines. Accordingly, it is possible to construct a more flexible power transmission system using an existing power supply network.

FIG. 26 shows the power transmission system including the one multiphase power generator 41A and the one multiphase load 45A, but not limited thereto. Similarly to FIG. 26, the one multiphase power generator 41A may transmit power to a plurality of loads with total N phases via one transmission path. In addition, similarly to FIG. 27, a plurality of power generators with total N phases may transmit powers to the one multiphase load 45A via one transmission path. Moreover, in one power transmission system, a plurality of multiphase power generators may transmit powers to a plurality of multiphase loads via one transmission path. In this case, there is an advantageous effect of achieving multiple power transmissions via one transmission path, as well as advantageous effects as described above.

According to the present embodiment, with a simple configuration, it is possible to transmit power in a power transmission system including multiphase alternating-current power supplies and/or loads, and transmit power even when the power transmission system includes a combination of different types of power supplies and/or loads.

Sixth Embodiment

Figure 31:
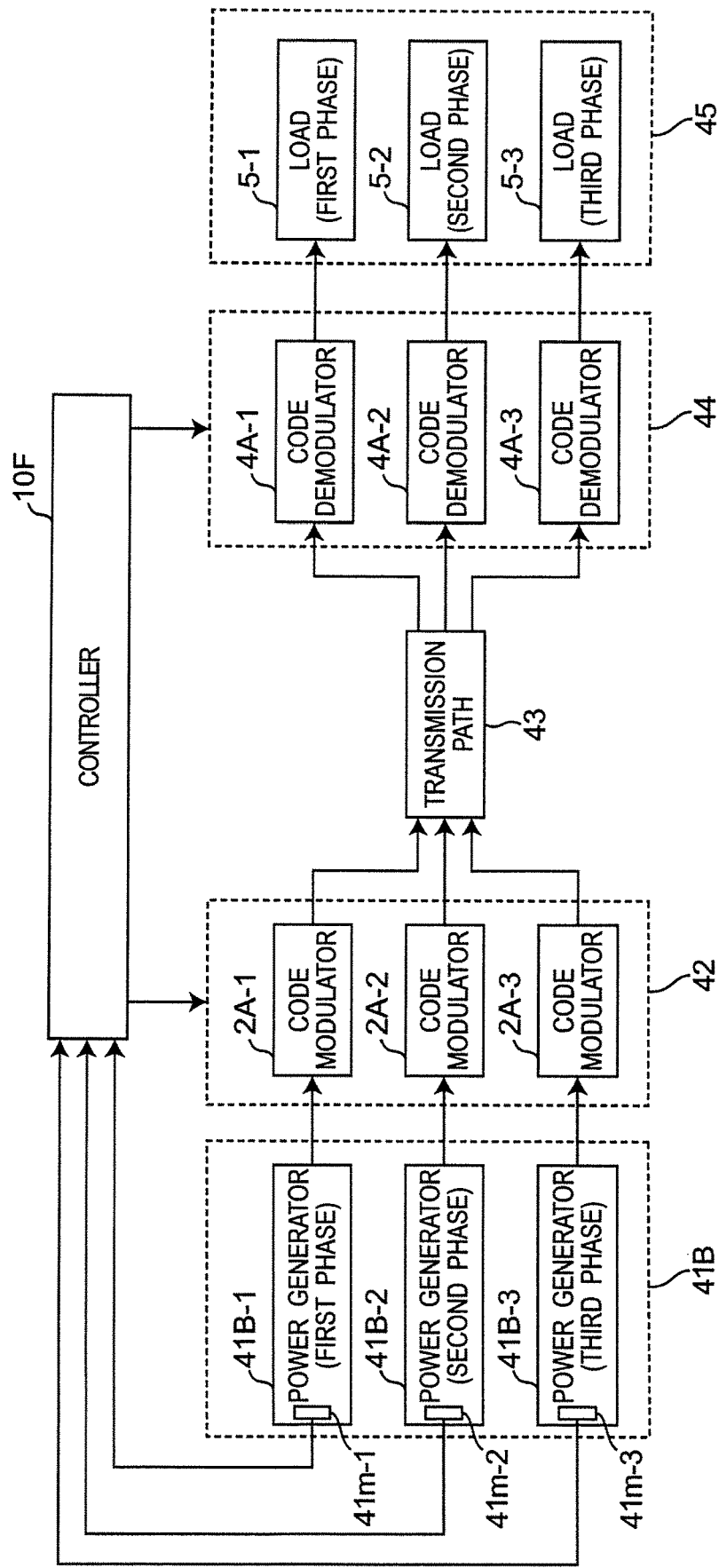
FIG. 31 is a block diagram showing a configuration of a power transmission system according to a sixth embodiment.

FIG. 31 is a block diagram showing a configuration of a power transmission system according to a sixth embodiment. Referring to FIG. 31, the power transmission system according to the sixth embodiment includes a three-phase power generator 41B and a controller 10F, in place of the three-phase power generator 41 and the controller 10B of FIG. 18, respectively. The three-phase power generator 41B is provided with power generators 41B-1 to 41B-3 having zero-crossing detectors 41m-1 to 41m-3, respectively. The zero-crossing detectors 41m-1 to 41m-3 detect zero crossing, where each phase current changes from positive to negative, or from negative to positive. The power generators 41B-1 to 41B-3 indicate the first- to third-phase windings of the three-phase power generator 41, respectively, similarly to the power generators 41-1 to 41-3 of FIG. 18. The controller 10F sets modulation codes and demodulation codes to the code modulators 2A-1 to 2A-3 and the code demodulators 4A-1 to 4A-3, respectively, based on zero crossing, as will be described below. The other constituent elements of the power transmission system of FIG. 31 are configured in a manner similar to that of the corresponding constituent elements of FIG. 18.

Figure 32:
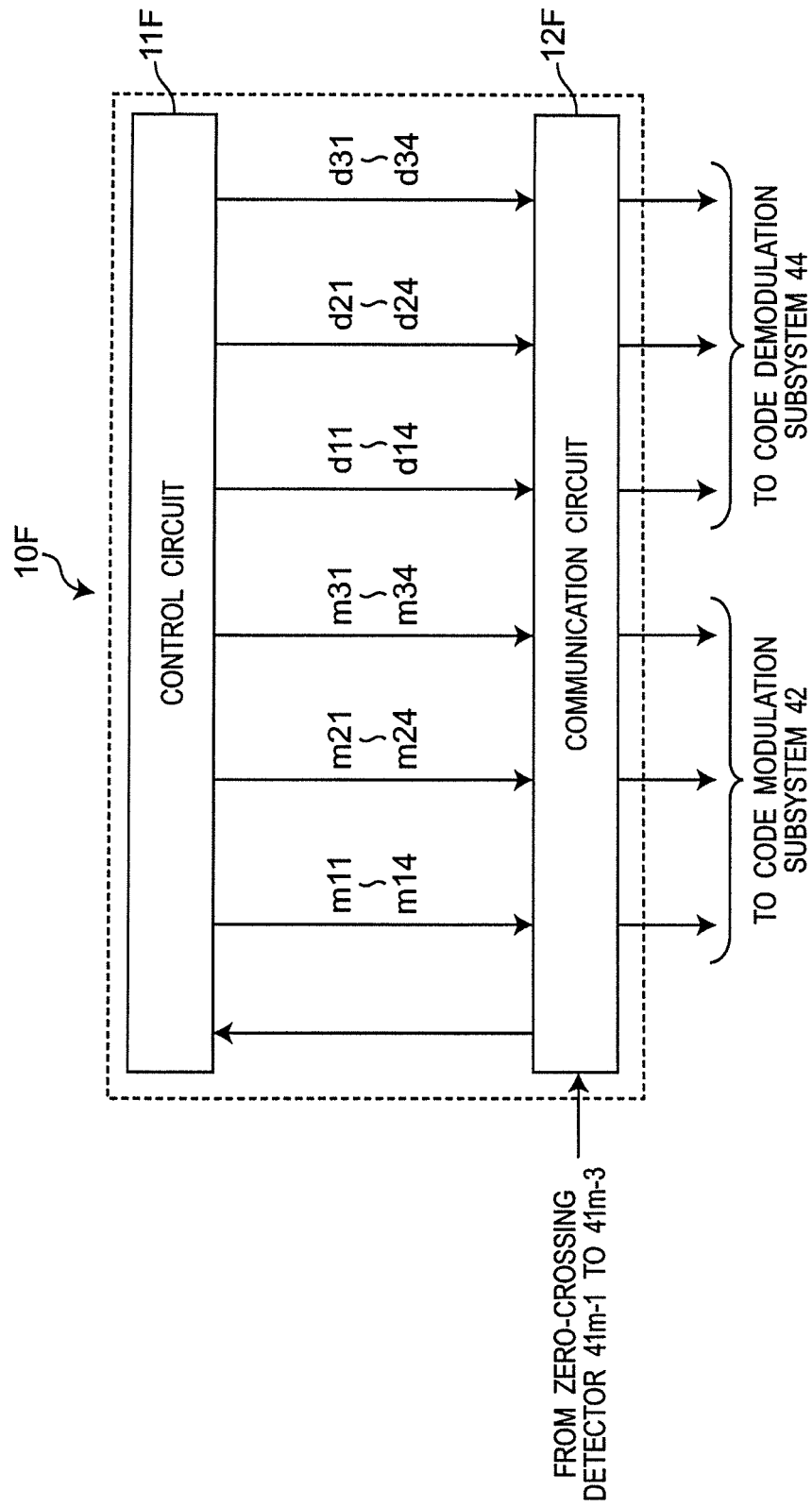
FIG. 32 is a block diagram showing a configuration of a controller 10F of FIG. 31.

FIG. 32 is a block diagram showing a configuration of the controller 10F of FIG. 31. The controller 10F is provided with a control circuit 11F and a communication circuit 12F, without the phase converters 13Ba to 13Bd of FIG. 22.

Using the zero-crossing detector 41m-1, it is possible to accurately detect a positive first half period and a negative second half period of each cycle of the first-phase generated current of the three-phase power generator. In the positive first half period, non-zero modulation codes m11 and m12 are set to the code modulator 2A-1 so as to control the switch elements S1 to S4 of the code modulation circuit 23A (FIG. 10) of the code modulator 2A-1. On the other hand, all zero modulation codes m13 and m14 are set to the code modulator 2A-1 to disconnect the switch elements S21 to S24 of the code modulation circuit 23A (FIG. 10) of the code modulator 2A-1 so as not to flow a current. Similarly, in the negative second half period, all zero modulation codes m11 and m12 are set to the code modulator 2A-1 to disconnect the switch elements S1 to S4 of the code modulation circuit 23A (FIG. 10) of the code modulator 2A-1 so as not to flow a current. On the other hand, non-zero modulation codes m13 and m14 are set to the code modulator 2A-1 to control the switch elements S21 to S24 of the code modulation circuit 23A (FIG. 10) of the code modulator 2A-1.

Similarly, using the zero-crossing detectors 41m-2 and 41m-3, it is also possible to accurately detect a positive first half period and a negative second half period of each cycle of the second- and third-phase generated currents of the three-phase power generator, respectively. It is possible to assign modulation codes to the code modulators 2A-2 and 2A-3, according to whether a positive or negative current flows.

Accordingly, the relative phase between the modulation codes of the code modulator 2A-2 and the modulation codes of the code modulator 2A-1 is identical to the relative phase between the second-phase generated current and the first-phase generated current of the three-phase power generator 41B. Furthermore, the relative phase between the modulation codes of the code modulator 2A-3 and the modulation codes of the code modulator 2A-1 is identical to the relative phase between the third-phase generated current and the first-phase generated current of the three-phase power generator 41B.

The controller 10F sets demodulation codes of the code demodulators 4A-1 to 4A-3 based on the phases of the generated currents detected by the zero-crossing detectors 41m-1 to 41m-3, respectively.

As described above, according to the present embodiment, by using the zero-crossing detectors 41m-1 to 41m-3, it is possible to set modulation codes and demodulation codes to the code modulators 2A-1 to 2A-3 and the code demodulators 4A-1 to 4A-3, respectively, without using the phase converters 13Ba to 13Bd as shown in FIG. 22. Therefore, the controller 10F can easily generate modulation codes and demodulation codes synchronized with corresponding phase components of three-phase alternating-current power. Accordingly, it is possible to transmit respective phases' generated currents of the three-phase power generator 41B via the one transmission path 43 in a multiplexed manner, and separate respective phases' demodulated currents from each other. Thus, it is possible to achieve a favorable power transmission system capable of simultaneously transmitting respective phases' currents of the three-phase power generator 41B to the three-phase load 45.

According to the present embodiment, there is an advantageous effect of stably transmitting power even when the relative phase of the phases of the three-phase power generator 41B varies, as well as advantageous effects as described above.

Summary of Embodiments

A power transmission system according to one aspect of the present disclosure transmits power from one or more power generators to one or more electrical facilities as loads via a transmission path. The power transmission system includes a code modulation subsystem for code modulation of power generated by the power generator, and a code demodulation subsystem for code demodulation of power modulated by code modulators. A pair of the code modulation subsystem and the code demodulation subsystem transmitting and receiving power uses modulation codes and demodulation codes based on the same code sequences.

According to the power transmission system of the one aspect of the present disclosure, at least the one power generator has output terminals of multiphase alternating current. The code modulation subsystem includes the same number of code modulators as the number of output terminals of the multiphase power generators. Modulation codes of the respective code modulators are synchronized with respective phases of multiphase alternating current.

According to the power transmission system of the one aspect of the present disclosure, at least one of the electrical facilities as loads has input terminals of multiphase alternating current. The code demodulation subsystem includes the same number of code demodulators as the number of input terminals of multiphase alternating current. Demodulation codes of the respective code demodulators are synchronized with respective phases of multiphase alternating current.

As described above, according to the power transmission systems of the first to sixth embodiments, it is possible to achieve a favorable power transmission system capable of achieving correct code modulation and code demodulation of power, and additionally, multiplexing power transmissions via any transmission path to achieve simultaneous multiple power transmissions.

Other Embodiments

In the second to sixth embodiments, when the power generator generates alternating-current power, the frequency of the generated power may be measured and notified to the controller.

In the third to sixth embodiments, a plurality of code modulators may use the same modulation code, and a plurality of code demodulators may use the same demodulation code. Thus, one code modulator may transmit powers to a plurality of code demodulators, a plurality of code modulators may transmit powers to one code demodulator, and a plurality of code modulators may transmit powers to a plurality of code demodulators.

In the first to sixth embodiments, we have indicated the example in which power is transmitted using code modulation and code demodulation of current, but the power transmission is not limited thereto. Power may be transmitted using code modulation and code demodulation of direct-current or alternating-current voltage. In this case, similar advantageous effects can be achieved.

REFERENCE SIGNS LIST 1, 1-1 to 1-3, 1A-1 to 1A-3: POWER GENERATOR
1m, 1m-1, 1m-2: POWER METER
2, 2A, 2A-1 to 2A-N: CODE MODULATOR
3, 3-1 to 3-3: TRANSMISSION PATH
4, 4A, 4A-1 to 4A-N: CODE DEMODULATOR
5, 5-1 to 5-3: LOAD
5m, 5m-1 to 5m-2: POWER METER
10, 10A to 10F: CONTROLLER
11, 11B, 11E, 11F: CONTROL CIRCUIT
12, 12A, 12B, 12E, 12F: COMMUNICATION CIRCUIT
13Ba to 13Bd, 13E-1-1 to 13E-1-(N−1), 13E-2-1 to 13E-2-(N−1): Phase converter
20: CONTROL CIRCUIT
21: COMMUNICATION CIRCUIT
22, 22A: CODE GENERATION CIRCUIT
23, 23A: CODE MODULATION CIRCUIT
30: CONTROL CIRCUIT
31: COMMUNICATION CIRCUIT
32, 32A: CODE GENERATION CIRCUIT
33, 33A: CODE DEMODULATION CIRCUIT
41: THREE-PHASE POWER GENERATOR
41-1 to 41-3: POWER GENERATOR (WINDING OF EACH PHASE OF THREE-PHASE POWER GENERATOR 41)
41A: MULTIPHASE POWER GENERATOR
41A-1 to 41A-N: POWER GENERATOR (WINDING OF EACH PHASE OF MULTIPHASE POWER GENERATOR 41A)
41B: THREE-PHASE POWER GENERATOR
41B-1 to 41B-3: POWER GENERATOR (WINDING OF EACH PHASE OF THREE-PHASE POWER GENERATOR 41B)
41m-1 to 41m-3: ZERO-CROSSING DETECTOR
42, 42A: CODE MODULATION SUBSYSTEM
43, 43-1 to 43-3, 43A: TRANSMISSION PATH
43a to 43c: POWER LINE
43d: GROUND LINE
44, 44A: CODE DEMODULATION SUBSYSTEM
45: THREE-PHASE LOAD
45-1 to 45-3: LOAD (WINDING OF EACH PHASE OF THREE-PHASE LOAD 45)
45A: MULTIPHASE LOAD
45A-1 to 45A-N: LOAD (WINDING OF EACH PHASE OF MULTIPHASE LOAD 45A)
D1 to D34: DIODE
S1 to S74: SWITCH ELEMENT
SS1 to SS34, SS21A to SS34A: SWITCH CIRCUIT
T1 to T14: TERMINAL

The invention claimed is:

1. A power transmitter apparatus that transmits power to at least one power receiver apparatus via a transmission path, the power transmitter apparatus comprising:
a plurality of code modulators which modulate powers of phase components of multiphase alternating-current power to generate a plurality of code-modulated waves, respectively, by code modulation using a plurality of modulation codes based on a plurality of code sequences different from each other, and transmits the plurality of code-modulated waves to the at least one power receiver apparatus via the transmission path,
wherein, in the code modulation, a first code modulator, which is one of the plurality of code modulators, determines whether or not to reverse a direction of a current of a first phase component, which is one of the plurality of phase components, of the multiphase alternating-current power according to whether each bit of a first modulation code sequence, which is one of the plurality of code sequences, is a first value or a second value.

2. The power transmitter apparatus as claimed in claim 1, wherein the plurality of modulation codes used for modulating the powers of the phase components of the multiphase alternating-current power by code modulation are orthogonal to each other, and are synchronized with corresponding phase components.

3. A power receiver apparatus that receives a plurality of code-modulated waves from at least one power transmitter apparatus via a transmission path, the plurality of code-modulated waves including powers modulated by code modulation using a plurality of modulation codes based on a plurality of code sequences different from each other, respectively, the power receiver apparatus comprising:
a plurality of code demodulators, each of which demodulates one code-modulated wave of the plurality of received code-modulated waves to generate code-demodulated power by code demodulation using a demodulation code based on a code sequence identical to the code sequence of the modulation code used for the code modulation of the one code-modulated wave, the code-demodulated power being generated as power of one of phase components of multiphase alternating-current power,
wherein, in the code demodulation, a first code demodulator, which is one of the plurality of code demodulators, determines whether or not to reverse a direction of a current of the one code-modulated wave according to whether each bit of the code sequence of the demodulation code is a first value or a second value.

4. The power receiver apparatus as claimed in claim 3, wherein a plurality of demodulation codes used for demodulating the plurality of code-modulated waves by code demodulation are orthogonal to each other, and are synchronized with corresponding phase components of the multiphase alternating-current power.

5. A power transmission system including a power transmitter apparatus, and a power receiver apparatus,
wherein the power transmitter apparatus comprises a plurality of code modulators which modulate powers of phase components of multiphase alternating-current power to generate a plurality of code-modulated waves, respectively, by code modulation using a plurality of modulation codes based on a plurality of code sequences different from each other, and transmits the plurality of code-modulated waves to the at least one power receiver apparatus via a transmission path, wherein the power receiver apparatus comprises a plurality of code demodulators, each of which demodulates one code-modulated wave of the plurality of received code-modulated waves to generate code-demodulated power by code demodulation using a demodulation code based on a code sequence identical to the code sequence of the modulation code used for the code modulation of the one code-modulated wave, the code-demodulated power being generated as power of one of phase components of multiphase alternating-current power, wherein, in the code modulation, a first code modulator, which is one of the plurality of code modulators, determines whether or not to reverse a direction of a current of a first phase component, which is one of the plurality of phase components, of the multiphase alternating-current power according to whether each bit of a first modulation code sequence, which is one of the plurality of code sequences, is a first value or a second value, and wherein, in the code demodulation, a first code demodulator, which is one of the plurality of code demodulators, determines whether or not to reverse a direction of a current of the one code-modulated wave according to whether each bit of the code sequence of the demodulation code is the first value or the second value.

6. A power transmission system including: a power transmitter apparatus, and at least one power receiver apparatus, wherein the power transmitter apparatus comprises a plurality of code modulators which modulate powers of phase components of multiphase alternating-current power to generate a plurality of code-modulated waves, respectively, by code modulation using a plurality of modulation codes based on a plurality of code sequences different from each other, and transmits the plurality of code-modulated waves to the at least one power receiver apparatus via a transmission path, wherein the at least one power receiver apparatus comprises a plurality of code demodulators, each of which receives a plurality of code-modulated waves from the power transmitter apparatus via the transmission path, and demodulates one code-modulated wave of the plurality of received code-modulated waves to generate code-demodulated power by code demodulation using a demodulation code based on a code sequence identical to the code sequence of the modulation code used for the code modulation of the one code-modulated wave, and wherein, in the code modulation, a first code modulator, which is one of the plurality of code modulators, determines whether or not to reverse a direction of a current of a first phase component, which is one of the plurality of phase components, of the multiphase alternating-current power according to whether each bit of a first modulation code sequence, which is one of the plurality of code sequences, is a first value or a second value.

7. A power transmission system including: at least one power transmitter apparatus, and a power receiver apparatus, wherein the at least one power transmitter apparatus comprises a plurality of code modulators which modulate powers to generate a plurality of code-modulated waves, respectively, by code modulation using a plurality of modulation codes based on a plurality of code sequences different from each other, and transmits the plurality of code-modulated waves to the power receiver apparatus via a transmission path, wherein the power receiver apparatus comprises a plurality of code demodulators, each of which demodulates one code-modulated wave of the plurality of received code-modulated waves to generate code-demodulated power by code demodulation using a demodulation code based on a code sequence identical to the code sequence of the modulation code used for the code modulation of the one code-modulated wave, the code-demodulated power being generated as power of one of phase components of multiphase alternating-current power, and wherein, in the code demodulation, a first code demodulator, which is one of the plurality of code demodulators, determines whether or not to reverse a direction of a current of the one code-modulated wave according to whether each bit of the code sequence of the demodulation code is a first value or a second value.

8. The power transmission system as claimed in claim 5, further including a controller that sets the plurality of modulation codes to the power transmitter apparatus, and sets the plurality of demodulation codes to the power receiver apparatus.

9. The power transmission system as claimed in claim 8, wherein the controller shifts a phase of one modulation code by predetermined amounts of phase shifts to generate the plurality of modulation codes used for modulating the powers of the phase components of the multiphase alternating-current power by code modulation, and wherein the controller shifts a phase of one demodulation code by predetermined amounts of phase shifts to generate the plurality of demodulation codes used for demodulating the plurality of code-modulated waves by code demodulation.

10. The power transmission system as claimed in claim 8, wherein the controller sets the plurality of modulation codes to the power transmitter apparatus, and sets the plurality of demodulation codes to the power receiver apparatus, based on moments when a current of each phase changes from positive to negative, and changes from negative to positive.

11. The power transmission system as claimed in claim 5, wherein the power transmitter apparatus and the power receiver apparatus are connected to each other via a transmission path including two power lines.

12. The power transmission system as claimed in claim 5, wherein the power transmitter apparatus and the power receiver apparatus are connected to each other via a transmission path including three power lines.

13. The power transmission system as claimed in claim 5, wherein the power transmitter apparatus and the power receiver apparatus are connected to each other via a transmission path including three power lines and a ground line.

\* \* \* \* \*